(12) United States Patent
Hutchinson

(10) Patent No.: US 8,864,889 B2
(45) Date of Patent: Oct. 21, 2014

(54) DUST SUPPRESSION APPARATUS

(71) Applicant: C.W. Machine Worx, Ltd., Carroll, OH (US)

(72) Inventor: Brad Hutchinson, Rushville, OH (US)

(73) Assignee: C.W. Machine Worx, Ltd., Carroll, OH (US)

( * ) Notice: Subject to any disclaimer, the term of this patent is extended or adjusted under 35 U.S.C. 154(b) by 0 days.

(21) Appl. No.: 14/154,831

(22) Filed: Jan. 14, 2014

(65) Prior Publication Data

US 2014/0123852 A1    May 8, 2014

Related U.S. Application Data

(62) Division of application No. 13/065,541, filed on Mar. 24, 2011, now Pat. No. 8,657,941.

(60) Provisional application No. 61/317,030, filed on Mar. 24, 2010.

(51) Int. Cl.
  *B01D 47/00* (2006.01)
  *B01D 47/06* (2006.01)
(52) U.S. Cl.
  CPC ............ *B01D 47/06* (2013.01); *B01D 2221/08* (2013.01); *B01D 2221/14* (2013.01)
  USPC ................... 96/271; 96/281; 96/322; 239/77; 239/172; 239/176; 239/722
(58) Field of Classification Search
  None
  See application file for complete search history.

(56) References Cited

U.S. PATENT DOCUMENTS

| | | | |
|---|---|---|---|
| 2,768,859 A * | 10/1956 | Patterson | ................... 239/77 |
| 2,991,595 A | 7/1961 | Addis | |
| 3,180,063 A | 4/1965 | Burrows et al. | |
| 3,391,499 A | 7/1968 | Batson | |
| 3,535,829 A | 10/1970 | Dudek | |
| 3,566,548 A | 3/1971 | Beckering et al. | |
| 3,902,284 A | 9/1975 | Hastily | |
| 3,938,283 A | 2/1976 | Keith, Jr. | |
| 4,058,936 A | 11/1977 | Marton | |
| 4,118,897 A | 10/1978 | Martin | |
| 4,192,104 A | 3/1980 | Patenaude | |
| 4,192,390 A | 3/1980 | Wanner et al. | |

(Continued)

FOREIGN PATENT DOCUMENTS

DE  1274916  8/1968
DE  3535636  4/1987

(Continued)

*Primary Examiner* — Duane Smith
*Assistant Examiner* — Phillip Shao
(74) *Attorney, Agent, or Firm* — Roger A. Gilcrest

(57) ABSTRACT

A dust suppression apparatus comprising: (a) a turntable; (b) an engine; (c) a water mist blower comprising an air conduit, a plurality of water nozzles positioned so as to supply a spray of water to the air conduit, and a fan positioned so as to supply a stream of air through the air conduit, the water mist blower and the engine mounted on the turntable, the turntable adapted to permit the air conduit to be rotated horizontally, and the air conduit mounted so as to permit the air conduit to tilt vertically; (d) a water conduit adapted to supply pressurized water to the plurality of water nozzles; (e) a belt drive connected to the engine and adapted to supply power to the fan, and (f) a constant velocity joint connecting the belt drive to the fan.

2 Claims, 74 Drawing Sheets

(56) References Cited

U.S. PATENT DOCUMENTS

| | | | |
|---|---|---|---|
| 4,202,496 A | 5/1980 | VanderKelen et al. |
| 4,334,390 A | 6/1982 | Sumerau |
| 4,371,477 A | 2/1983 | Karowiec et al. |
| 4,380,353 A | 4/1983 | Campbell et al. |
| 4,381,628 A | 5/1983 | Dicke |
| 4,741,130 A | 5/1988 | Tano et al. |
| 4,753,047 A | 6/1988 | Yoshikawa et al. |
| 4,754,579 A | 7/1988 | Batt |
| 4,758,023 A | 7/1988 | Vermillion |
| 4,841,681 A | 6/1989 | Dickson |
| 4,967,516 A | 11/1990 | Hoshino et al. |
| 5,167,367 A | 12/1992 | VanderKelen et al. |
| 5,222,665 A | 6/1993 | Hill |
| 5,245,797 A | 9/1993 | Milkie |
| 5,341,605 A | 8/1994 | Tasikas |
| 5,349,752 A | 9/1994 | Stirm |
| 5,419,737 A | 5/1995 | Brazell et al. |
| 5,467,835 A | 11/1995 | Obermeier et al. |
| 5,595,531 A | 1/1997 | Niemela et al. |
| 5,698,500 A | 12/1997 | Baranski et al. |
| 5,815,934 A | 10/1998 | Eichberger et al. |
| 5,833,524 A | 11/1998 | Satoh et al. |
| 5,878,607 A | 3/1999 | Nunes et al. |
| 5,974,626 A | 11/1999 | Wood |
| 6,159,085 A | 12/2000 | Hara |
| 6,223,995 B1 | 5/2001 | Evans et al. |
| 6,224,471 B1 | 5/2001 | Clowers et al. |
| 6,237,859 B1 | 5/2001 | Hill |
| 6,514,131 B1 | 2/2003 | Reich et al. |
| 6,785,932 B2 | 9/2004 | Bone |
| 6,948,412 B2 | 9/2005 | Brazell et al. |
| 6,954,719 B2 | 10/2005 | Carter, Jr. et al. |
| 6,966,097 B2 | 11/2005 | Engel et al. |
| 7,124,467 B2 | 10/2006 | Hitzelberger et al. |
| 7,338,348 B2 * | 3/2008 | Melvin et al. | 451/28 |
| 2007/0186778 A1 * | 8/2007 | Peterson | 96/281 |
| 2012/0283030 A1 * | 11/2012 | Oh | 464/146 |

FOREIGN PATENT DOCUMENTS

| | | |
|---|---|---|
| DE | 3542466 | 6/1987 |
| DE | 8906895 | 7/1989 |
| DE | 4121256 | 1/1993 |
| DE | 19847624.8 | 4/1999 |
| DE | 19851064 | 6/1999 |
| GB | 1058656 | 2/1967 |

* cited by examiner

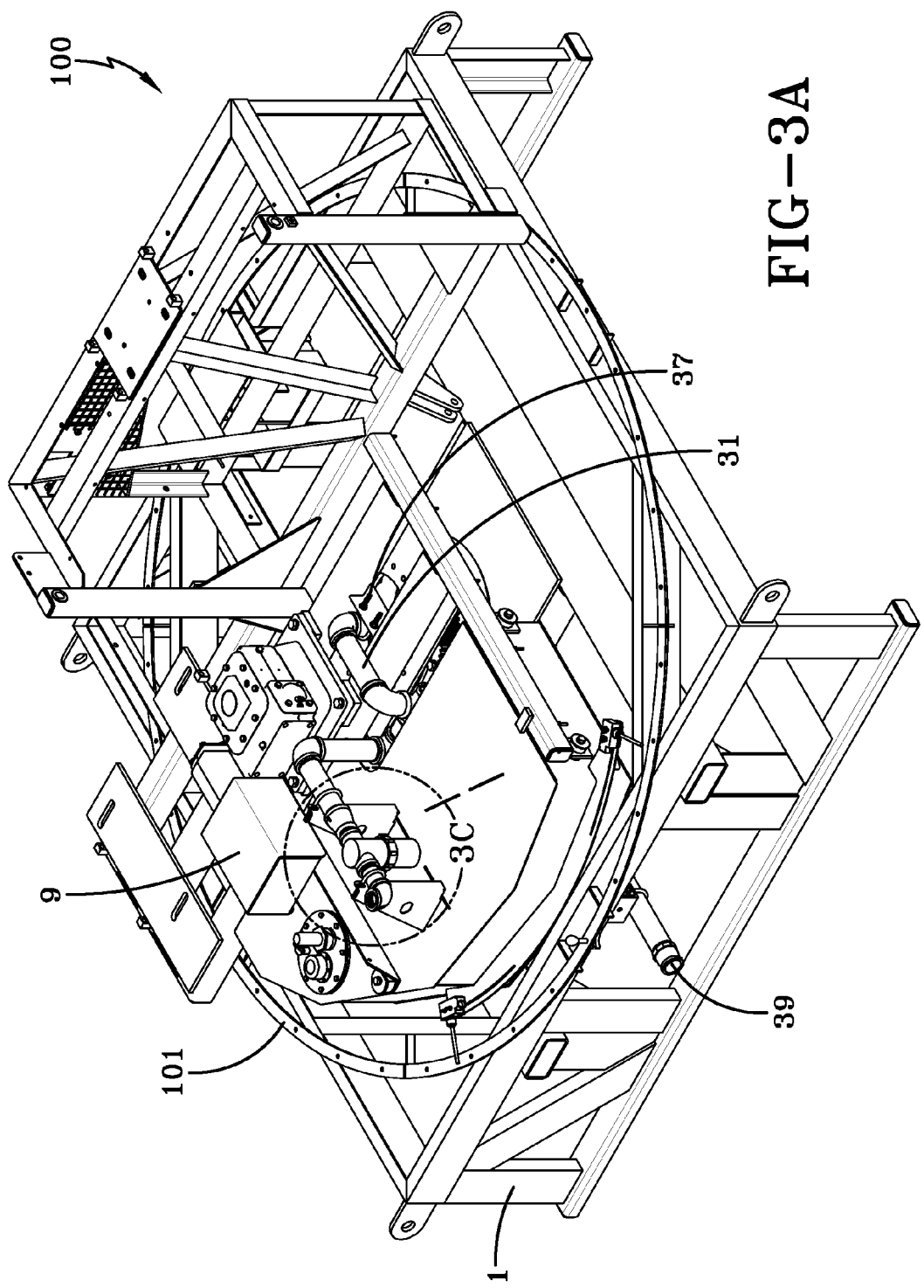

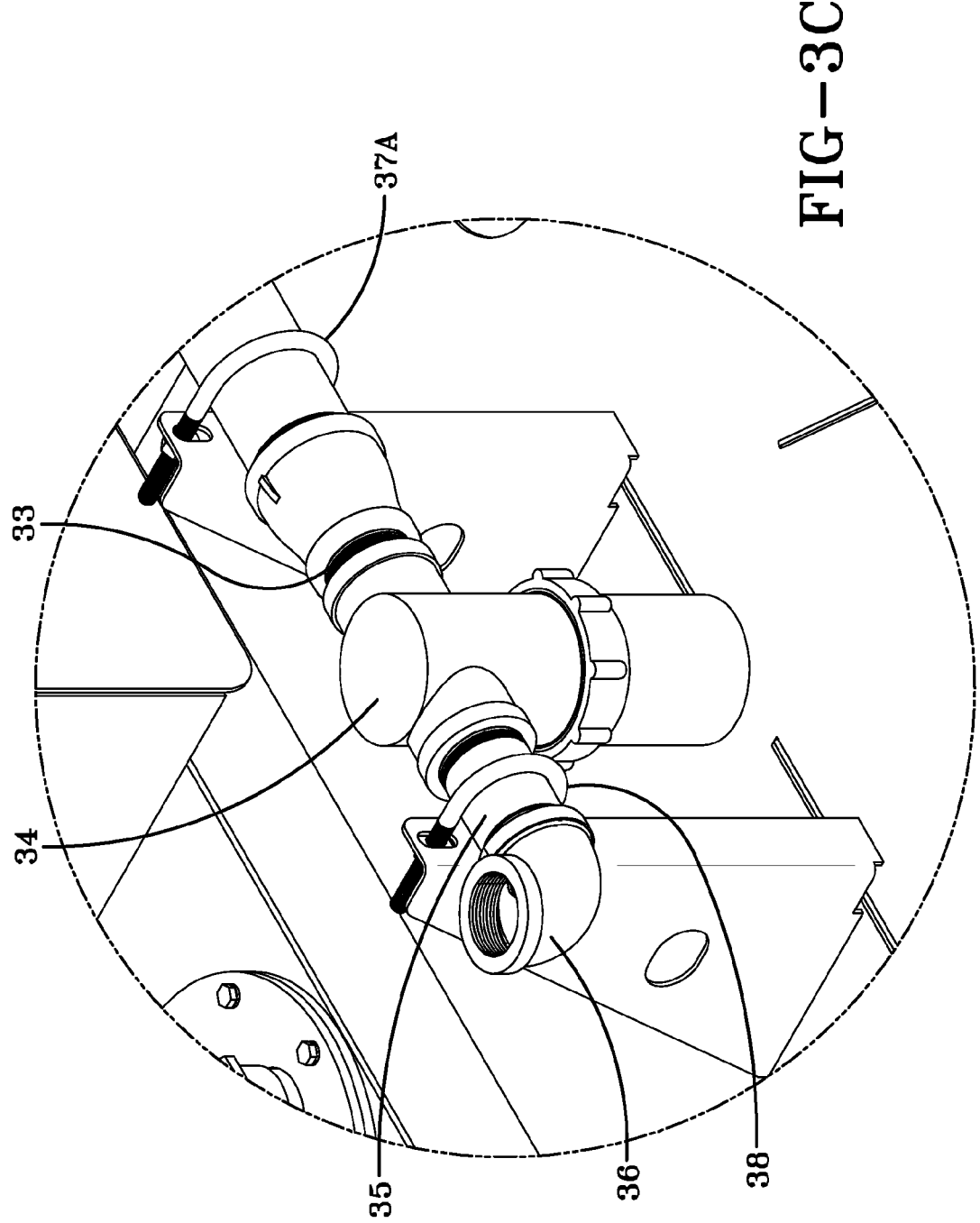

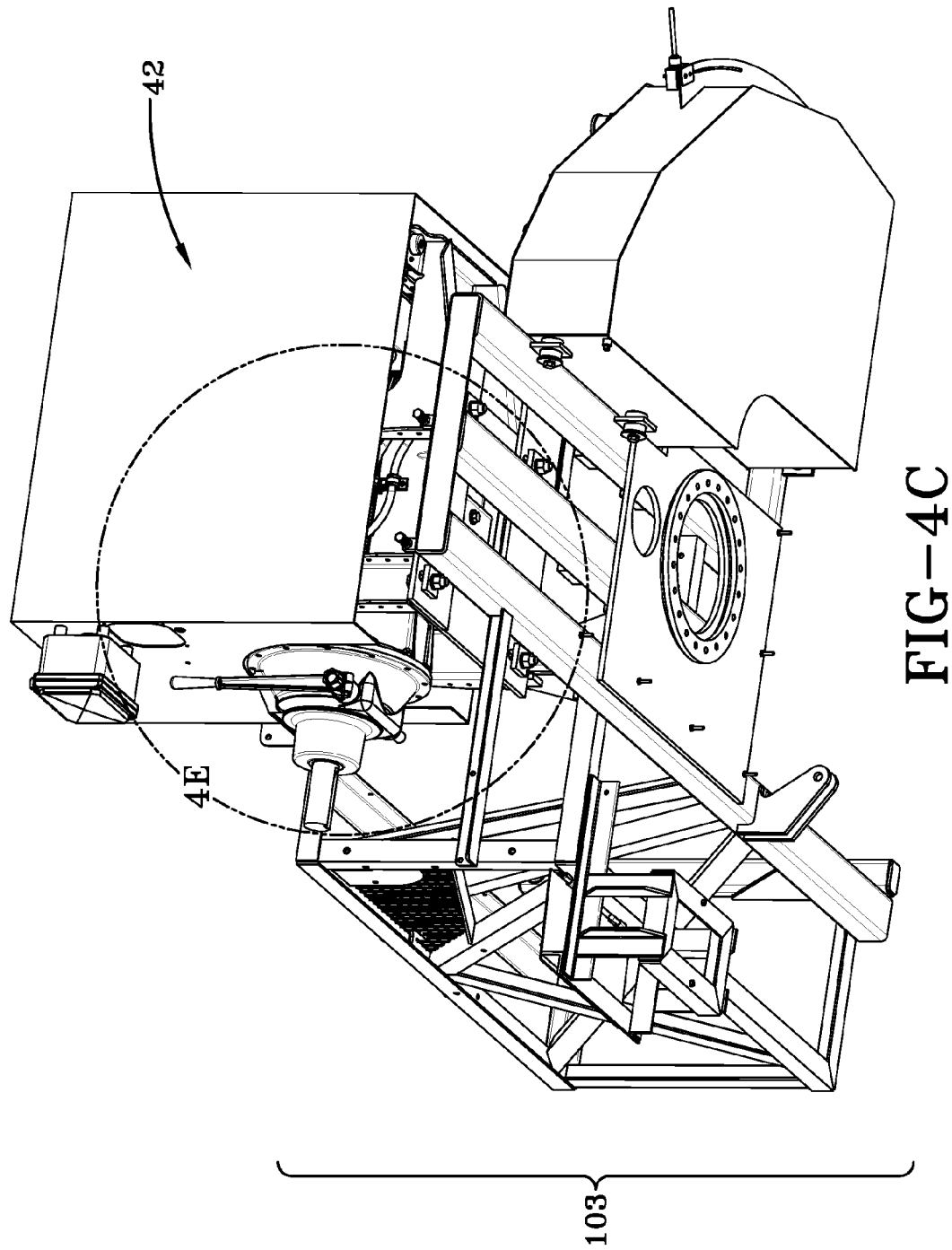

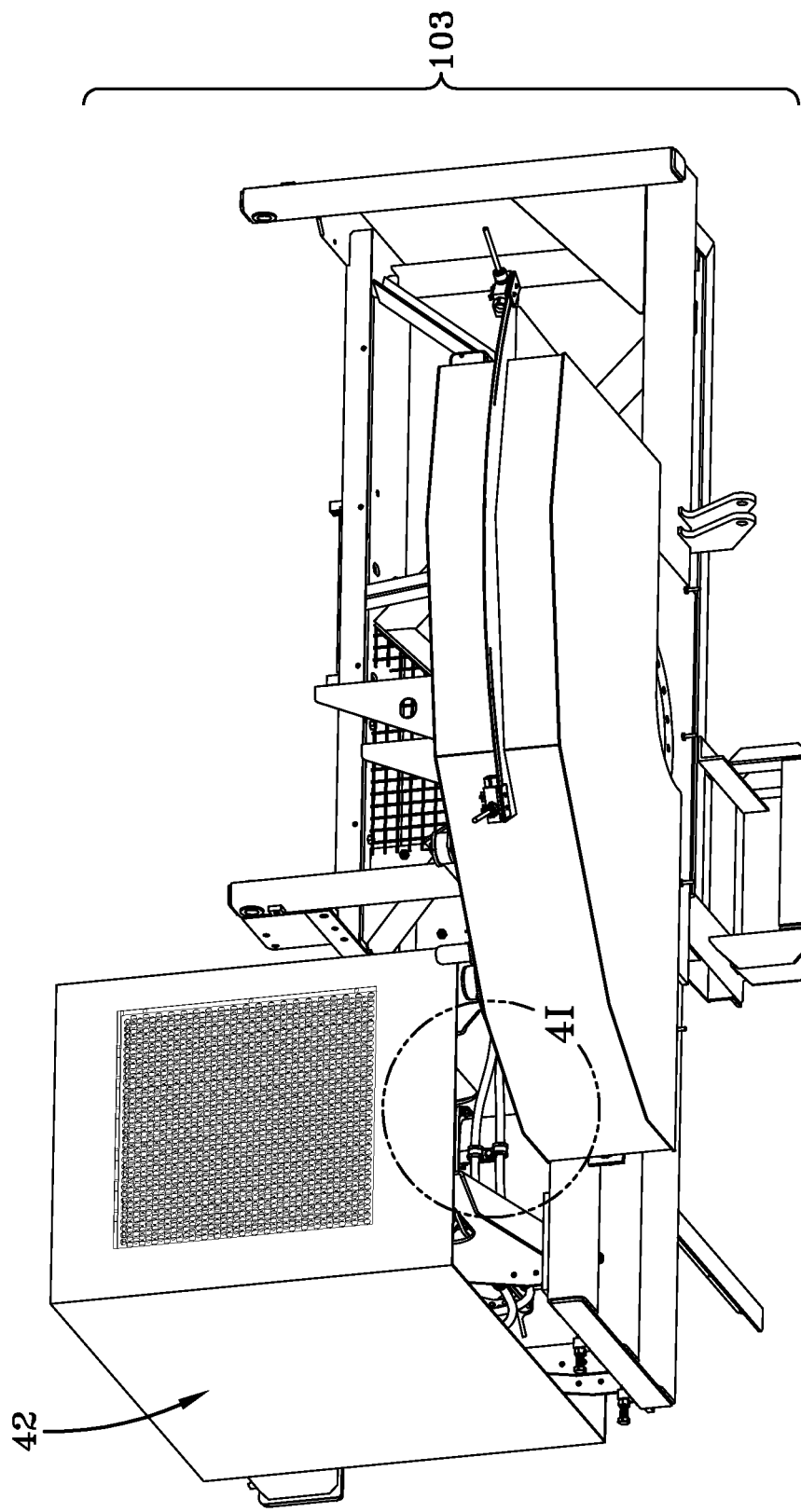

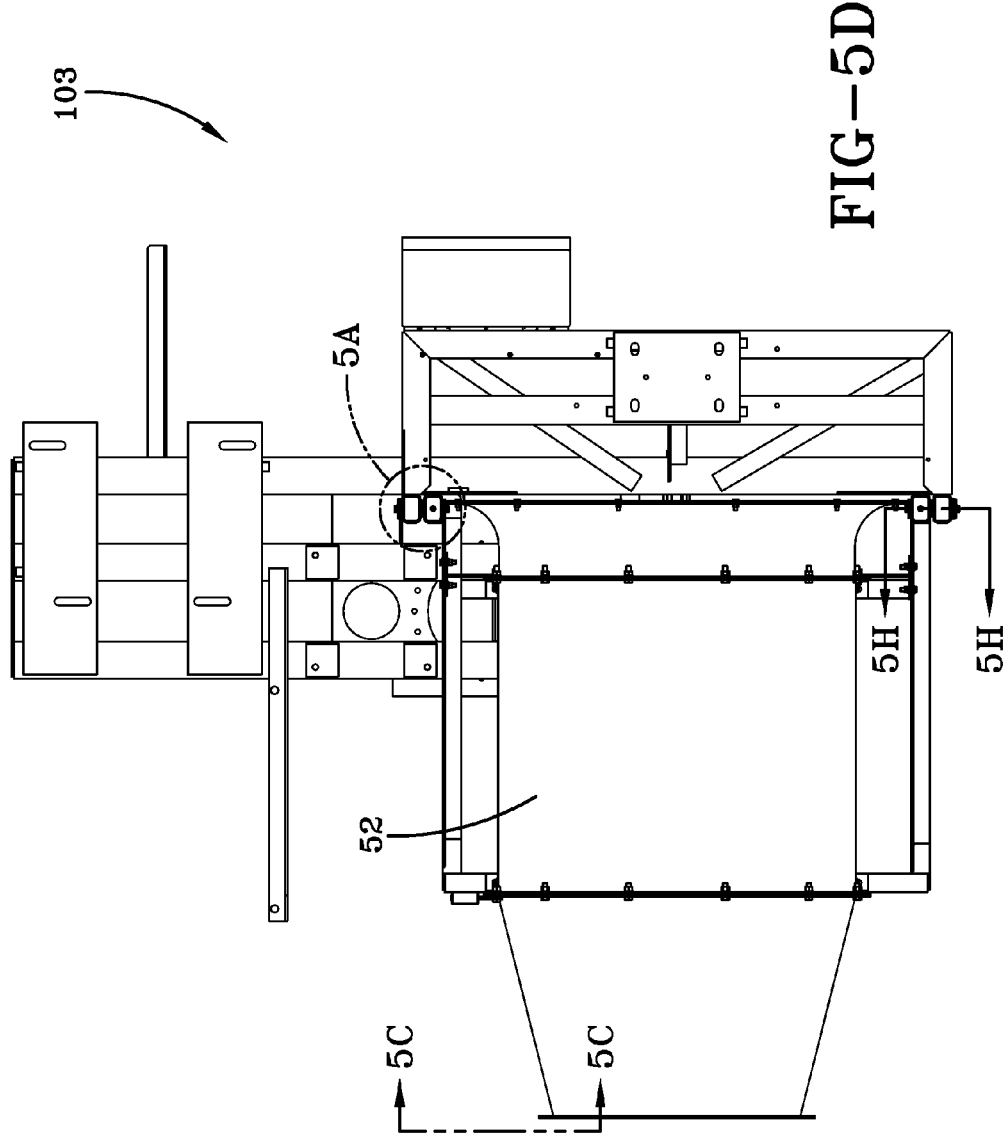

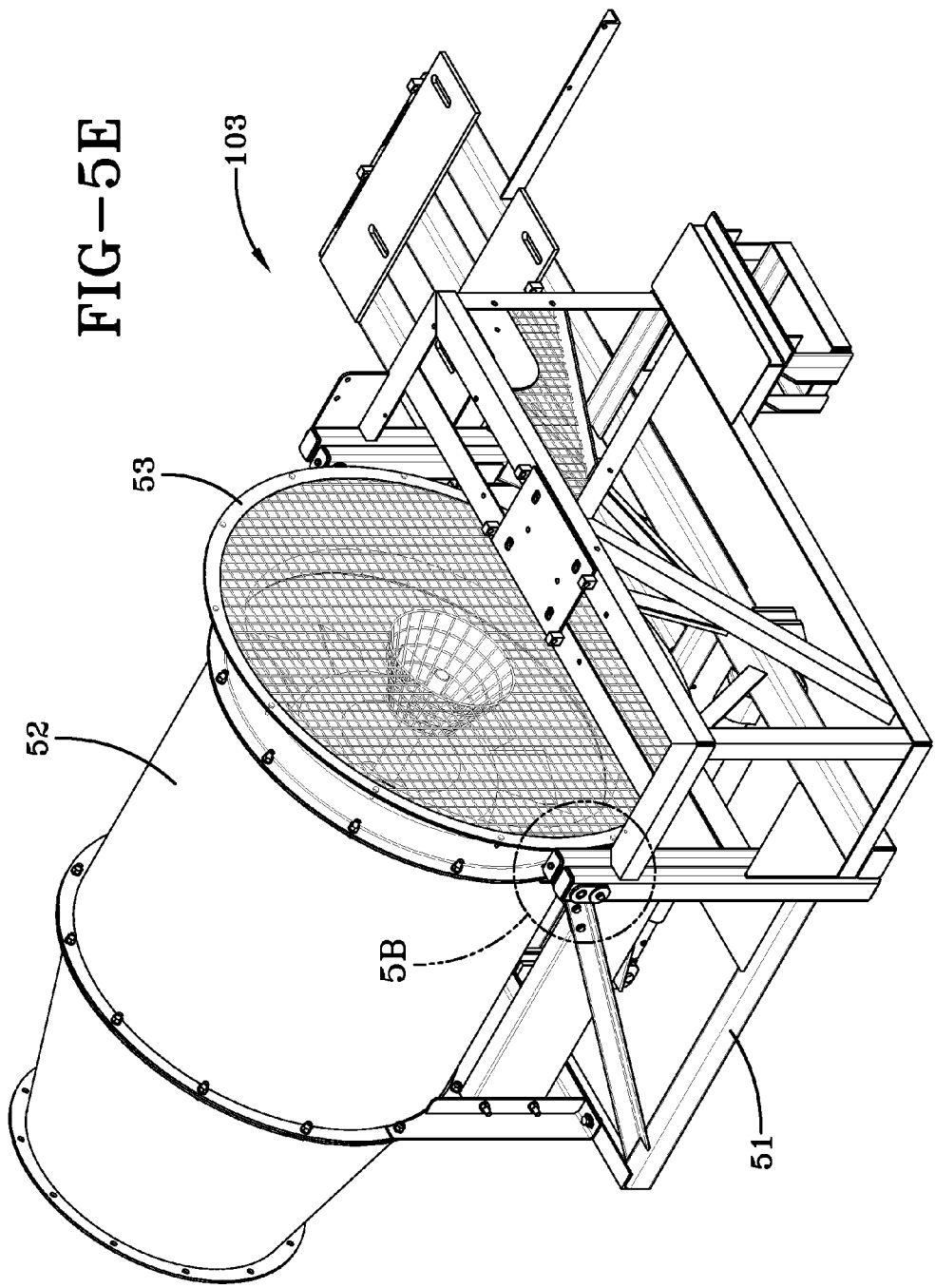

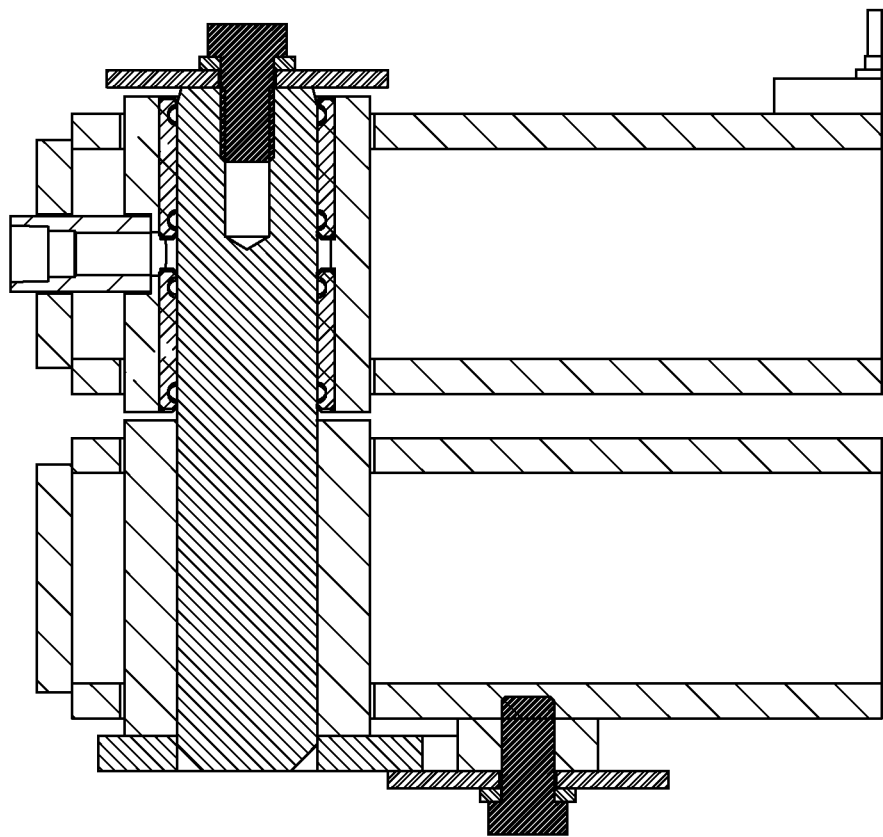

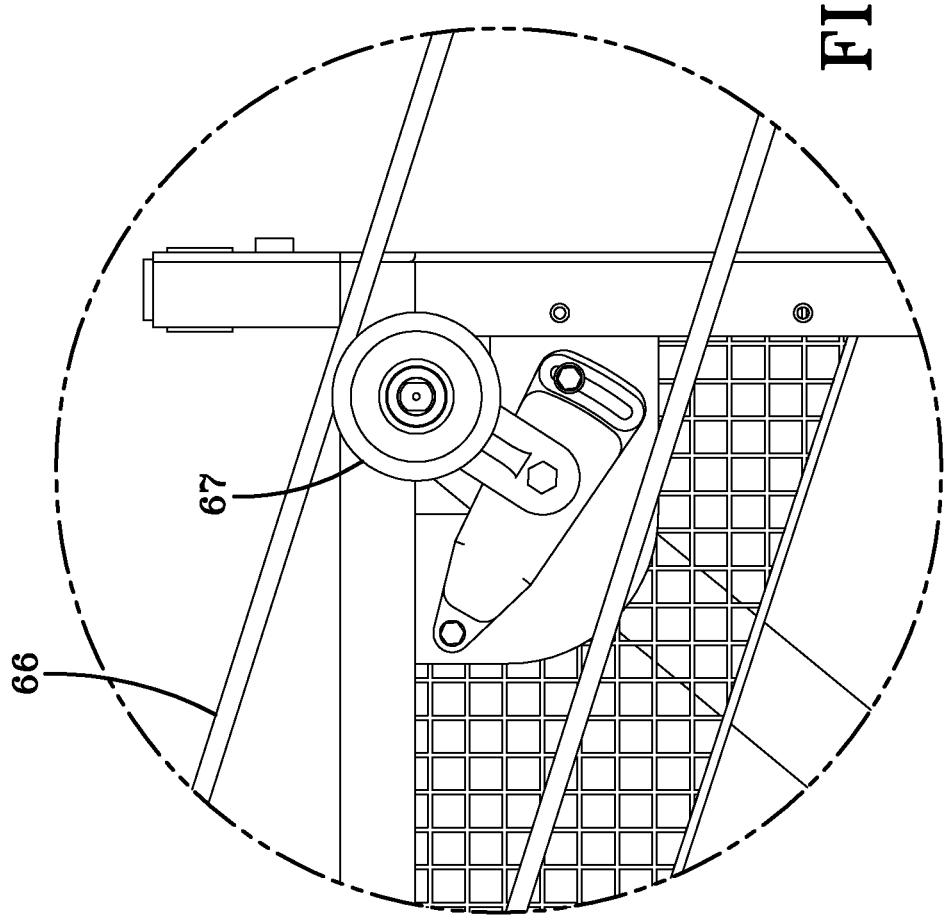

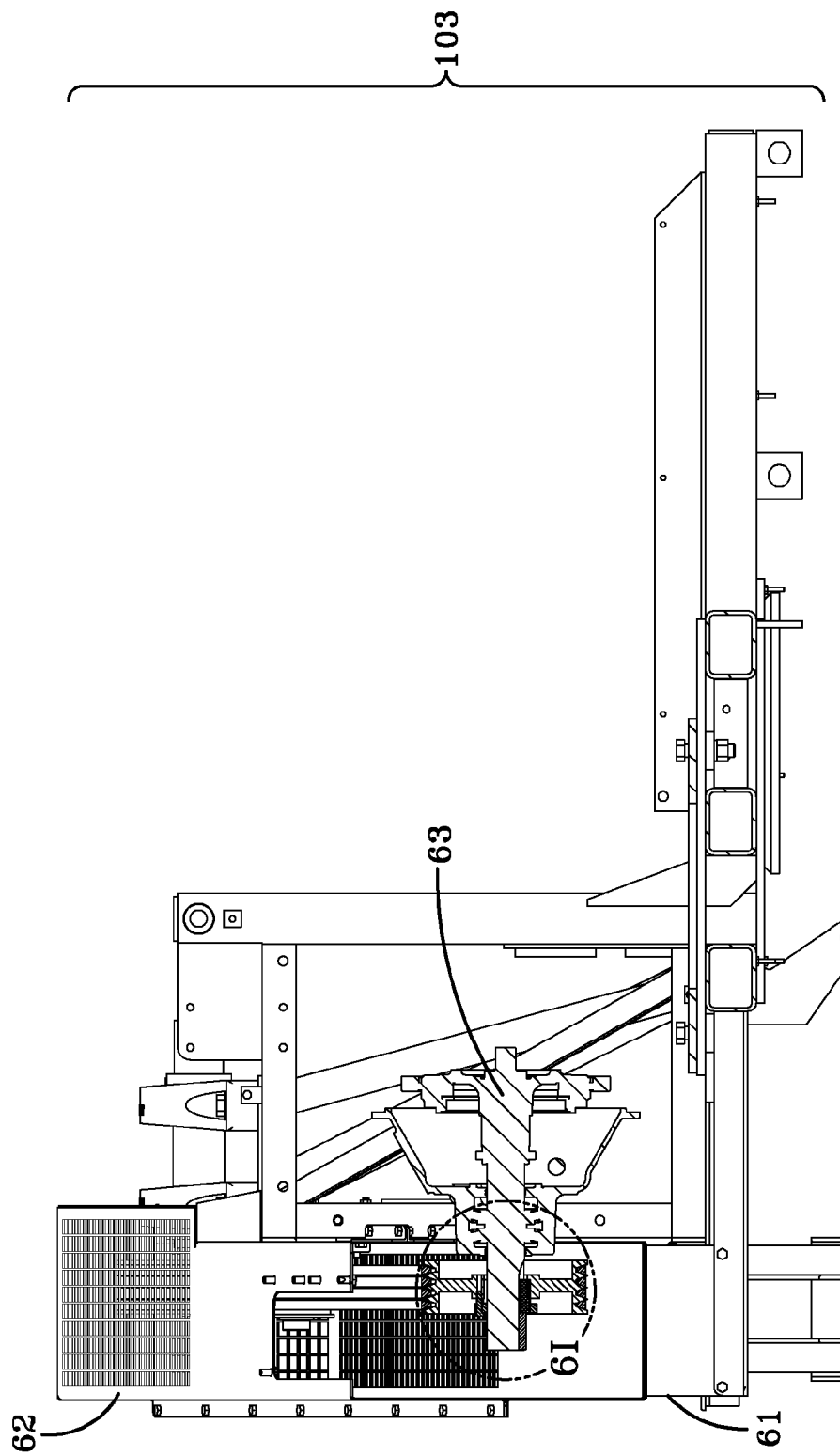

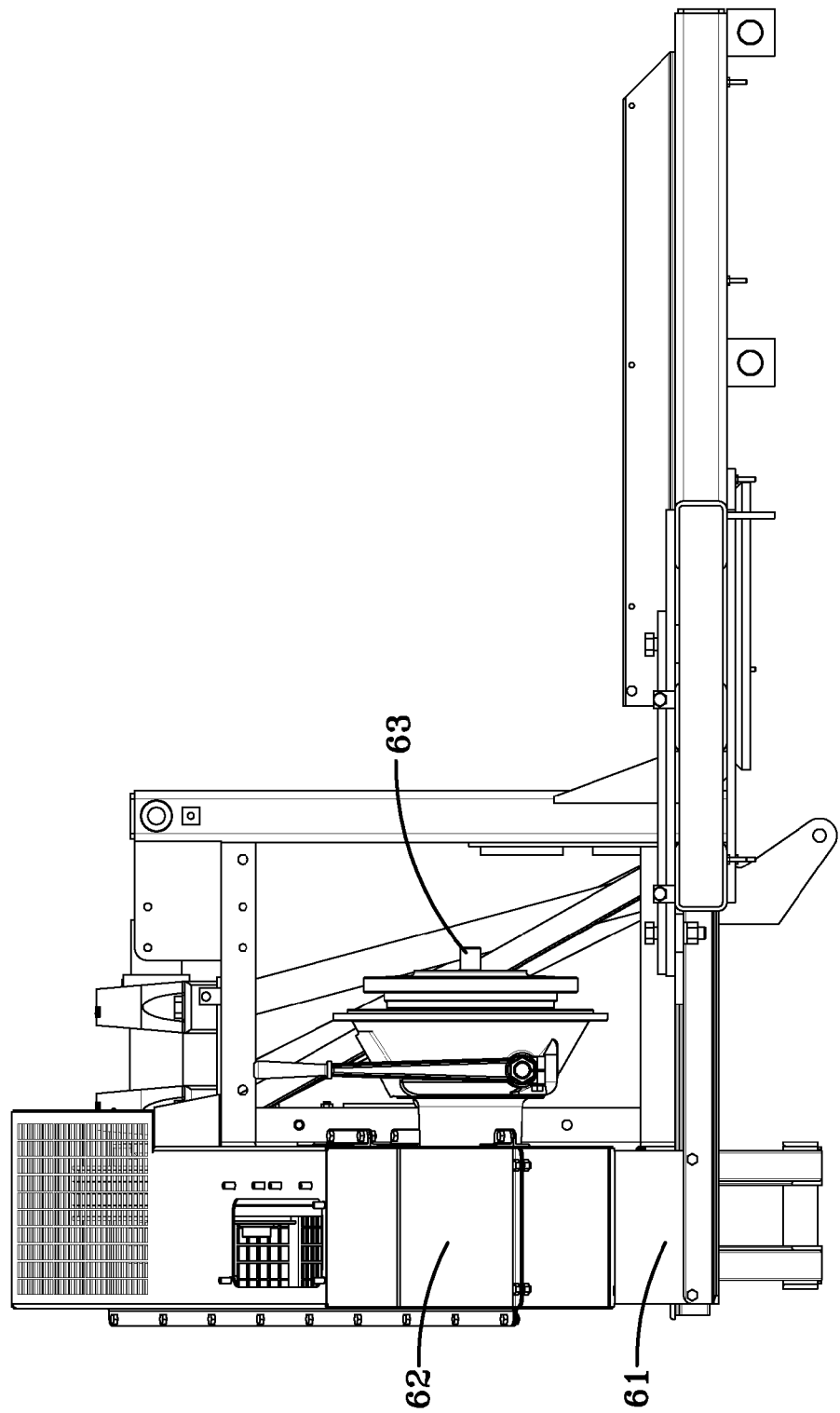

DUST SUPPRESSION APPARATUS

RELATED APPLICATION DATA

This application is a divisional of U.S. application Ser. No. 13/065,541, filed Mar. 24, 2011, which claims the priority benefit of U.S. Provisional Application Ser. No. 61/317,030, filed Mar. 24, 2010, which are hereby incorporated in their entirety herein by reference.

FIELD OF THE INVENTION

The present invention relates to a dust suppression apparatus and methods.

BACKGROUND

In the fields of construction and demolition, it is often desirable to apply water mists over active construction and demolition sites, or over sites otherwise affected by dust or other particulate matter, in order to settle the particulate matter in similar heavy machinery and similar work environments.

While misting dust suppressors have been developed and used in the past, many misting dust suppressors are limited in the area of coverage by the ability of the devices to provide large volumes of properly-sized mist droplets, and to eject mist so as to cover very large areas or to serve vary large volumes, such as those presented in demolition operations wherein larger buildings are brought down and eject large volumes of particulate matter as they fall.

In addition, it is also desirable to be able to direct and redirect misted fluids toward different areas or through different volumes at a given job site or as a demolition operation proceeds. It is also desirable to be able to direct and redirect misted fluids to varying heights, again depending upon the application presented.

It is often beneficial to be able to provide automatic and/or reciprocating sweep angles in the misting output. This reduces labor in applications where otherwise an operator would have to be on station to constantly vary the aim of the mist output.

Further, in many instances it is beneficial to be able to vary the overall mist output and output throw distance depending upon a given application. In some instances, it is desirable to be able to provide a relatively low-volume mist over a greater distance, while in other applications, a greater treatment volume of mist or greater mist density is desirable in a relatively smaller treatment volume.

Accordingly, there remains a need for misting dust suppressors that provide greater mist output and output throw distance while being able to vary the angle of the mist output, and to do so automatically where desired. There also remains a need for misting dust suppressors that provide versatility in the amount and density of mists, such as being able to provide mist droplets of different size and to do so automatically.

SUMMARY OF THE INVENTION

The embodiments of the invention described herein addresses the shortcomings of the prior art.

In general terms, the invention may be described as a dust suppression apparatus comprising: (a) a turntable; (b) an engine; (c) a water mist blower comprising an air conduit, a plurality of water nozzles positioned so as to supply a spray of water to the air conduit, and a fan positioned so as to supply a stream of air through the air conduit, the water mist blower and the engine mounted on the turntable, the turntable adapted to permit the air conduit to be rotated horizontally, and the air conduit mounted so as to permit the air conduit to tilt vertically; (d) a water conduit adapted to supply pressurized water to the plurality of water nozzles; (e) a belt drive connected to the engine and adapted to supply power to the fan, and (f) a constant velocity joint connecting the belt drive to the fan.

The turntable is adapted to provide 360 degree horizontal rotation, and may be adapted to provide reciprocating arcuate horizontal rotation. It is preferred that the turntable is adapted to provide 360 degree horizontal rotation or reciprocating arcuate horizontal rotation.

In a preferred embodiment, the dust suppression apparatus has a plurality of water nozzles comprising a first and second circular array of water nozzles, either of the first and second circular arrays of water nozzles adapted to be optionally engaged.

The dust suppression apparatus further preferably features a belt guard, a portion of the belt guard disposed adjacent to the air conduit, the portion of the fan adapted to permit air flow therethrough.

The dust suppression apparatus typically will additionally include at least one motor, being (1) a motor connected to the turntable so as to be able to rotate the air conduit horizontally and/or (2) a motor adapted to tilt the air conduit vertically.

It is also preferred that the dust suppression apparatus additionally include an electronic control panel adapted to provide electronic control of the at least one motor so as to control either the rotation or the tilting of the water mist blower, or both the rotation or tilting.

It is also preferred that the dust suppression apparatus additionally include a booster pump driven by the engine and adapted to increase the pressure of the pressurized water, which is especially useful in applications where the water source is at no pressure or low pressure.

Another preferred feature of the apparatus is the inclusion of a belt guard, a portion of the belt guard disposed adjacent the air conduit, the portion of the fan adapted to permit air flow therethrough.

The present invention also includes a method of dust suppression, the method comprising the steps: (a) transporting a dust suppression apparatus to a site, the dust suppression comprising (1) a trailer having wheels and an upper surface; (2) a turntable mounted upon the upper surface; (3) an engine; (4) a water mist blower comprising an air conduit, a plurality of water nozzles positioned so as to supply a spray of water to the air conduit, and a fan positioned so as to supply a stream of air through the air conduit, the water mist blower and the engine mounted on the turntable, the turntable adapted to permit the air conduit to be rotated horizontally, and the air conduit mounted so as to permit the air conduit to tilt vertically; (5) at least one motor connected to the turntable so as to be able to rotate the air conduit to be rotated horizontally and to be able to tilt the air conduit vertically; (6) a water conduit adapted to supply pressurized water to the plurality of water nozzles; (7) a belt drive connected to the engine and adapted to supply power to the fan, and (8) a constant velocity joint connecting the belt drive to the fan; and (b) supplying water to the water conduit and operating engine so as to generate water mist, while actuating the at least one motor to either: (i) operating the motor so as to rotate the air conduit horizontally, or (ii) operating the at least one motor so as to tilt the air conduit vertically, or (iii) operating the at least one motor so as to rotate the air conduit to be rotated horizontally and so as to tilt the air conduit vertically.

The dust suppression apparatus of the present invention is able to provide dust suppression at the worksite. It can reduce worksite dust in an area of up to 20,000 square feet, thereby maximizing dust suppression efforts. With a relatively modest volume of water the machine can cover a much larger area than outdated manual methods of dust suppression.

Because, in the preferred embodiment the machine is powered by a diesel engine it does not require electrical power, resulting in much safer operation.

It will be understood that all disclosed features of the present invention may be utilized to the extent that they are not logically inconsistent with one another.

BRIEF DESCRIPTION OF THE DRAWINGS

FIGS. 3a-3d are various views of the frame assembly for a dust suppression apparatus in accordance with one embodiment of the present invention.

FIGS. 4a-4i are various views the frame assembly for a dust suppression apparatus with mounted engine, in accordance with one embodiment of the present invention.

FIGS. 5a-5h are various views the frame assembly for a dust suppression apparatus with mounted fan assembly, in accordance with one embodiment of the present invention.

FIGS. 6a-6k are various views the frame assembly for a dust suppression apparatus with mounted fan drive and guard assembly, in accordance with one embodiment of the present invention.

DETAILED DESCRIPTION OF THE PREFERRED EMBODIMENTS

Figure 1:
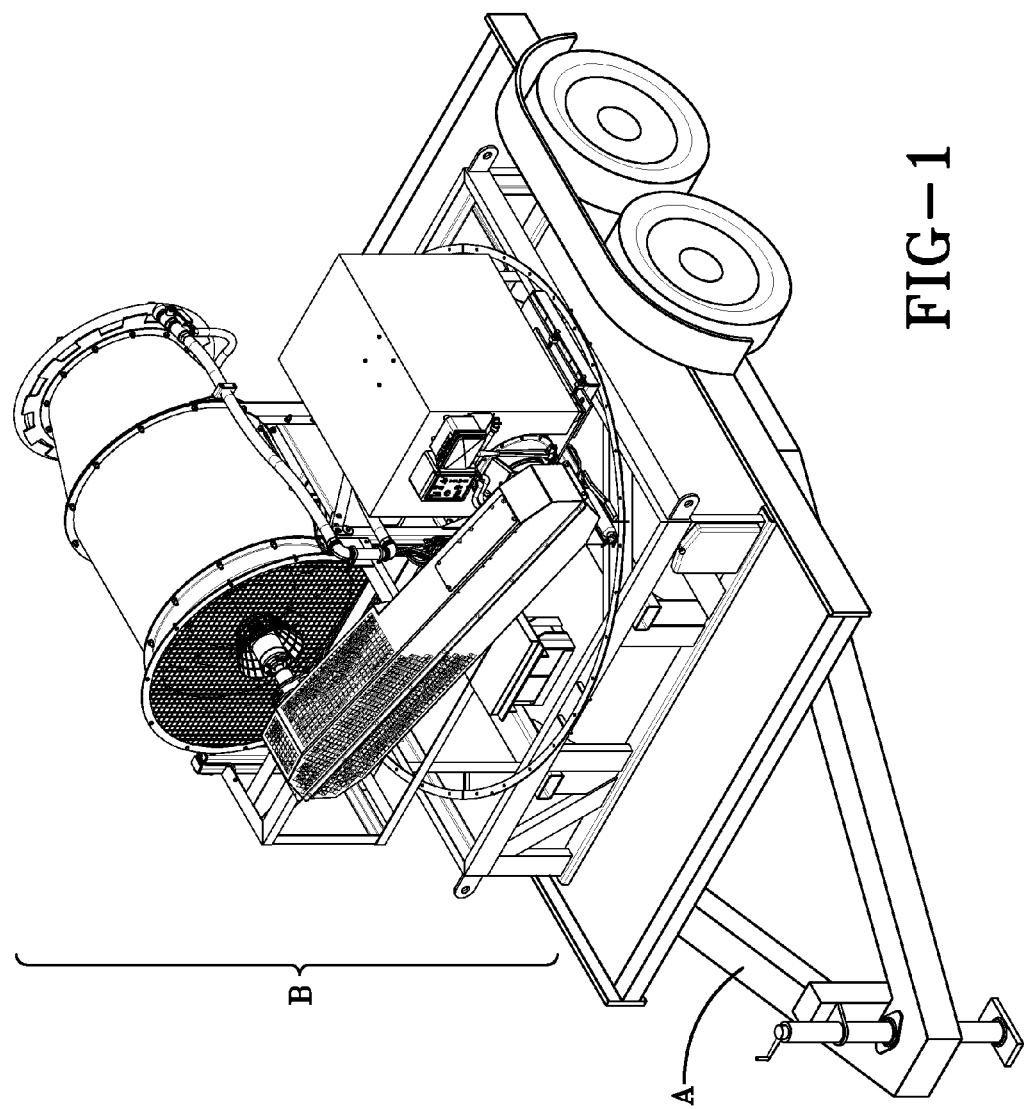
FIG. 1 is a perspective view of a dust suppression apparatus in accordance with one embodiment of the present invention.

In accordance with the foregoing summary, the following describes a preferred embodiment of the present invention which is considered to be the best mode thereof. With reference to the drawings, the invention will now be described in detail with regard for the best mode and preferred embodiment.

FIGS. 1-17 show, using like reference numerals, a dust suppression apparatus in accordance with one embodiment of the present invention.

FIG. 1 shows a perspective view of an apparatus in accordance with one embodiment of the present invention, including a trailer A with the frame and other operative portions of the dust suppression apparatus B of the present invention.

FIGS. 2a-2g are various views of the frame assembly for a dust suppression apparatus in accordance with one embodiment of the present invention.

Figure 2A:
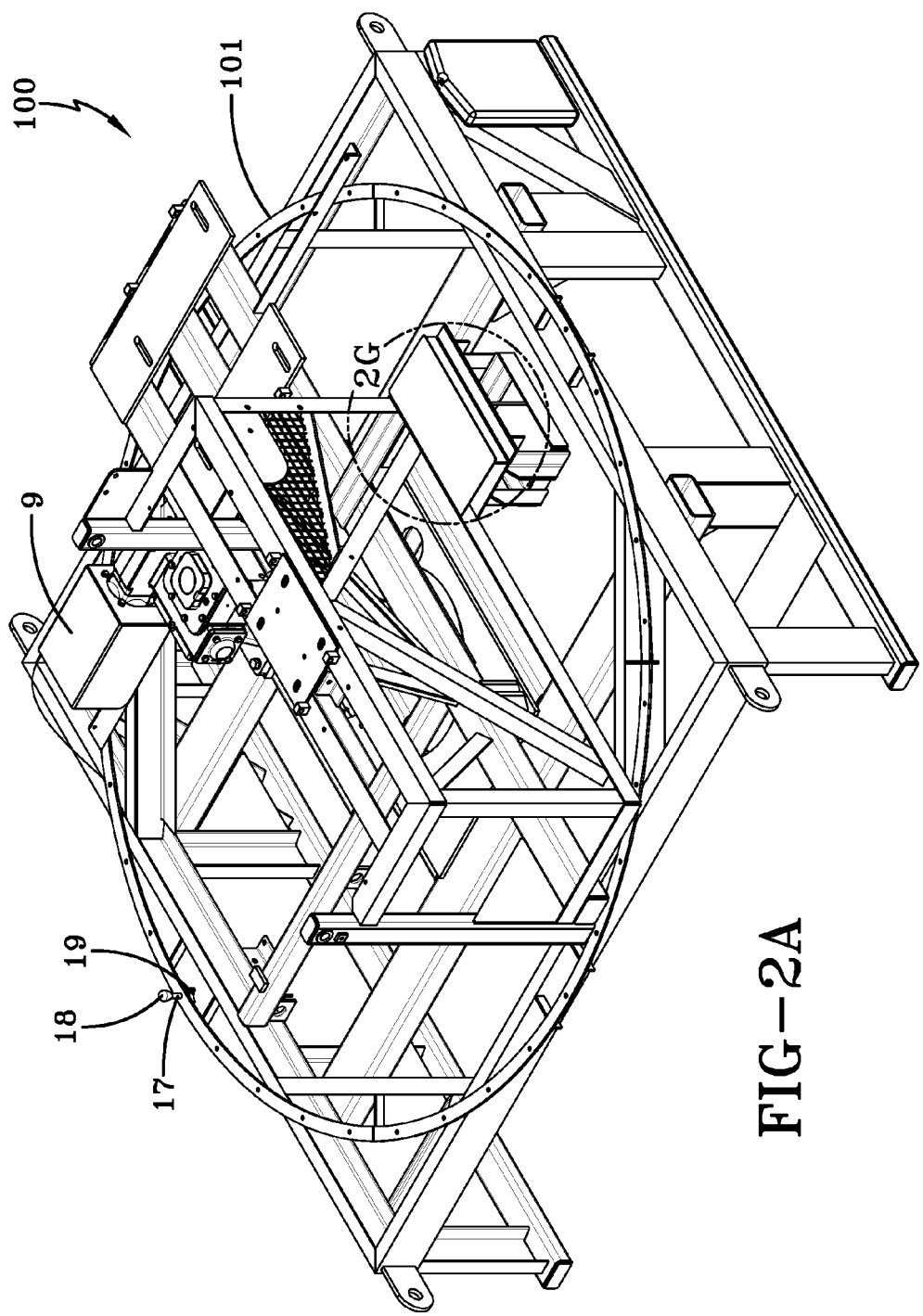
FIGS. 2a-2g are various views of the frame assembly for a dust suppression apparatus in accordance with one embodiment of the present invention.

FIG. 2a is a perspective view of an apparatus in accordance with one embodiment of the present invention. FIG. 2 shows a perspective view of the frame and swing drive assembly. FIG. 2a shows frame and swing drive assembly 100 comprising a stationary frame and turntable portion upon which the balance of the operative portions of the apparatus may be moved through a reciprocal arcuate movement, or even through a 360 degree circular movement cycle.

The base frame weldment 1 may be placed on any vehicle or trailer for transportation to and from a job site and for repositioning the apparatus within a job site for dust suppression.

FIG. 2a shows base weldment 1 and circular swing guide 101, knob shaft 17, ball knob 18, and four arm knob 19, that allow the degree of arcuate movement to be set and controlled by setting the knob shafts 17 along the circumference of the circular travel guide 101.

FIG. 2a also shows motor cover weldment 9 that covers the motor (not shown) that supplies movement of the lower frame portion 102 with respect to the upper frame portion 103 as described herein.

Figure 2C:
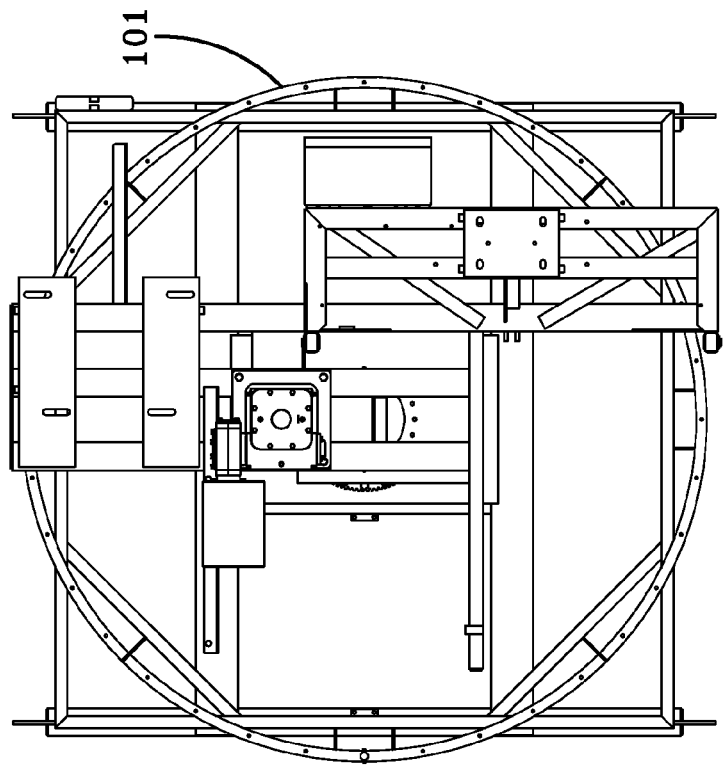
Figure 2B:
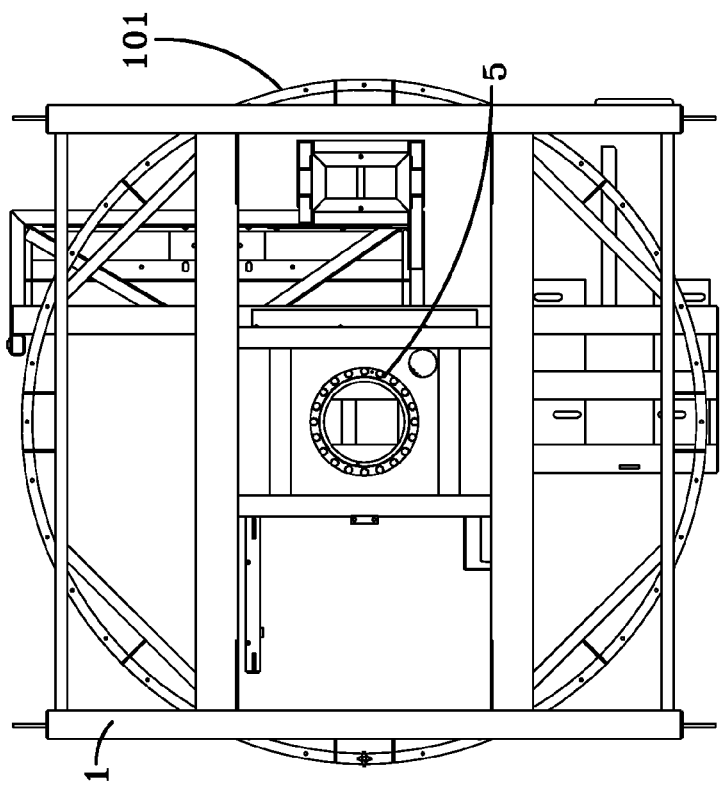

FIG. 2b shows a bottom plan view of the frame and swing assembly 100 shown in FIG. 2a. This view shows the base weldment 1 and the central pivot point 5 about which the upper frame 103 turns to move the operative portions through an arcuate or circular path. This may be done with the assistance of a bearing trace as shown.

FIG. 2c shows a top plan view of the frame and swing assembly shown in FIG. 2a.

Figure 2D:
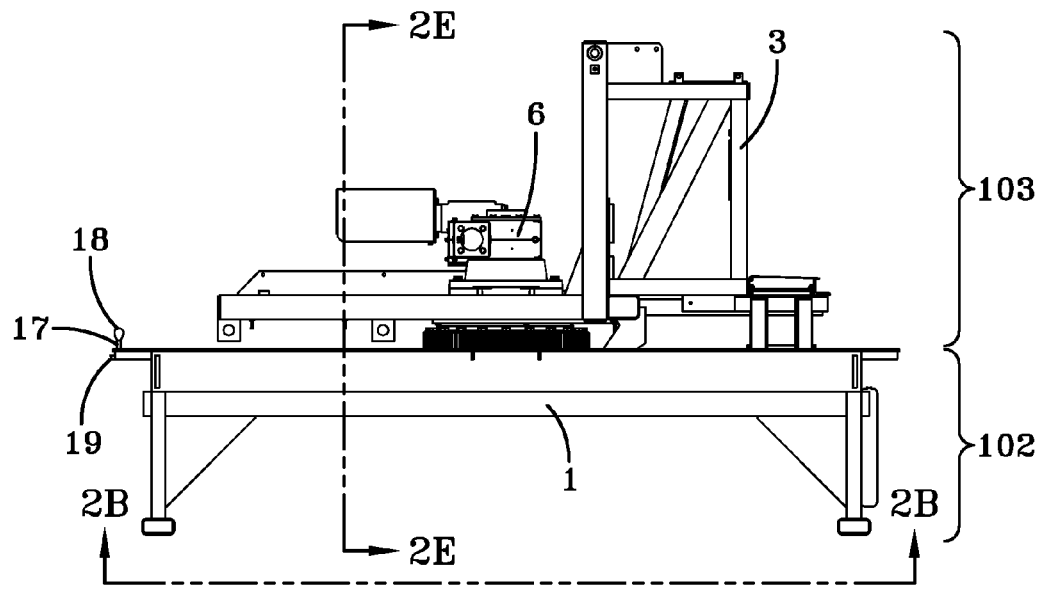

FIG. 2d shows a first side elevation view of the frame and swing assembly 100 shown in FIG. 2a. This view shows lower frame portion 102 and upper frame 103. FIG. 2d shows upper frame weldment 3 and turnable bearing 2. Also shown in FIG. 2d is gear reducer 6. This view also shows the circular travel guide 101 having a number of positioning apertures adapted to hold one or more travel restrictors, such as knob shaft 17, ball knob 18 and four arm knob 19, that serve to set the limits of arcuate travel for the upper frame 103. This permits the control of the swing of the entire active portion such as for the provision of reciprocal motion. Travel restrictors in pairs may be used to set the travel arc for sweeping motion of the mist spray or a single restrictor to set a limit for circular motion, and other equivalent electronic or programmable means may be used for the same purpose.

Figure 2E:
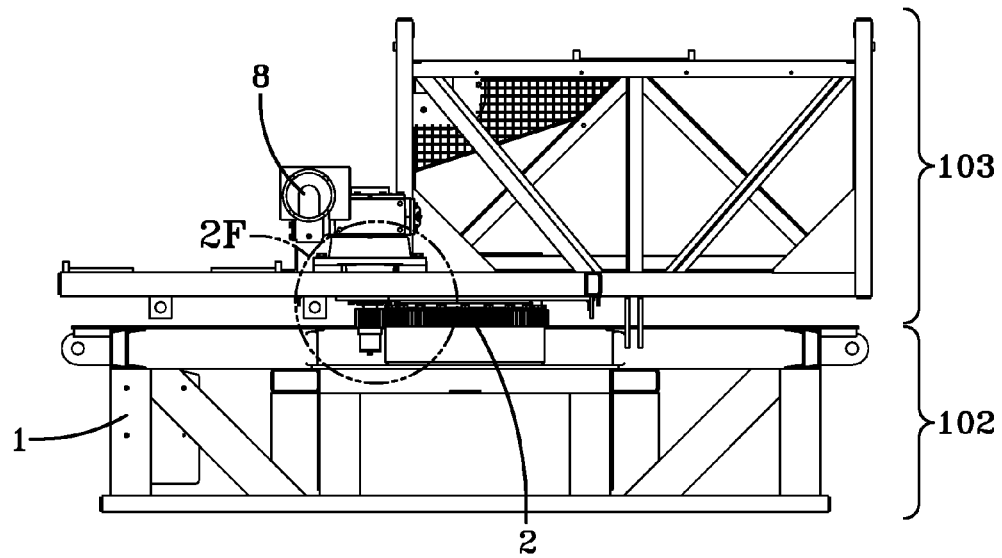

FIG. 2e shows a second side elevation view of the frame and swing assembly 100 sectioned along line A-A of FIG. 2d, using like reference numerals. This view shows lower frame portion 102 with respect to the upper frame portion 103 as described herein. Also shown is motor 8, such as a 12 volt DC motor, that is engaged to turn the upper frame portion 103 with respect to the lower frame portion 102 by cooperation of the gears shown in FIG. 2f.

Figure 2G:
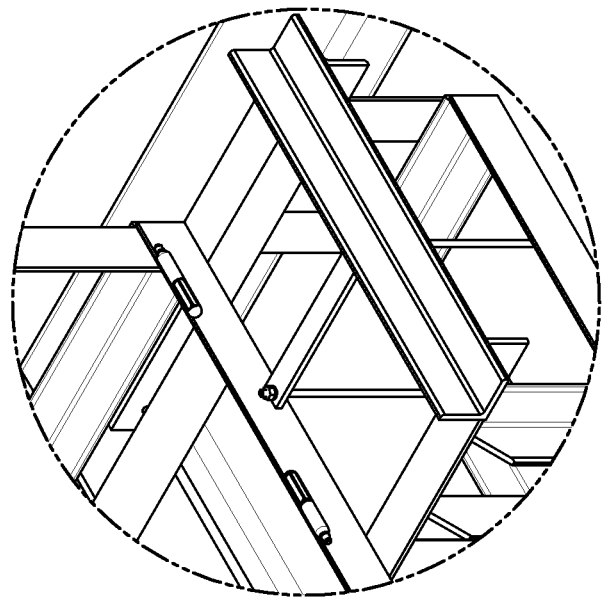
Figure 2F:
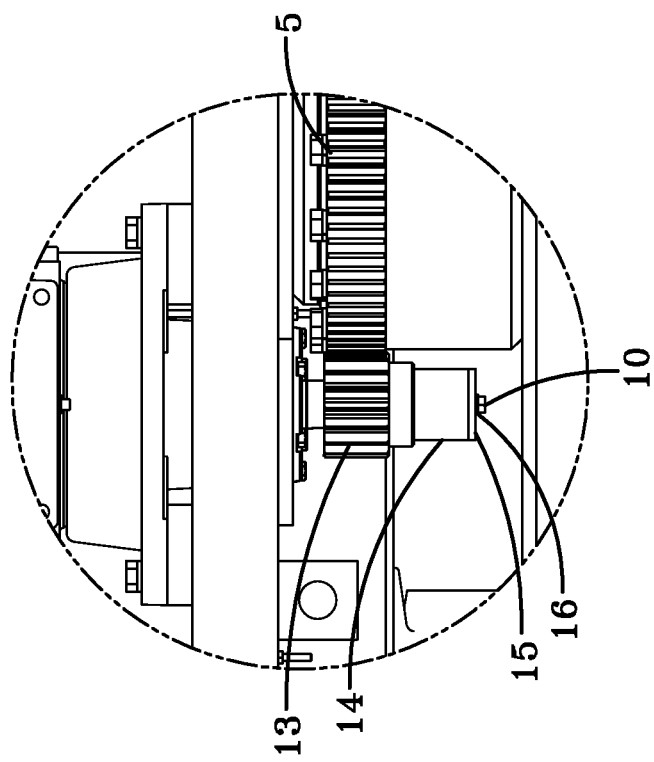

FIG. 2f shows detail C of FIG. 2d, and shows main gear 5, tooth pinion 13, pinion spacer 14, pinion keeper 15 and lock washer 16 with hex head cap screw 10.

FIG. 2g shows detail D of FIG. 2 with the battery cover removed for clarity, and shows the detailed structure of this portion of the upper frame portion 103.

FIG. 3a is an upper perspective view of the frame and swing drive assembly showing the supply plumbing subassembly 31 held in place by pipe u-bolt 37.

Figure 3B:
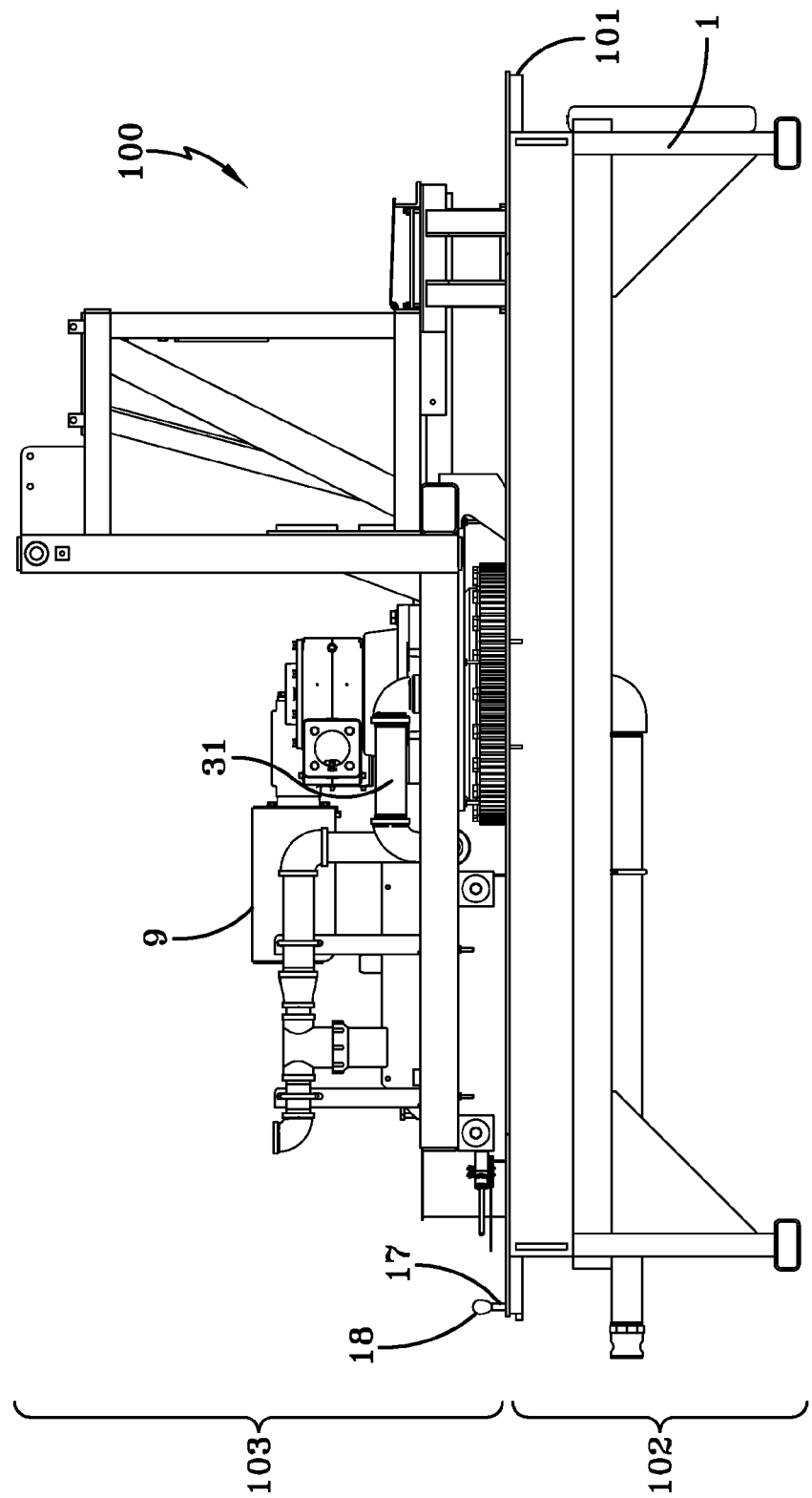
Figure 3D:
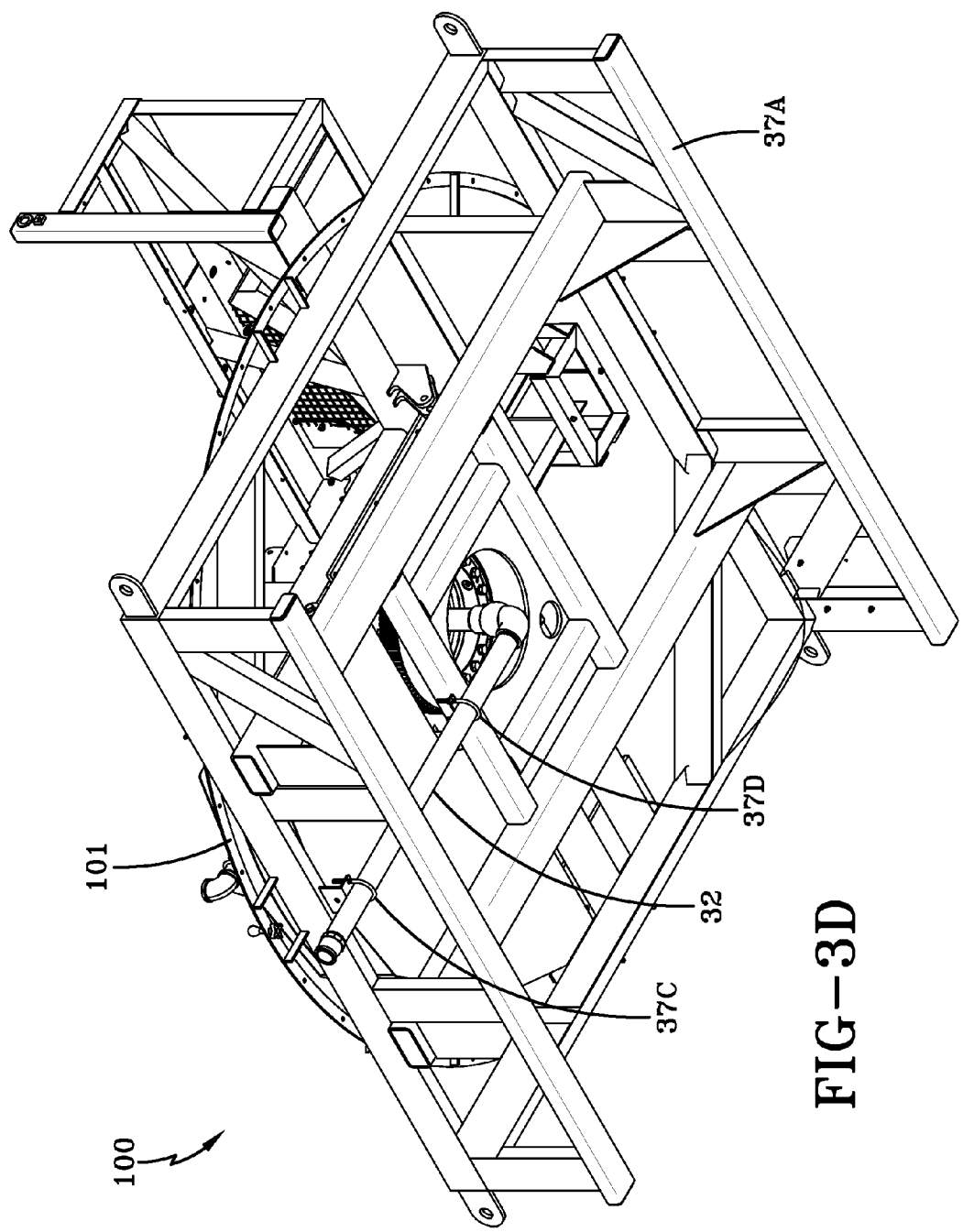

FIG. 3b shows a first side elevation view of the frame and swing assembly 100 shown in FIG. 3a showing the supply plumbing in place. FIG. 3c is a detail of FIG. 3a showing a portion of the supply plumbing. This view shows pipe nipple 33, line strainer 34, pipe nipple 35, pipe elbow 36 and pipe u-bolt 37a. FIG. 3d is a lower perspective view of the frame and swing drive assembly showing a portion of the supply plumbing, including nipple 32 held in place by pipe u-bolts 37c and 37d.

Figure 4A:
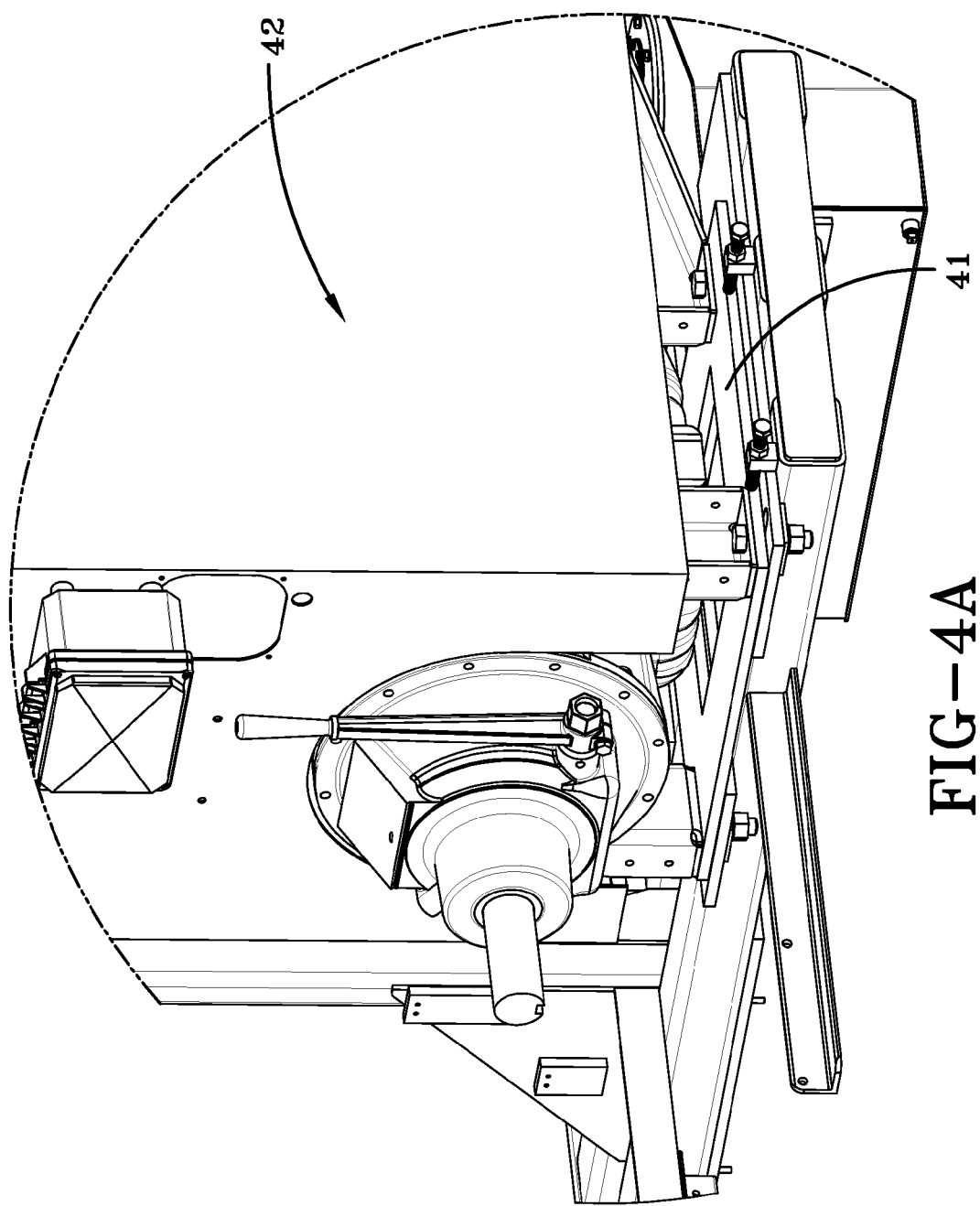
Figure 4B:
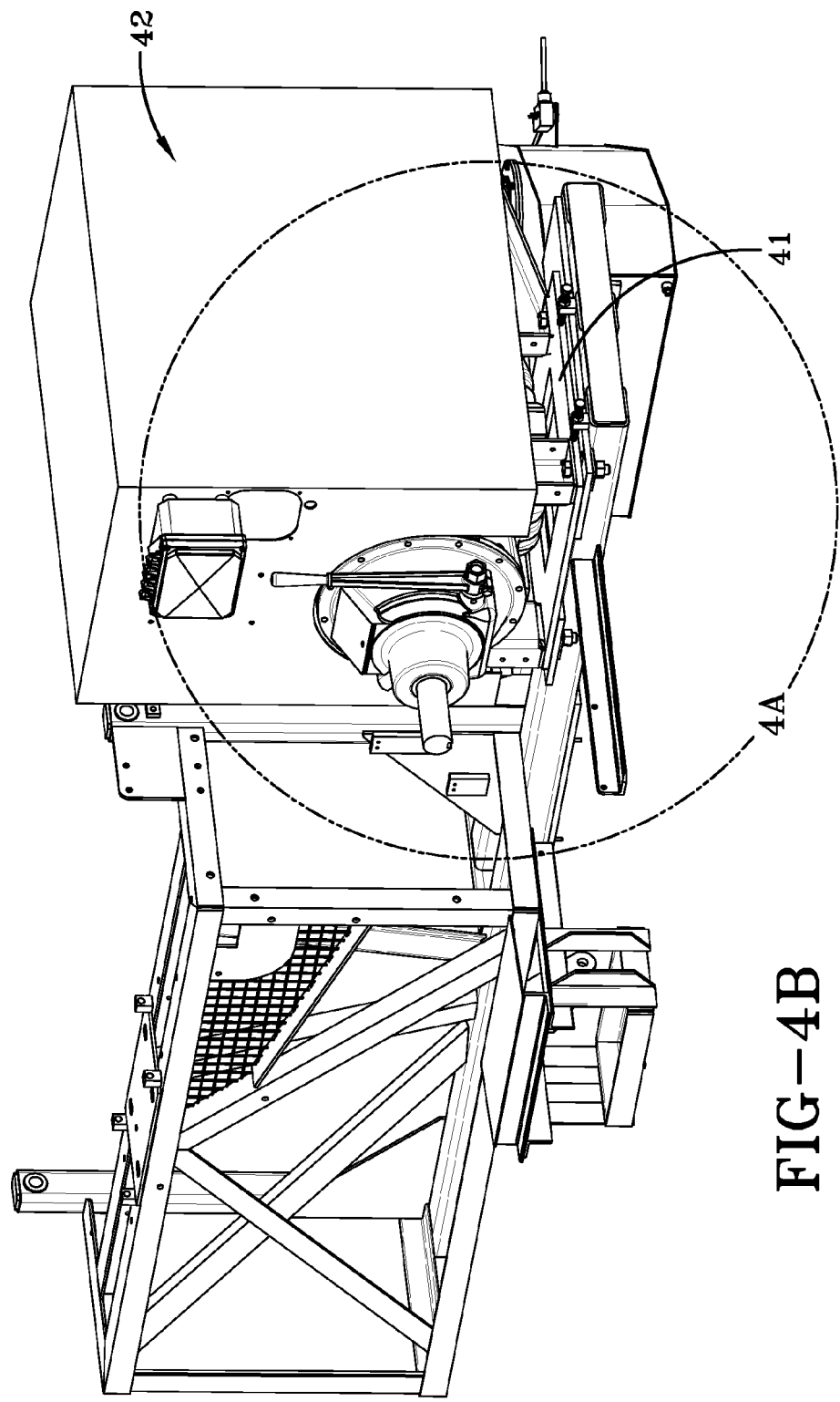

FIG. 4a is a detailed elevation view of the frame and swing drive assembly supporting the power unit 42 showing the mounting plate 41 of upper frame portion 103. FIG. 4a is a detailed perspective view (shown as detail A) of FIG. 4b which is a perspective view of upper frame portion 103 holding power unit 42. The power unit 42 may be any engine of sufficient power to drive the pump and fan portion of the apparatus. For example, the power unit 42 may be a Yanmar enclosed turbo power unit, or other diesel or other internal combustion engine.

Figure 4D:
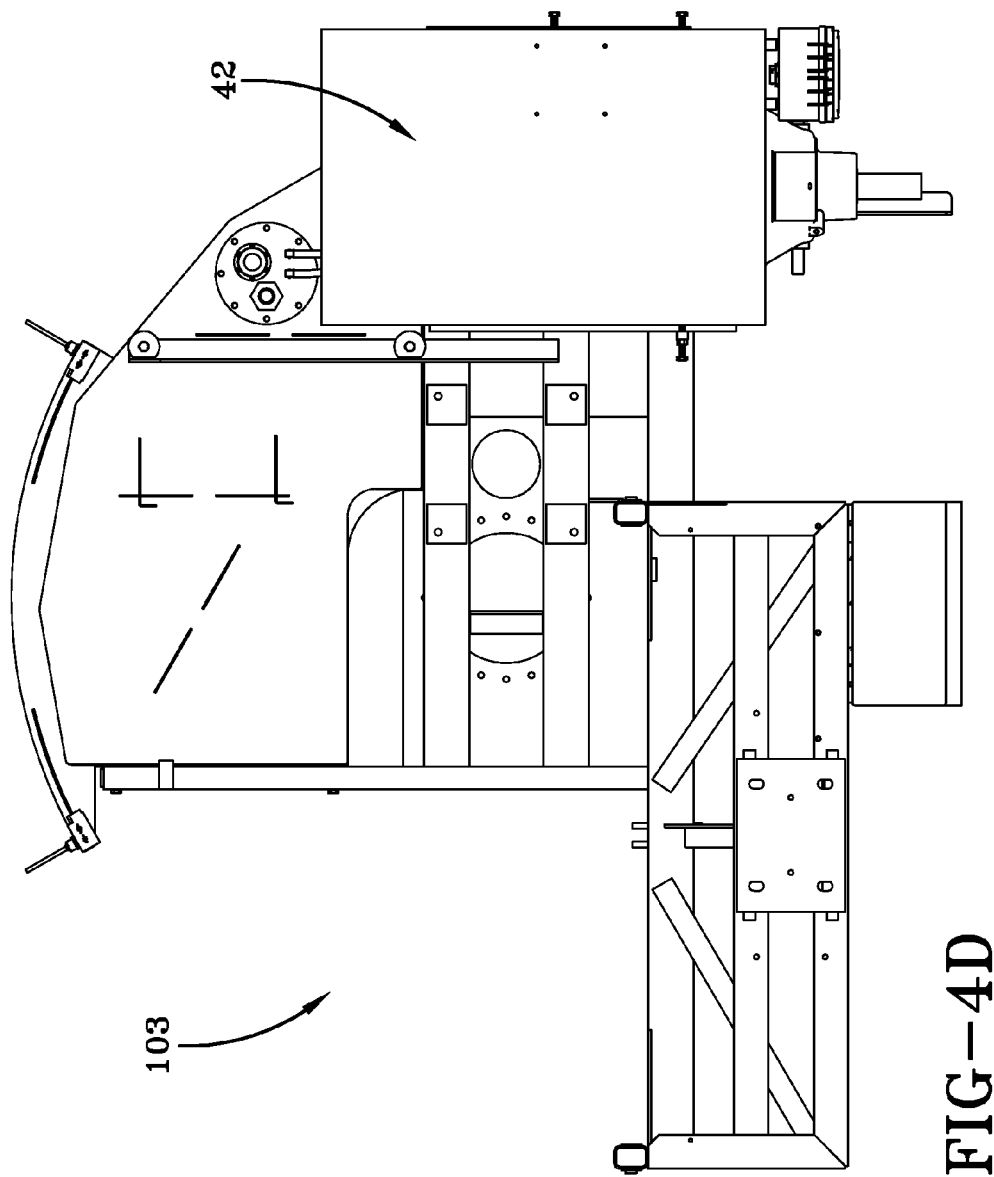

FIG. 4d is a top plan view of the frame and swing drive assembly supporting the power unit 42 mounted on upper frame portion 103.

FIG. 4c is a lower perspective view of upper frame portion 103 holding power unit 42.

Figure 4E:
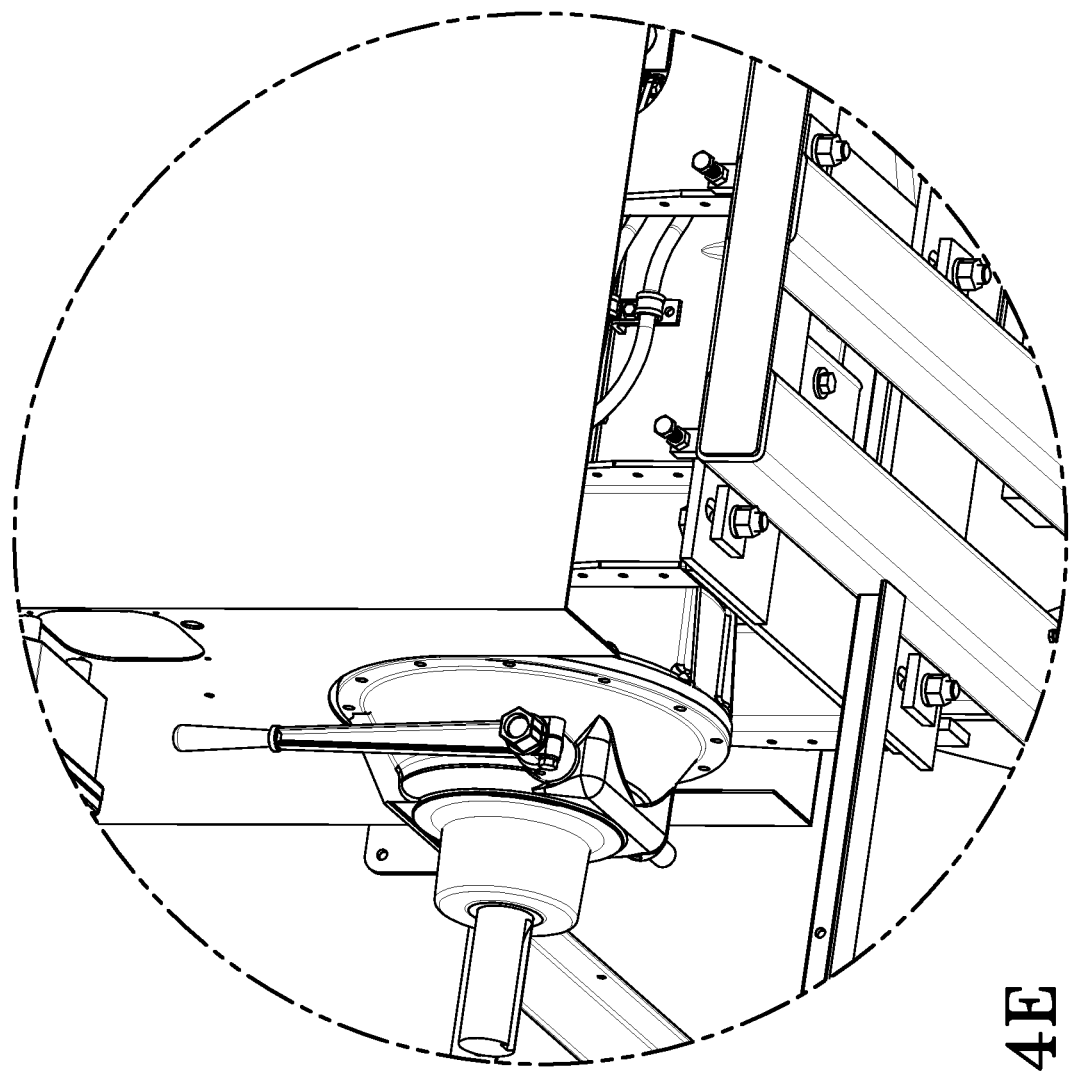

FIG. 4e is a detailed lower perspective view (shown as detail B) of FIG. 4c which also shows a perspective view of upper frame portion 103 holding power unit 42.

FIG. 4f is another lower perspective view of upper frame portion 103 holding power unit 42.

Figure 4G:
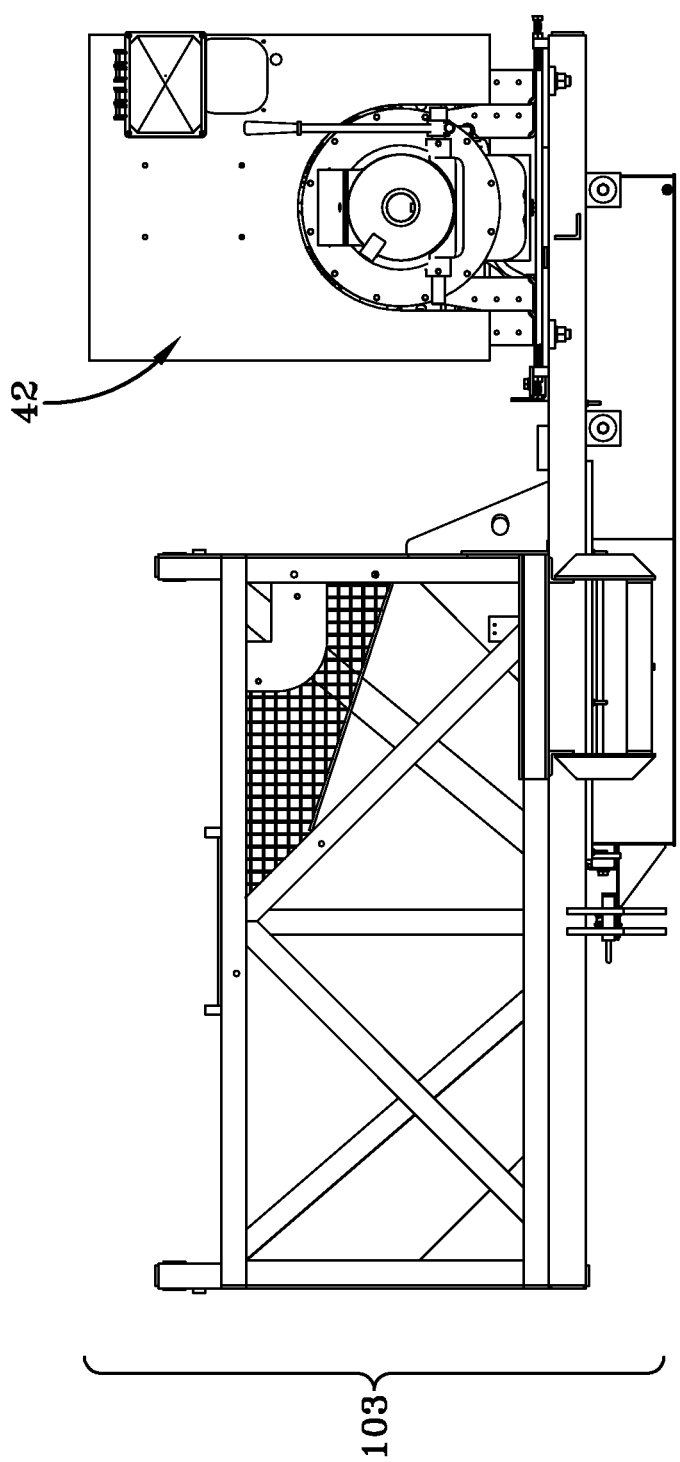

FIG. 4g is a first lateral elevation view of upper frame portion 103 holding power unit 42.

Figure 4H:
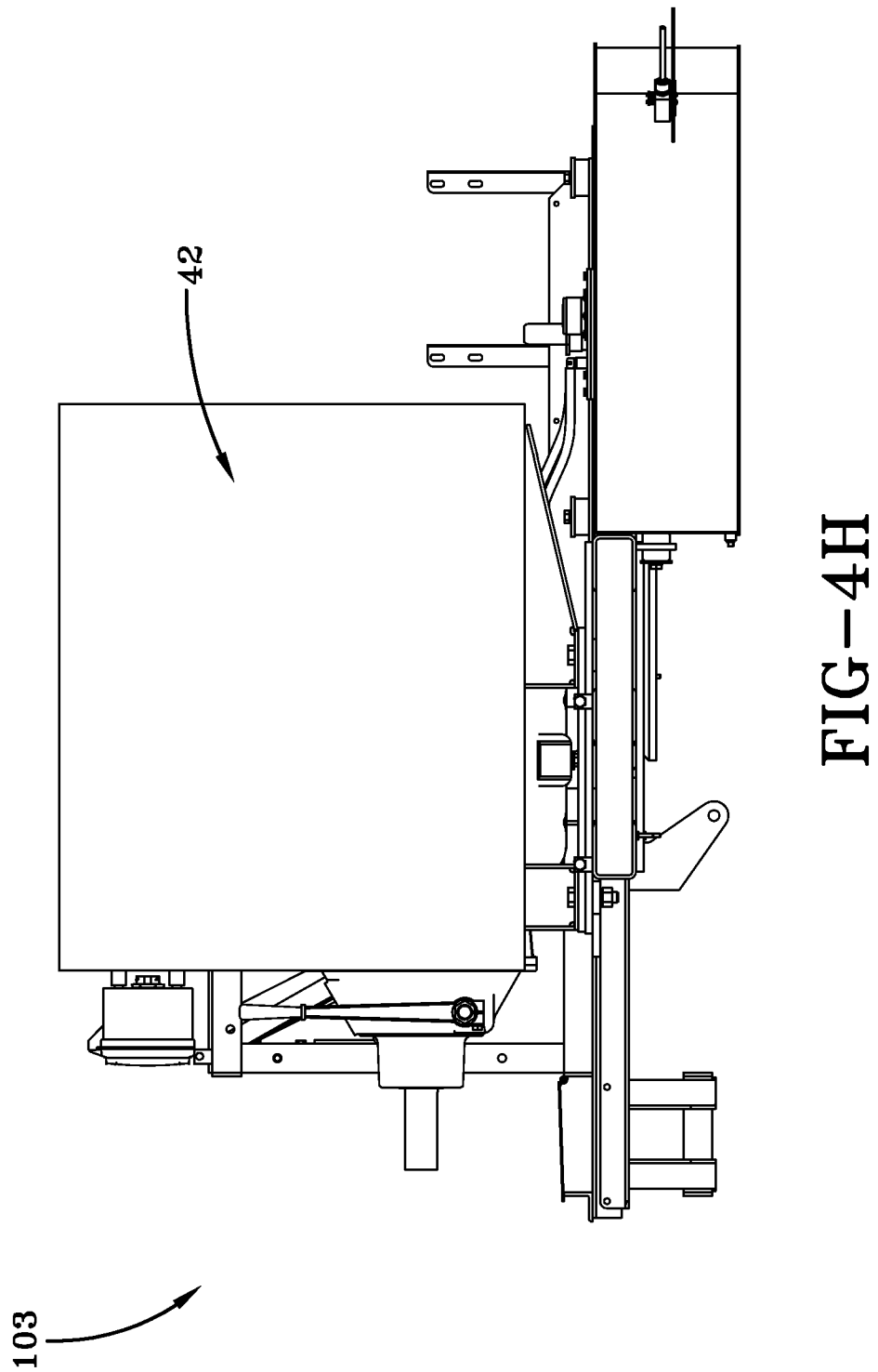

FIG. 4h is a first lateral elevation view of upper frame portion 103 holding power unit 42.

Figure 4I:
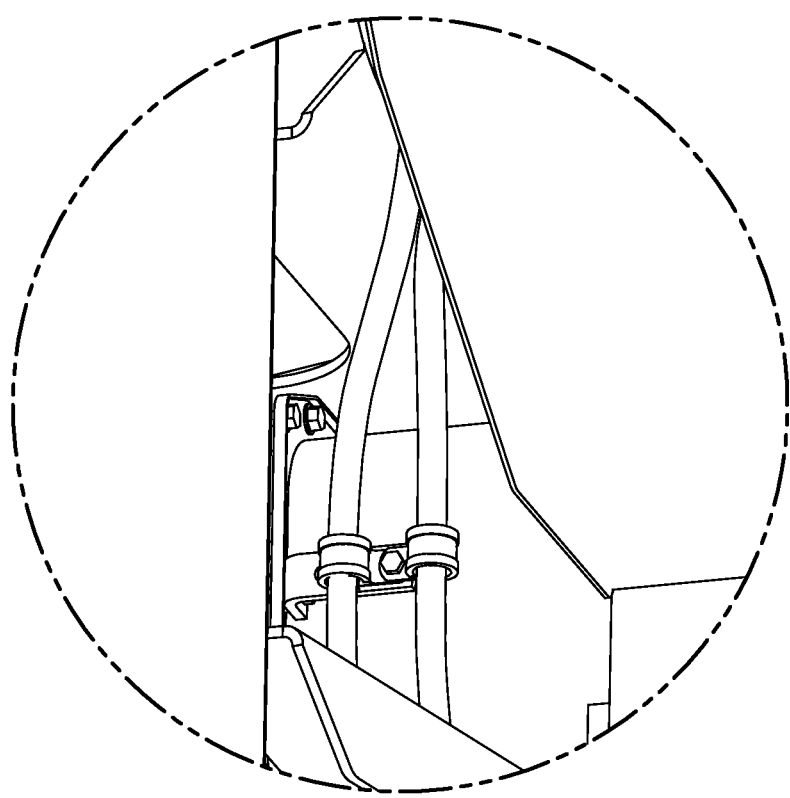

FIG. 4i is a detailed lower perspective view (shown as detail C) of FIG. 4f which also shows a lower perspective view of upper frame portion 103 holding power unit 42 giving a more detailed view of bracket weldment 49.

The power unit 42 may be affixed to the upper frame portion 103 by any appropriate means, typically by bolts or screws of sufficient size to fix and hold the power unit onto the upper frame portion 103 during its movement along with the balance of the operative portions riding on upper frame portion 103.

FIG. 5e is an upper perspective view of upper frame portion 103 holding fan assembly 52, supported by fan support weldment 51 of upper frame portion 103, and fan inlet screen weldment 53.

Figure 5B:
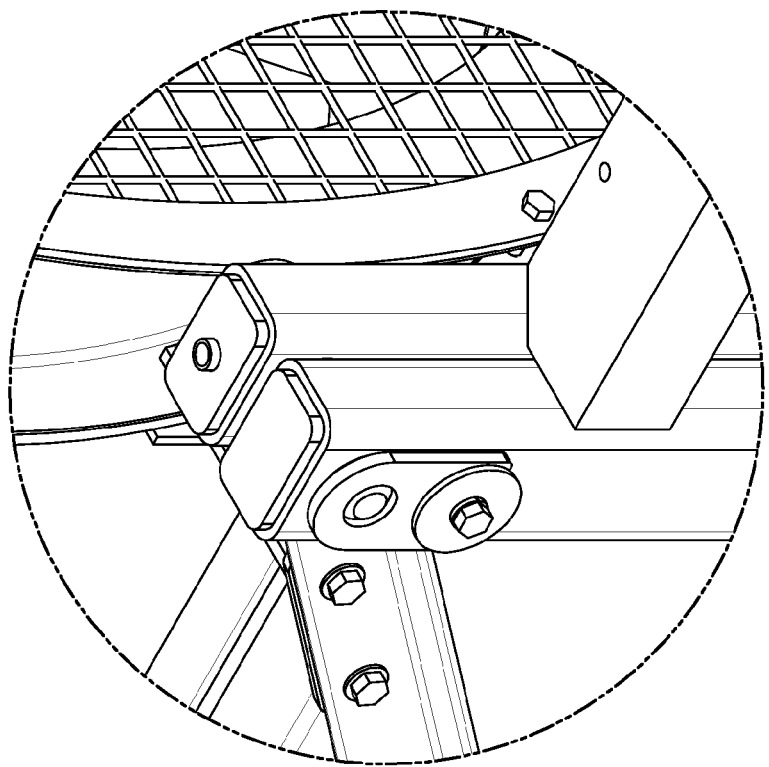
Figure 5A:
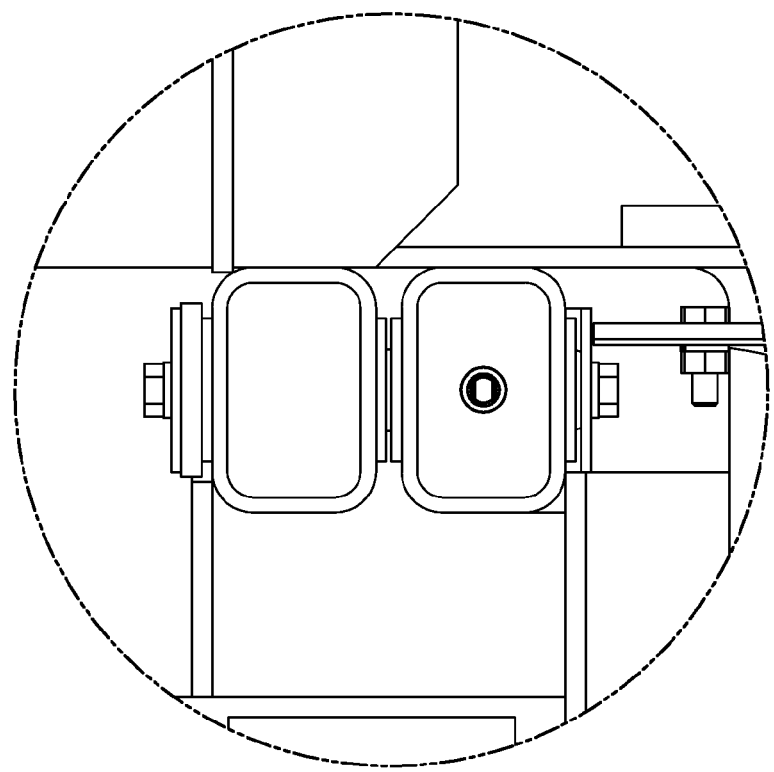
Figure 5C:
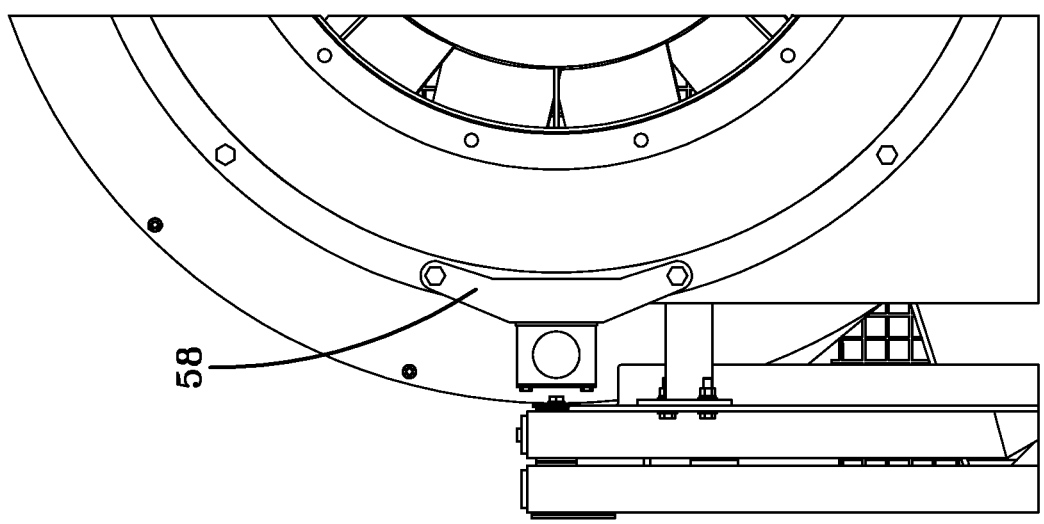
Figure 5F:
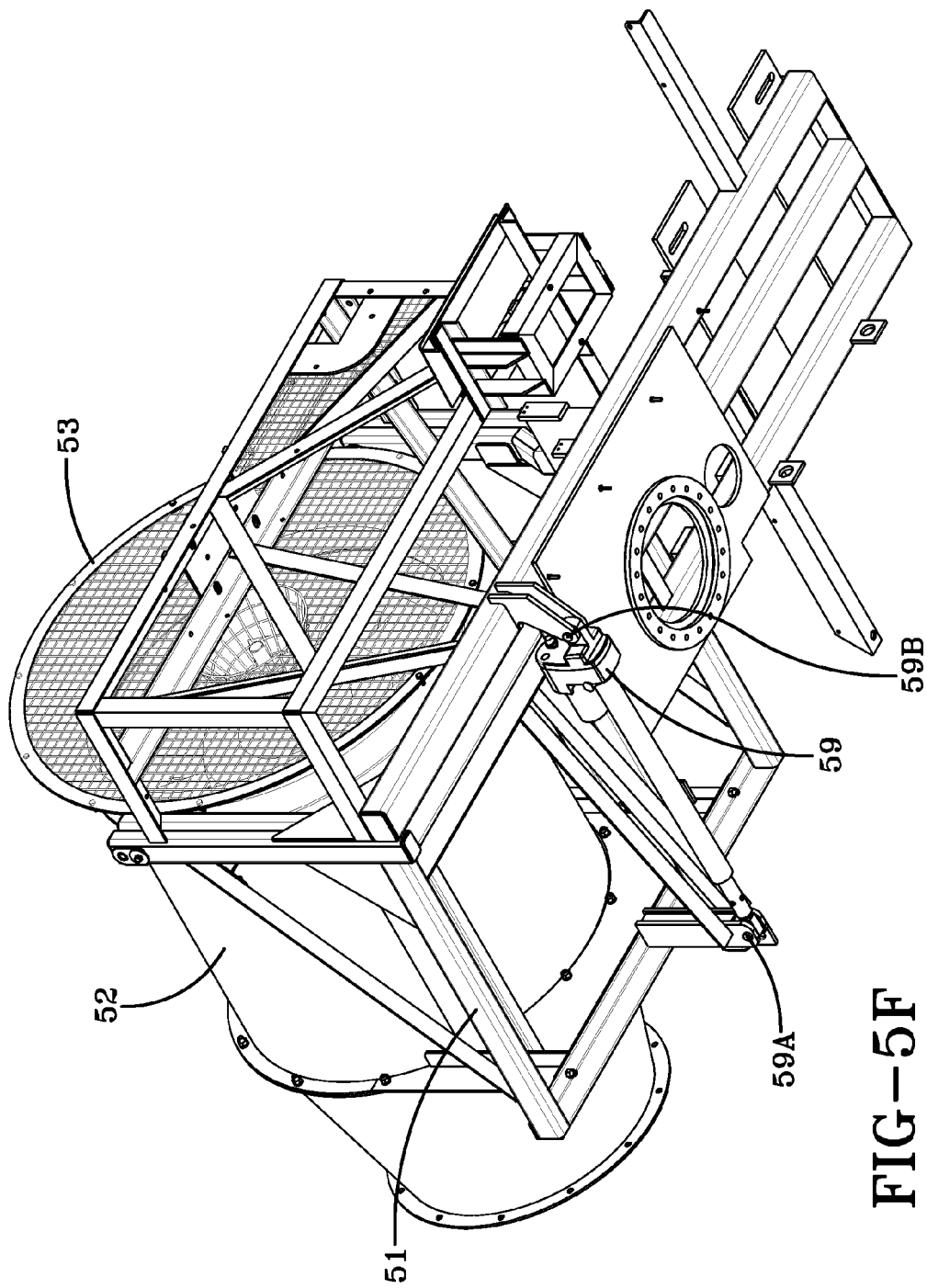
Figure 5G:
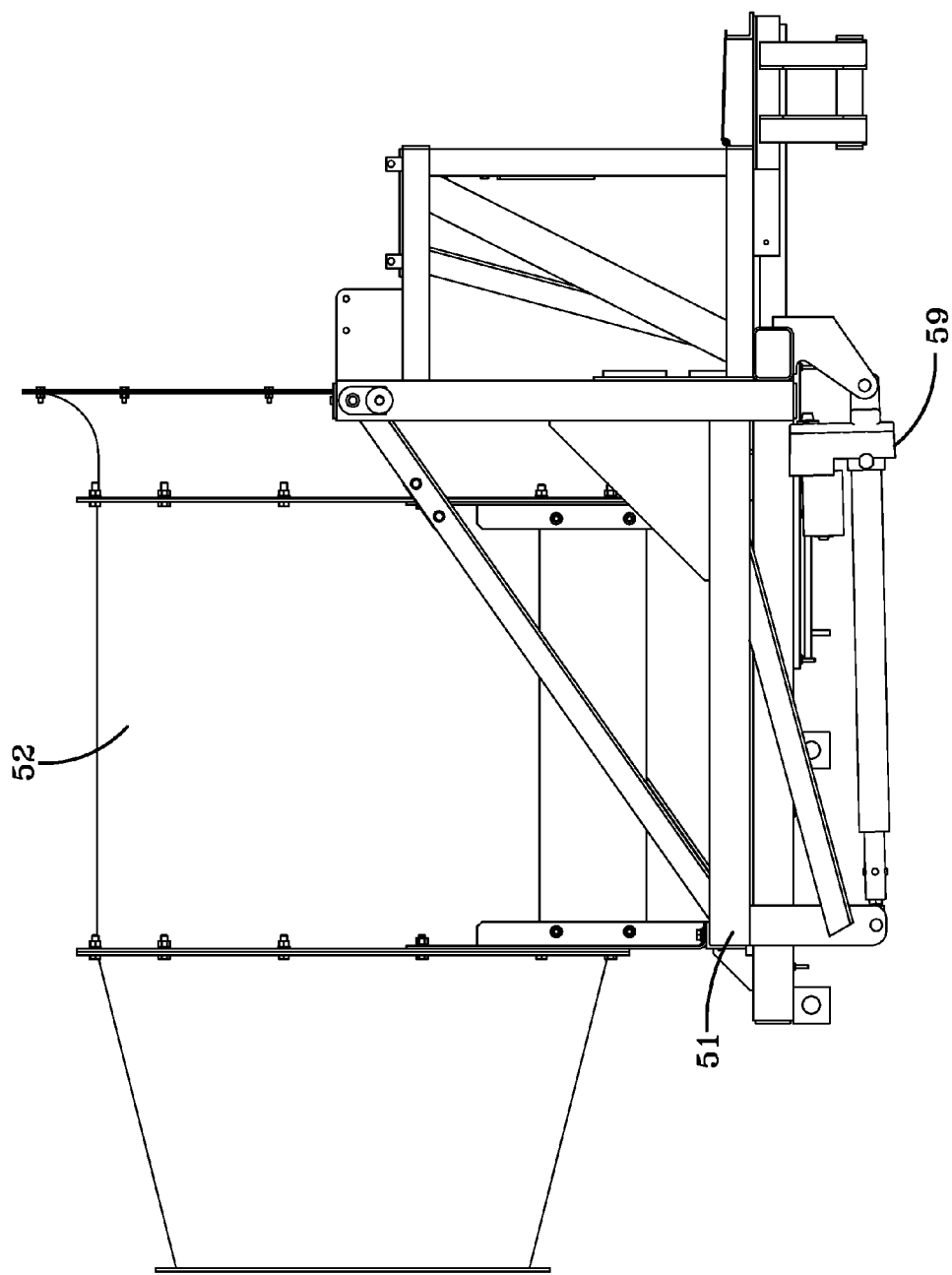

FIG. 5g is a first lateral elevation view of fan assembly 52 on fan support weldment 51. This view shows the position of non-linear actuator 59.

FIG. 5f is a lower perspective view of upper frame portion 103 holding fan assembly 52 on fan support weldment 51. This view also shows the position of non-linear actuator 59 in more detail, which is attached and adapted to tilt the fan assembly with respect to the horizontal, such as by linkages 59a and 59b.

FIG. 5d is a top plan view of the fan assembly 52 mounted on fan support weldment 51 of upper frame portion 103.

FIG. 5c is a detailed sectioned view (shown as detail D-D) of FIG. 5d which also shows hose clamp weldment 58 of fan assembly 52.

FIG. 5a is a detailed plan view (shown as detail C) of FIG. 5d which also shows a detailed view of the subject attachment of the fan assembly 52 to the upper frame portion 103.

FIG. 5b is a detailed perspective view (shown as detail B) of FIG. 5e which also shows a detailed view of the subject attachment of the fan assembly 52 to the upper frame portion 103.

Figure 6A:
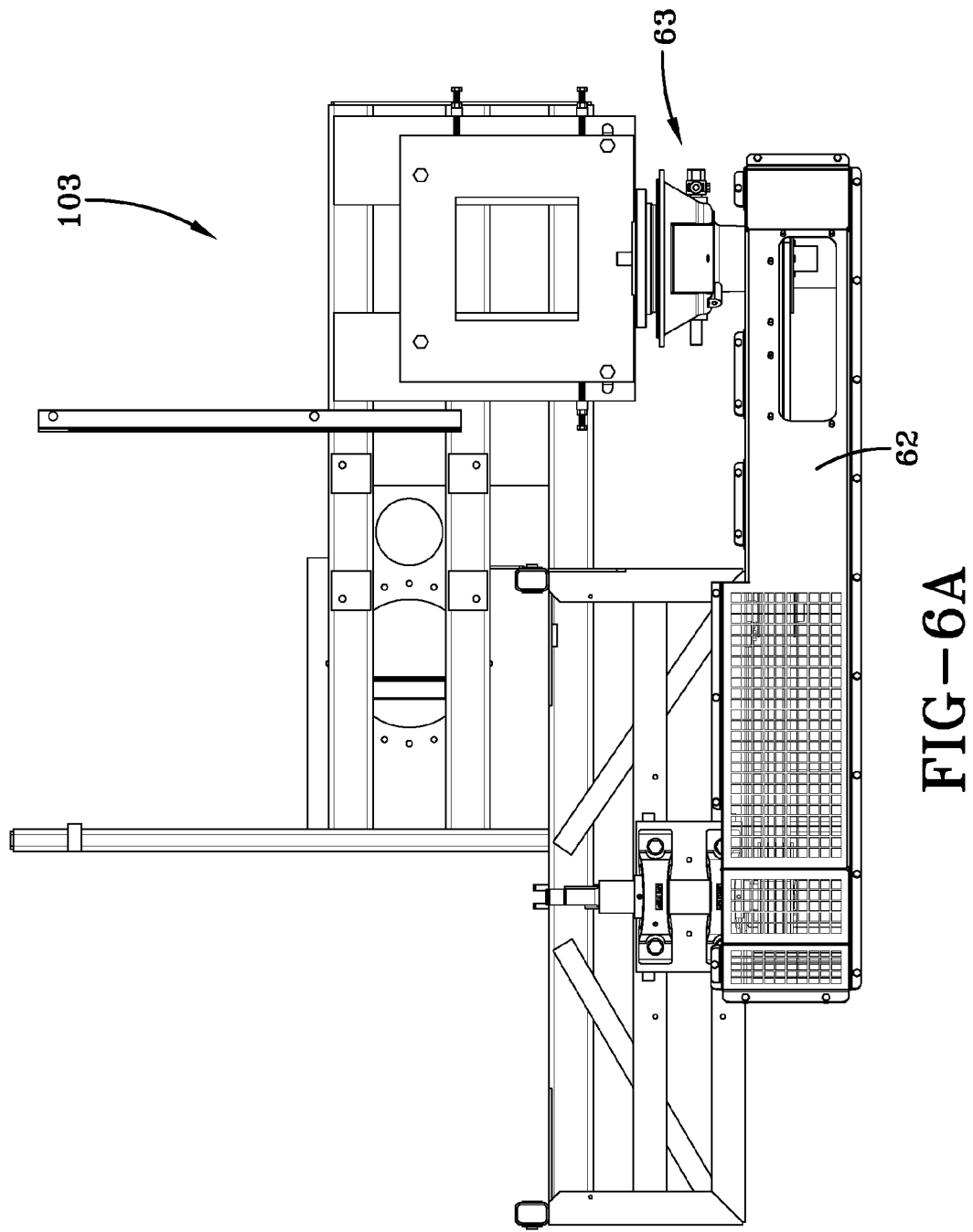
Figure 6B:
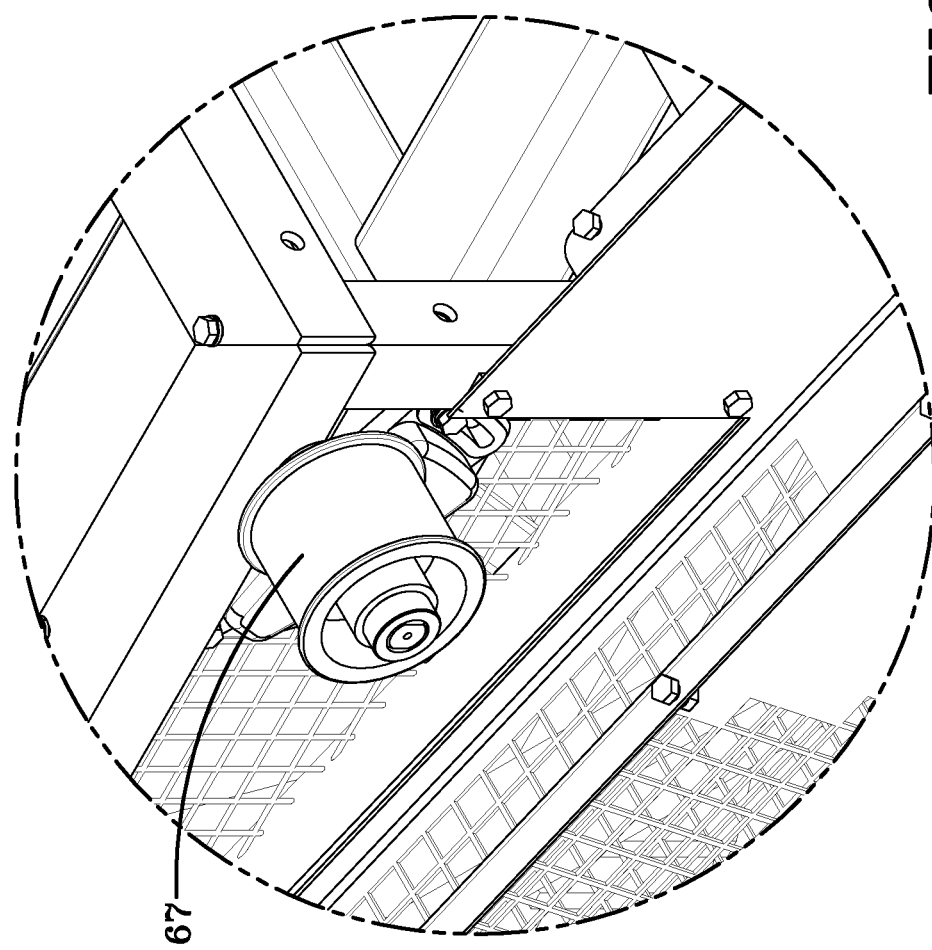
Figure 6C:
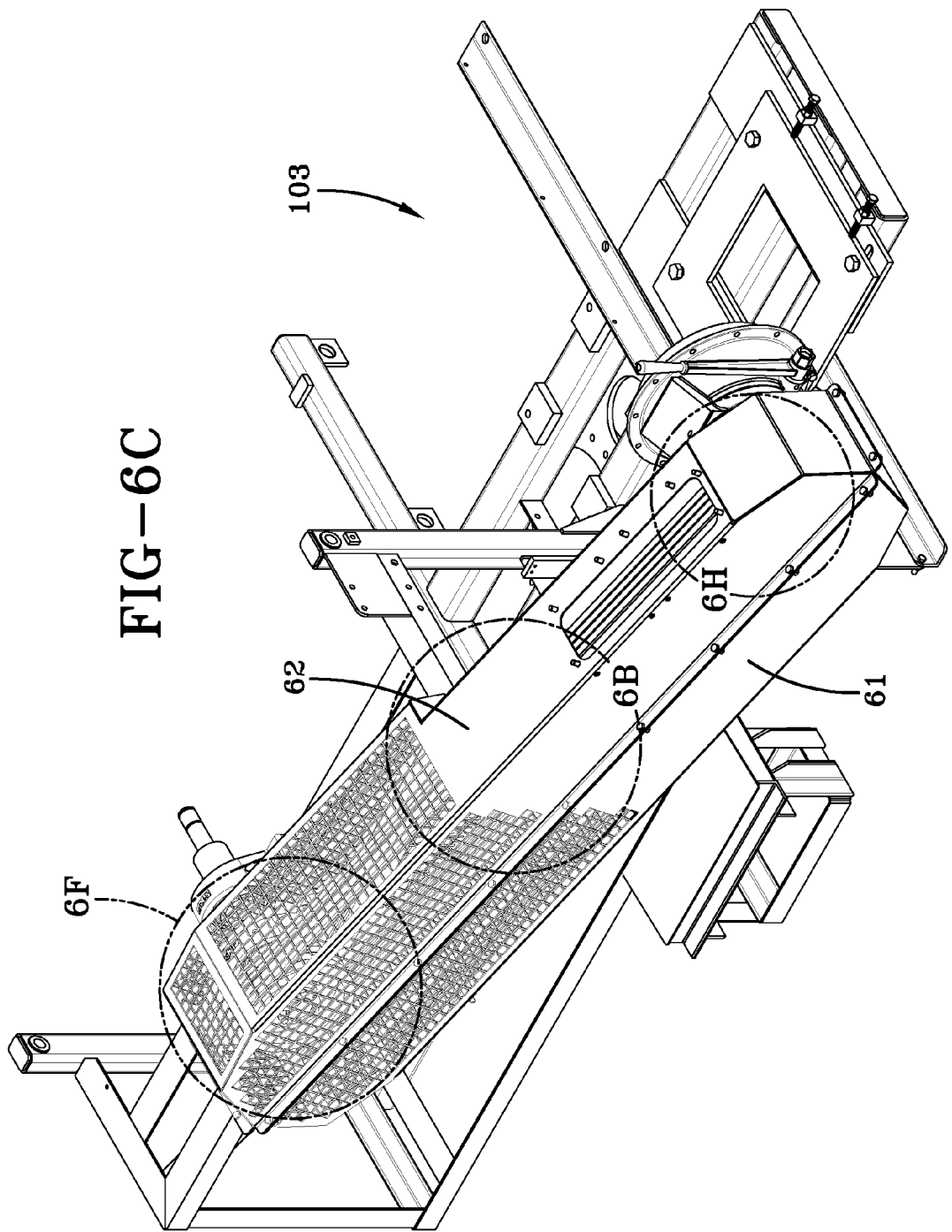

FIG. 6c is an upper perspective view of upper frame portion 103 holding the fan drive and guard assembly. This view shows lower guard weldment 61 and upper guard weldment 62, a portion of the assembly being provided with an air passage, such as by being made in part of a perforated or screen-like material, to allow air flow upstream of the fan assembly.

FIG. 6a is a top plan view of lower guard weldment 61 on upper frame portion 103. This view also shows the position of fan drive power take-off 63.

Figure 6E:
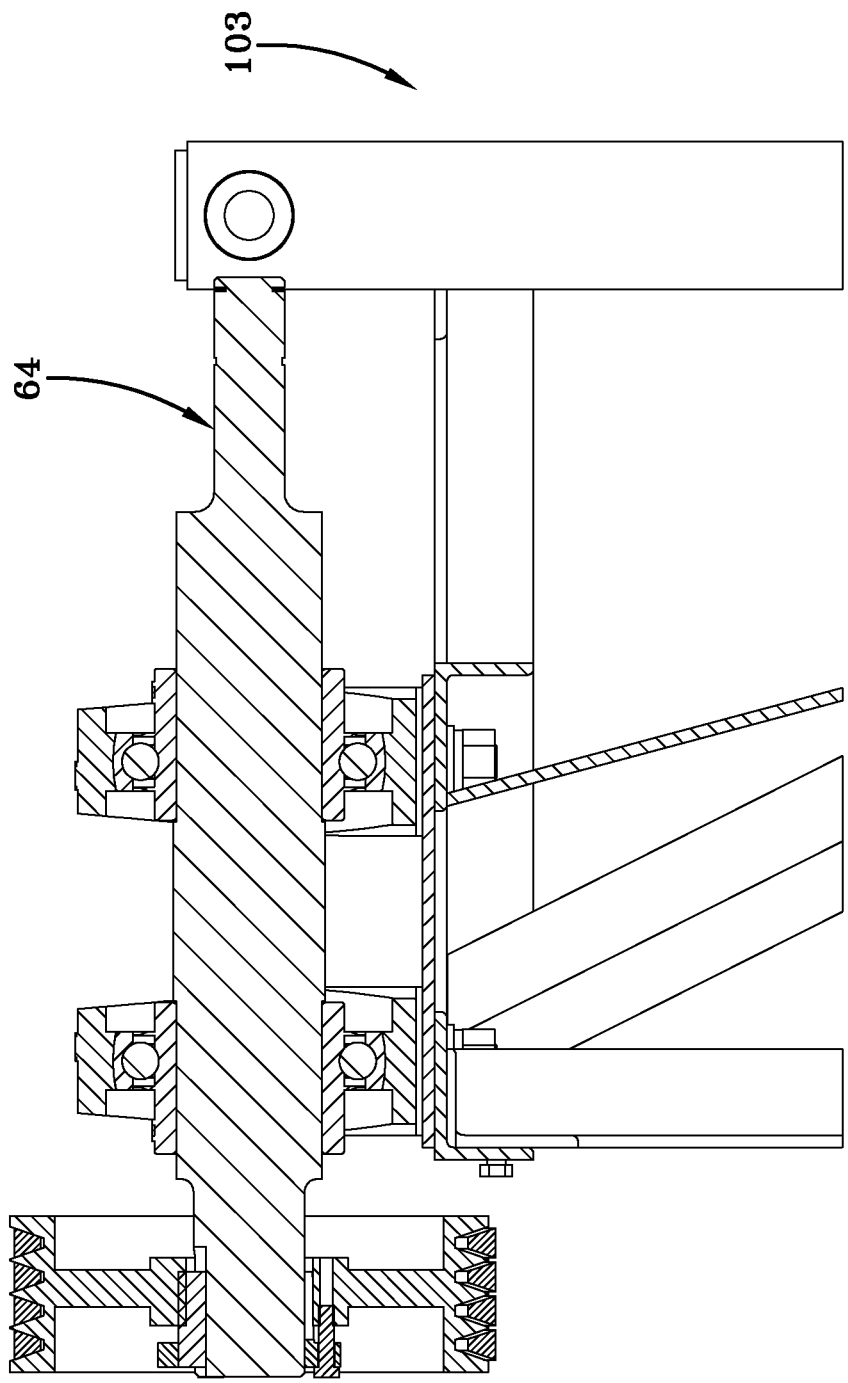
Figure 6F:
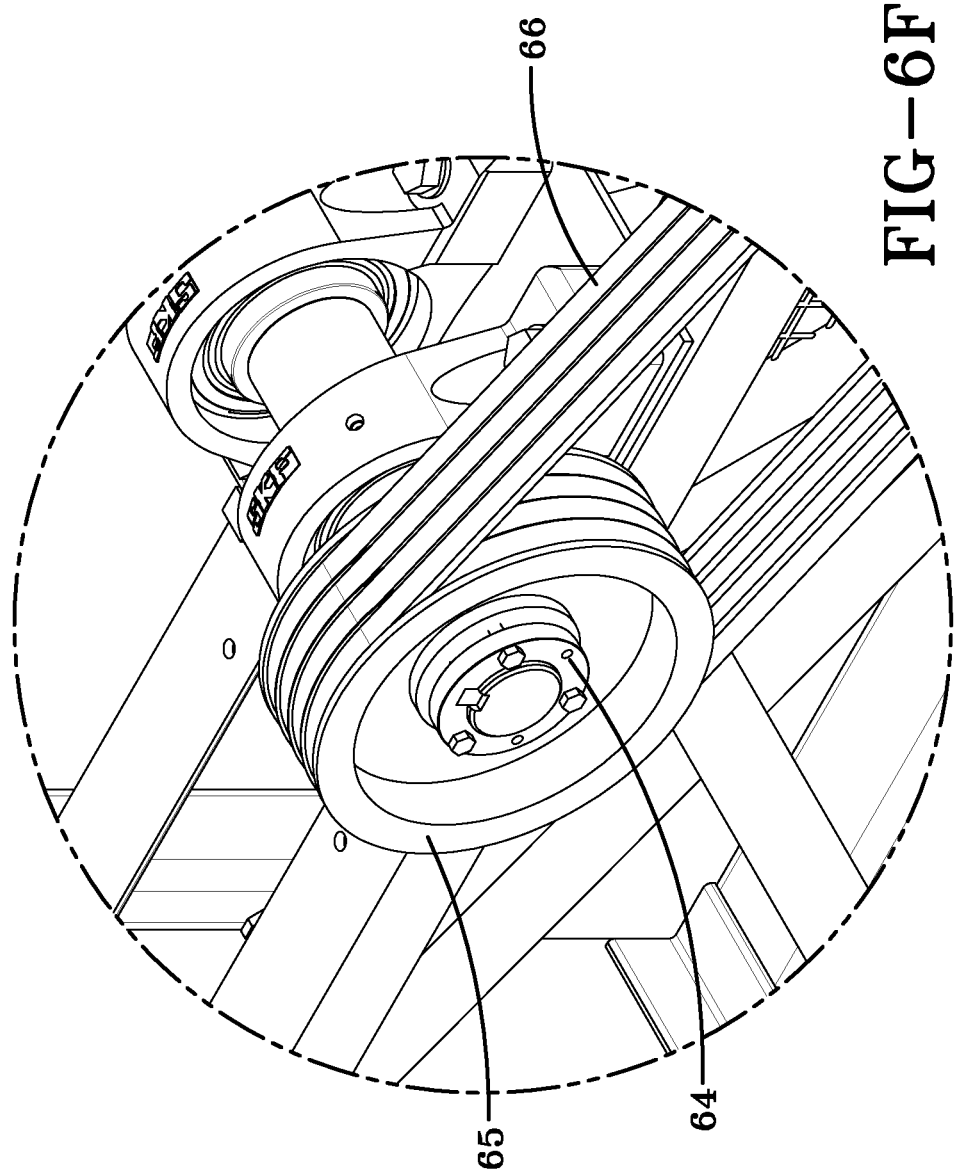
Figure 6I:
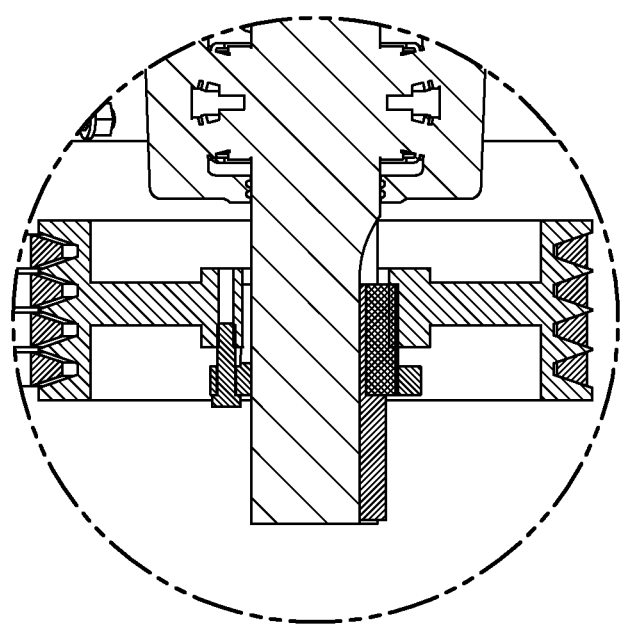
Figure 6H:
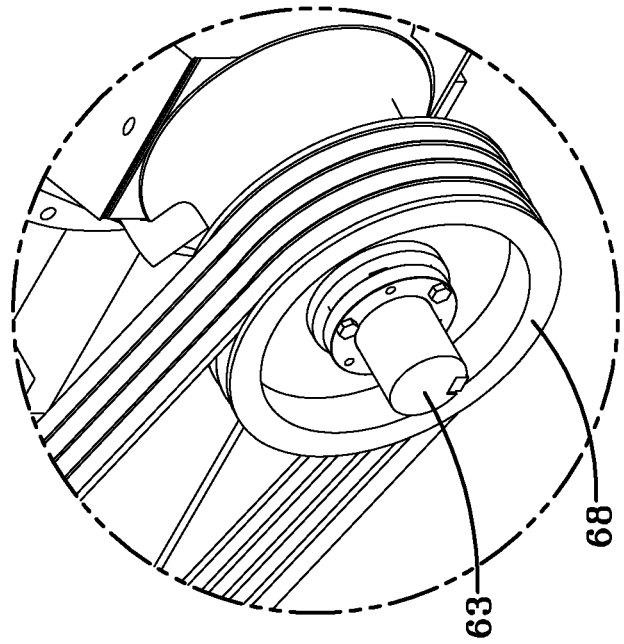
Figure 6J:
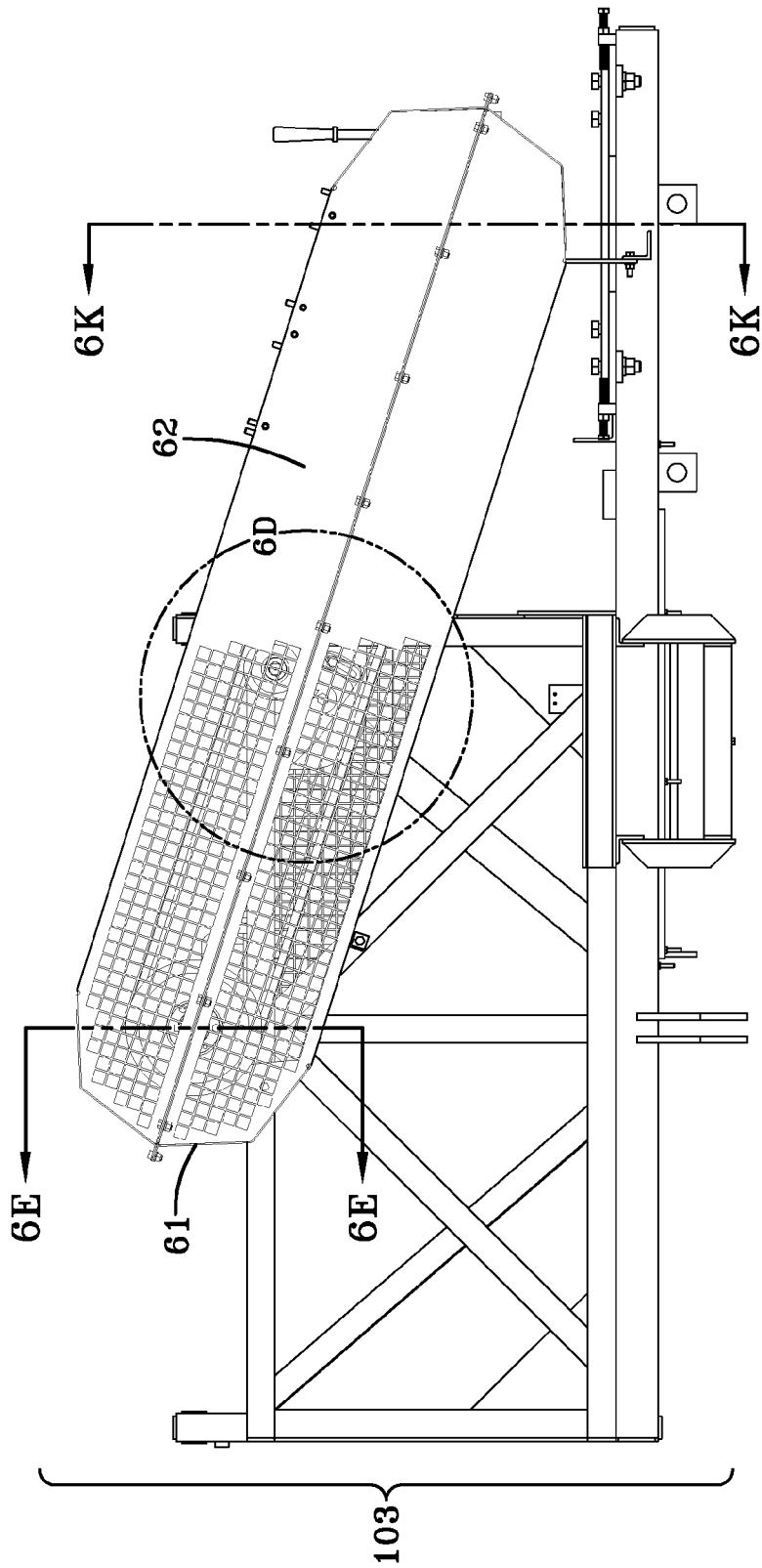

FIG. 6j is a first lateral elevation view of upper frame portion 103 holding the fan drive and guard assembly. This view shows lower guard weldment 61 and upper guard weldment 62.

FIG. 6g is a sectioned view (taken along A-A) of FIG. 6j which also shows power take-off 63, lower guard weldment 61 and upper guard weldment 62.

FIG. 6e is a sectioned view (taken along D-D, with the guard removed) of FIG. 6j which also shows fan drive power take-off 63, lower guard weldment 61 and upper guard weldment 62. This view shows split taper bushing on fan drive shaft 64.

FIG. 6f is a detailed perspective view of fan drive shaft 64, fan drive pulley 65 and drive belt 66, as would be visible with the guard removed.

FIG. 6b is a detailed perspective view (shown as detail G of FIG. 6c) which also shows belt guide 67 with the guard removed.

FIG. 6d is a detailed elevation view (shown as detail F of FIG. 6j) which also shows belt guide 67 and drive belt 66, as would be visible with the guard removed.

FIG. 6h is a detailed perspective view (shown as detail C of FIG. 6c) which also shows power take-off 63, power take-off pulley 65 and drive belt 66, as would be visible with the guard removed.

FIG. 6k is a second lateral elevation view of upper frame portion 103 holding the fan drive and guard assembly. This view also shows power take-off 63, lower guard weldment 61 and upper guard weldment 62.

Figure 7A:
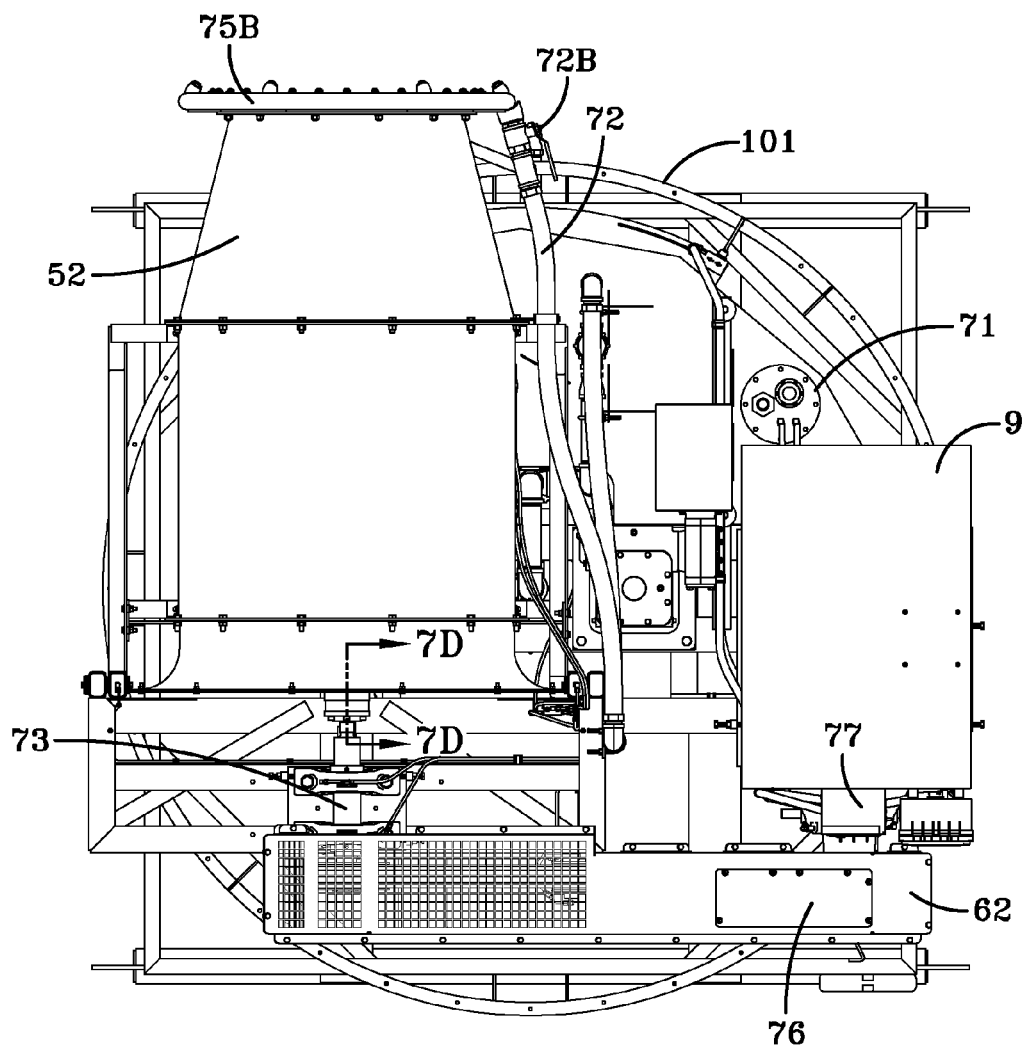
FIGS. 7a-7k are various views the frame assembly for a dust suppression apparatus with mounted with mounted engine, fan assembly, and fan drive and guard assembly, in accordance with one embodiment of the present invention.
Figure 7B:
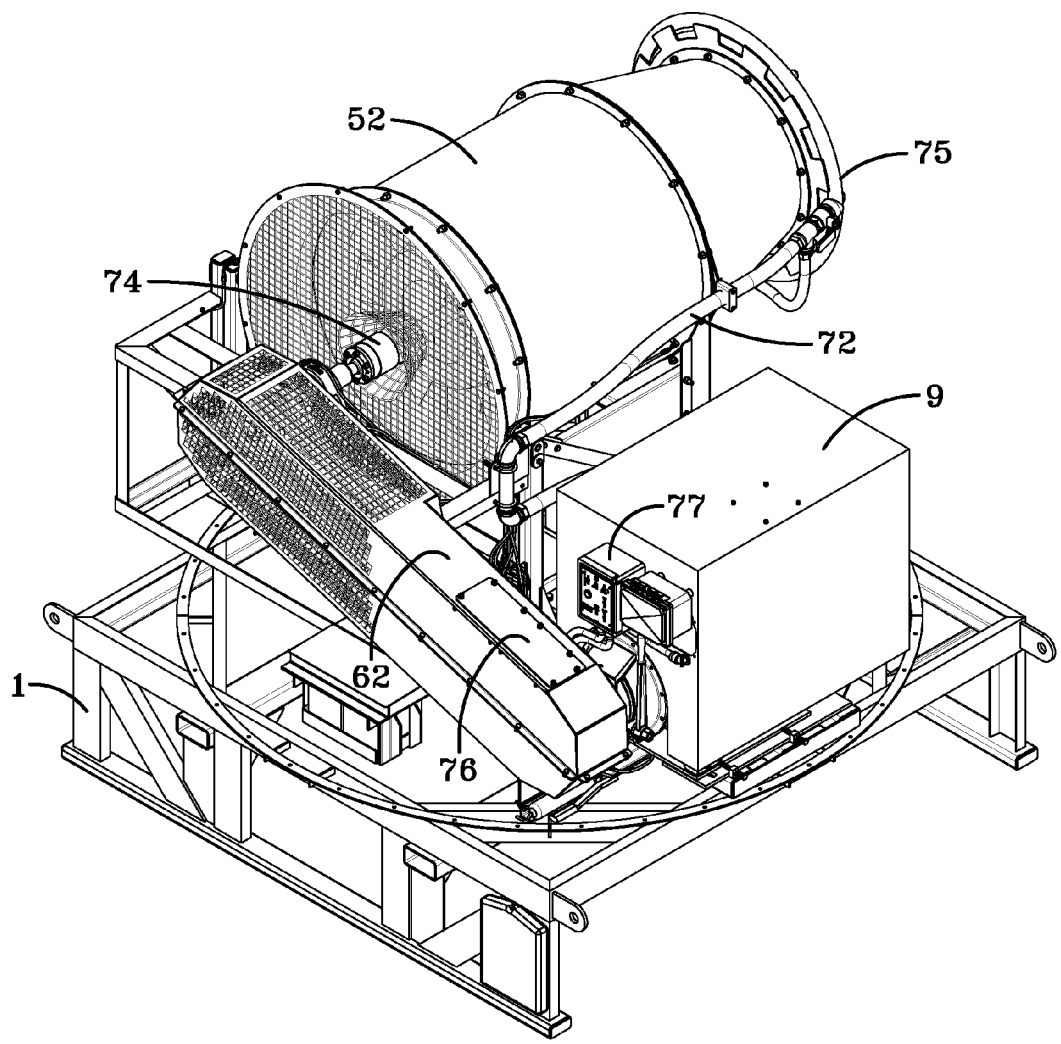

FIG. 7b is a top perspective view of the fully assembled operative portion of the apparatus using like numerals to refer to the components described herein. This view additionally shows fuel tank 71, water supply line 72, constant velocity joint 74, primary nozzle ring assembly 75, secondary nozzle ring assembly 75b, optional cover plate 76 in the upper guard weldment 62. Nozzle ring assembly 75 (which may optionally comprise multiple nozzle rings being separately valved to be independently supplied with water), is served by a water conduit 72 which is supplied with water from either a municipal, well or tank water source. Also shown is control panel 77.

FIG. 7a is a top plan view of the assembled operative portion of the apparatus using like numerals to refer to the components described herein. Also shown is jackshaft 73.

Figure 7C:
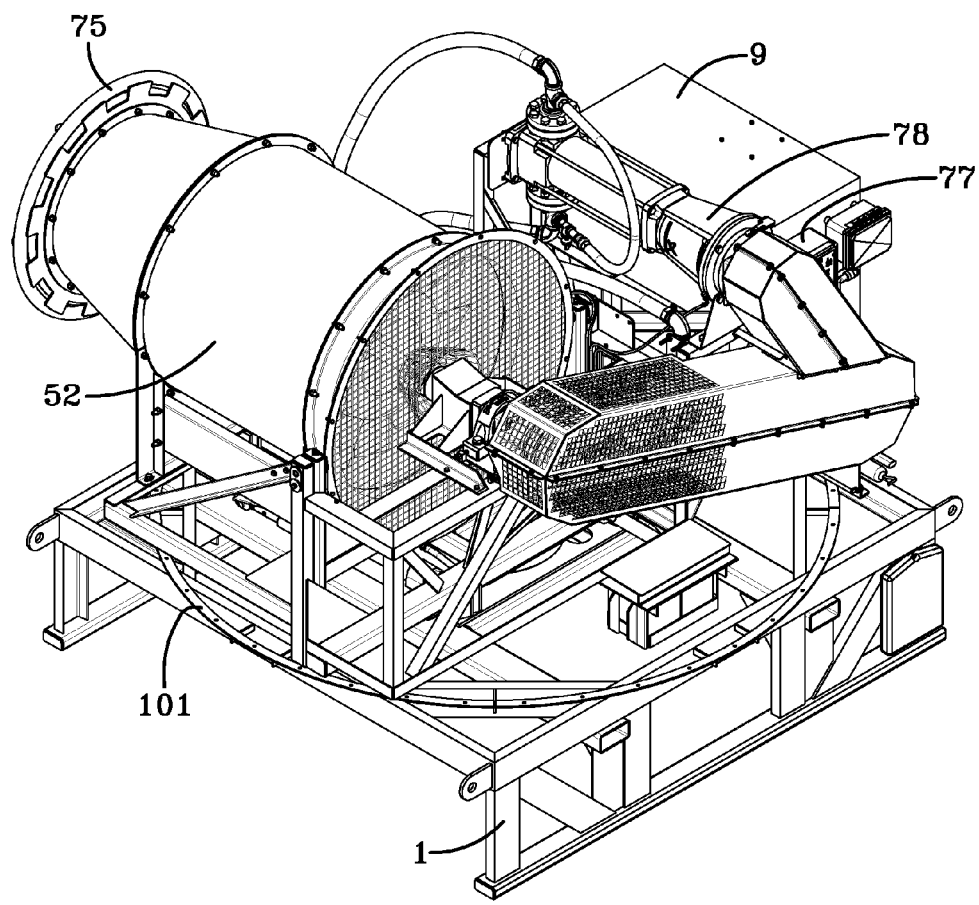

FIG. 7c is a top perspective view of the fully assembled operative portion of the apparatus using like numerals to refer to the components described herein, and additionally showing optional booster pump 78 that may be used to take additional power from belt drive 66 to provide additional pressure where the water source itself is at low pressure, and/or to supply additional water pressure as needed to the optional secondary nozzle ring. This may be added by opening optional cover plate 76 to allow the booster pump 78 to engage power take-off 63 and power take-off pulley 65 to provide additional power to drive belt 66.

Figure 7D:
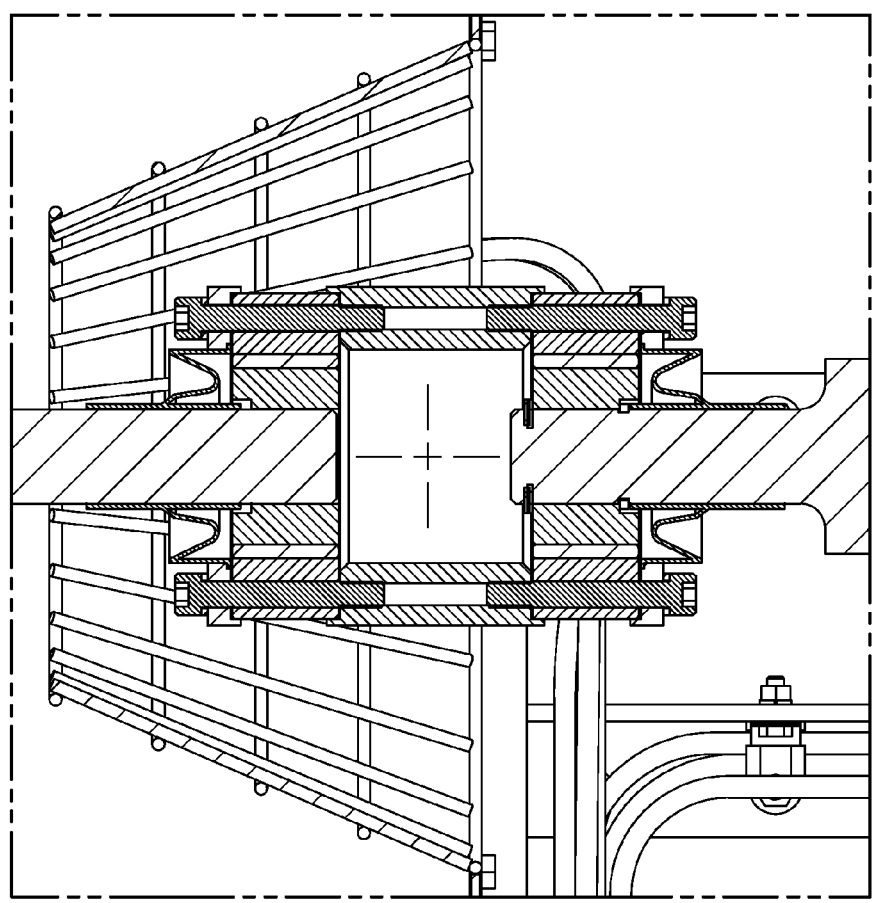

FIG. 7d is a sectioned view (taken along A-A) of FIG. 7a, and showing detailed view of the jack shaft 73 and fan shaft of the constant velocity joint 74 assembly.

Figure 7E:
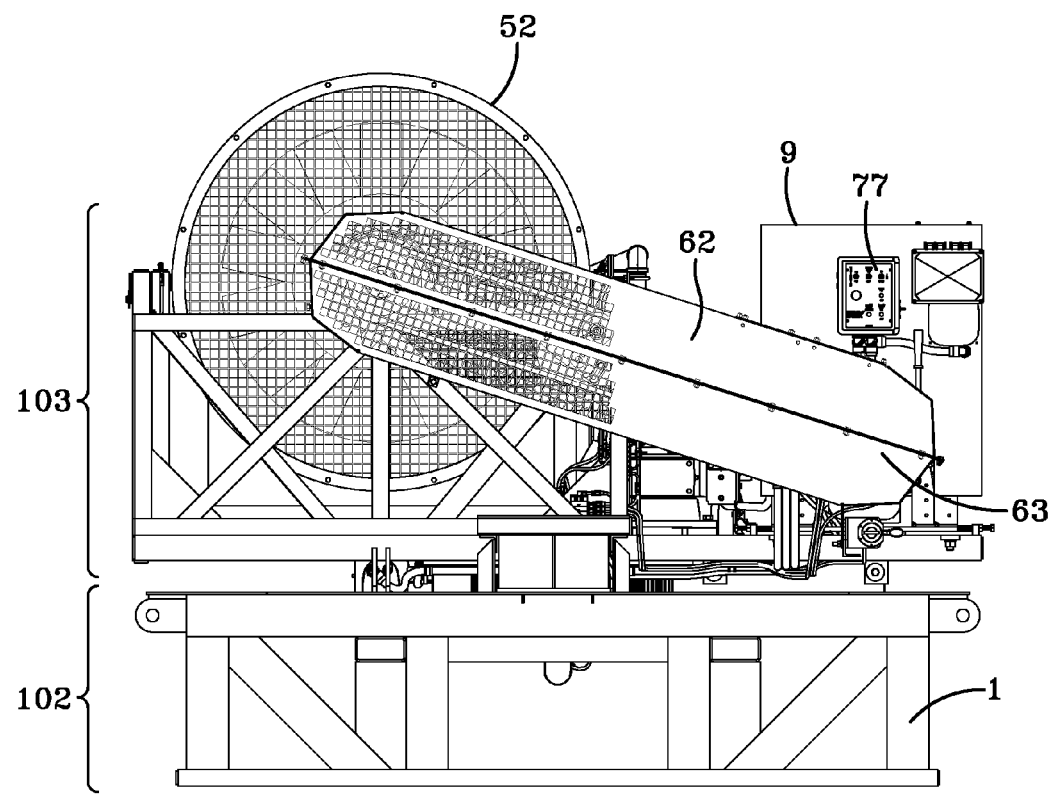

FIG. 7e is a first lateral elevation view of the assembled operative portion of the apparatus using like numerals to refer to the components described herein.

Figure 7F:
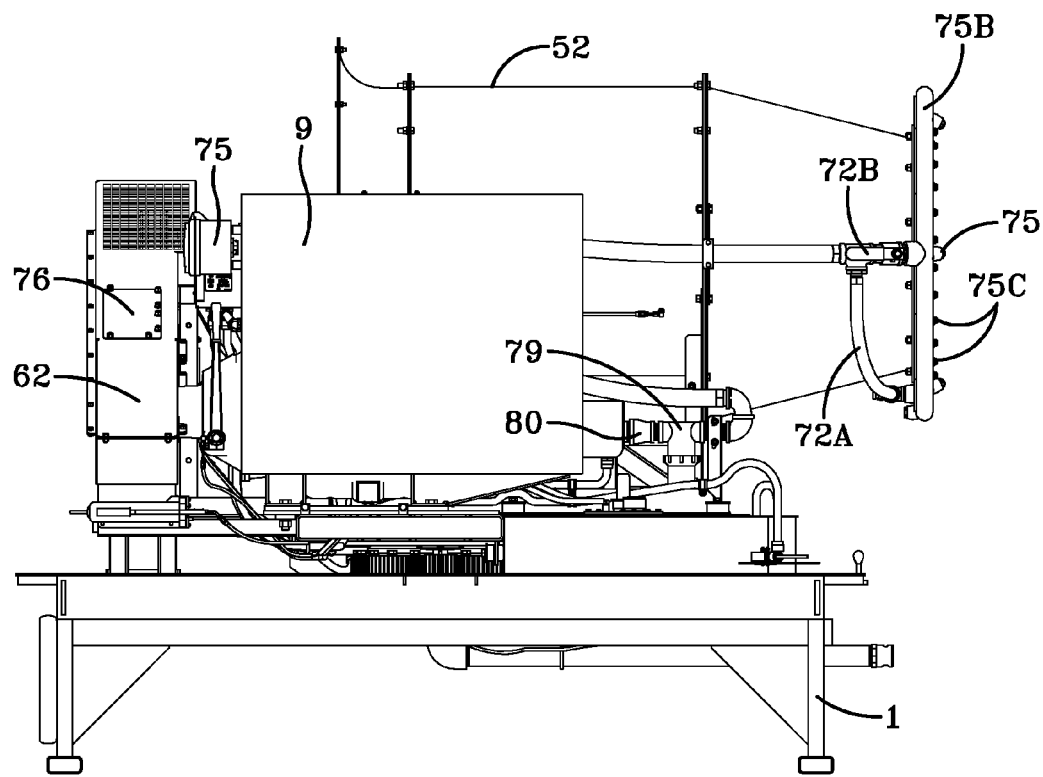

FIG. 7f is a second lateral elevation view of the assembled operative portion of the apparatus using like numerals to refer to the components described herein. This view shows additional supply plumbing line installation 79 and supply plumbing sub-assembly 80. Primary water supply line 72 supplies primary nozzle ring assembly 75 (not shown in this view) by action of valve 72b. This view also shows optional secondary water supply line 72a that may be engaged to supply a second nozzle ring 75b by action of valve 72b. For instance, primary water supply line 72 may supply primary nozzle ring assembly 75 having for instance 30 relatively smaller nozzles 75c with sufficient water to dispense about 12-23 gallons per minute, while optional secondary water supply line 72a may be engaged to supply a second nozzle ring 75b having for instance 6 relatively larger nozzles with sufficient water to dispense up to about 72-137 gallons per minute total with both nozzle sets engaged.

Figure 7G:
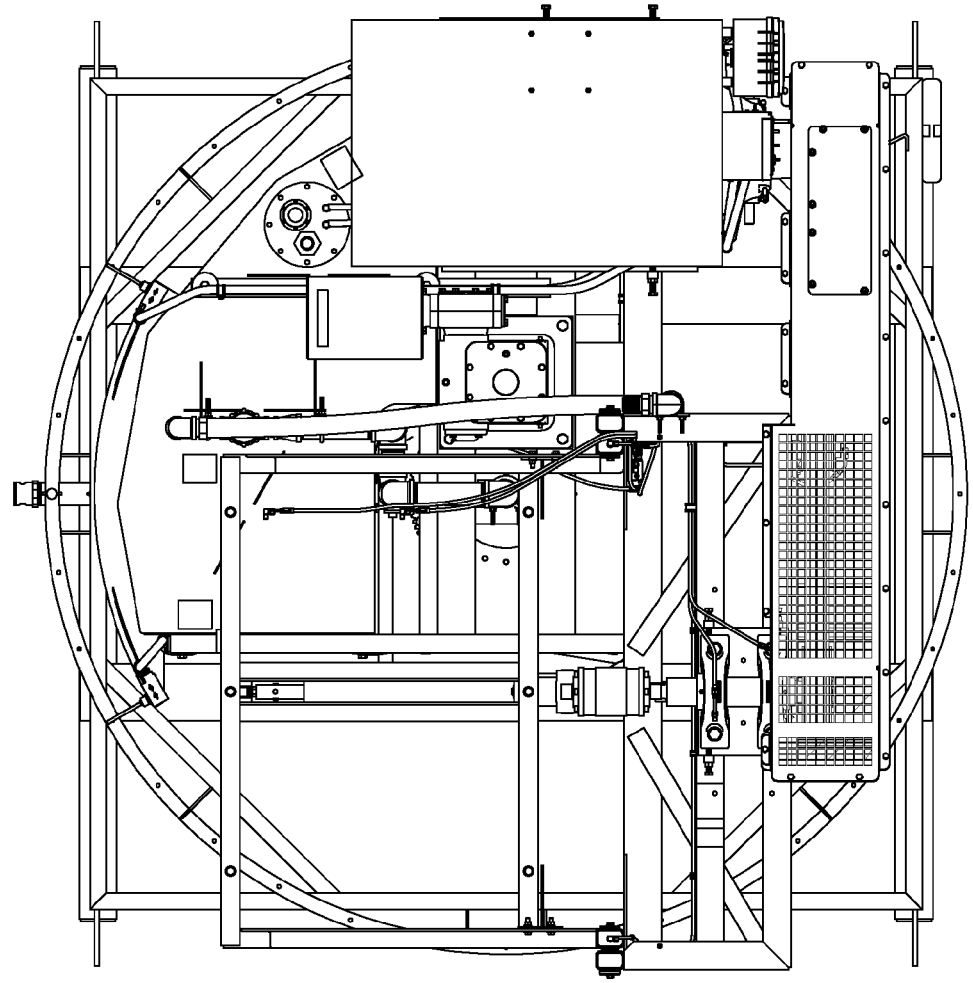

FIG. 7g is a top plan view of the assembled operative portion of the apparatus using like numerals to refer to the components described herein, shown without the fan and nozzle ring assemblies.

Figure 7H:
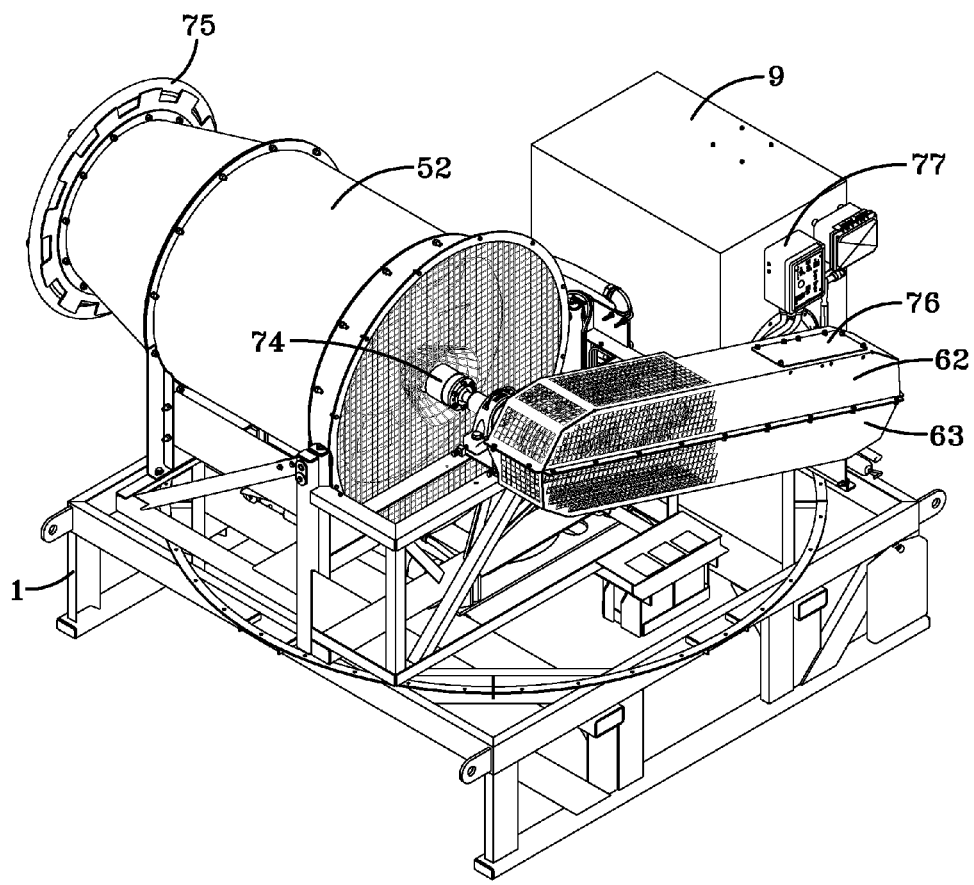

FIG. 7h is a top perspective view of the fully assembled operative portion of the apparatus using like numerals to refer to the components described herein, shown without the optional booster pump 78 that may be used to supply additional power to belt drive 66, which access is covered by optional cover plate 76.

Figure 7I:
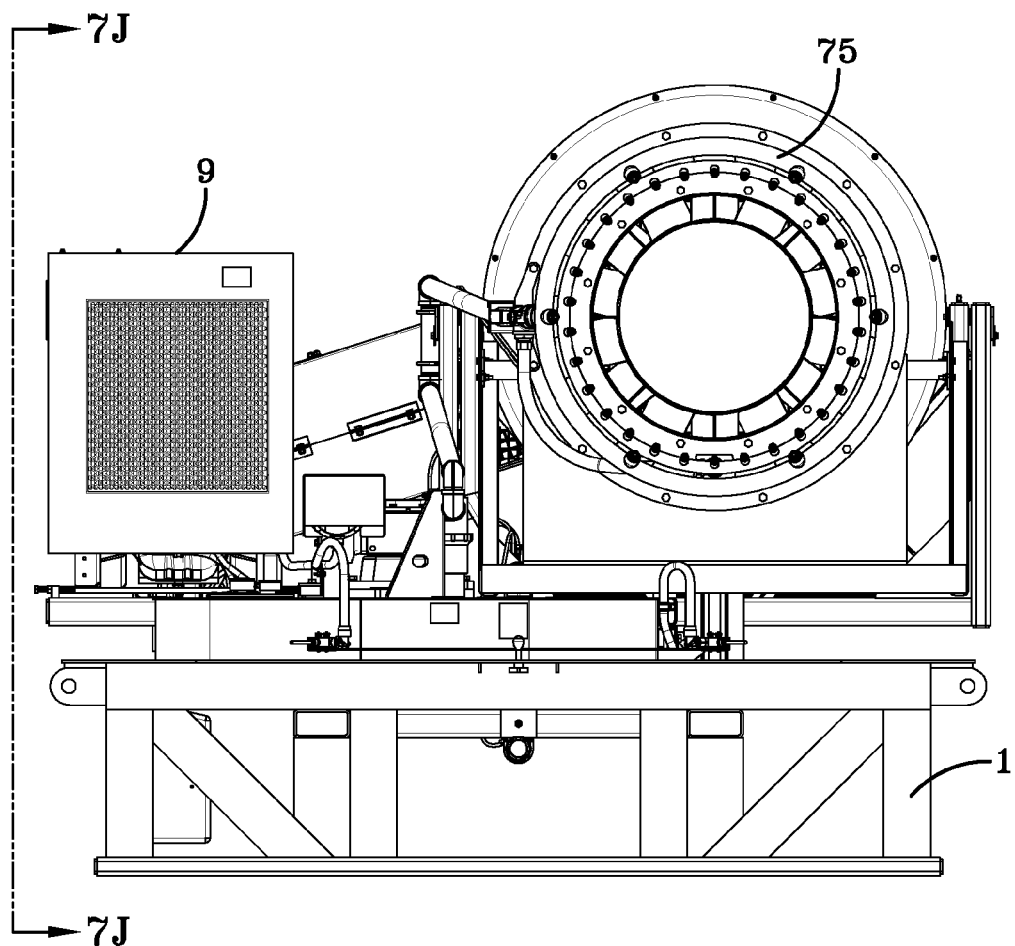

FIG. 7i is a front elevation view of the assembled operative portion of the apparatus using like numerals to refer to the components described herein.

Figure 7J:
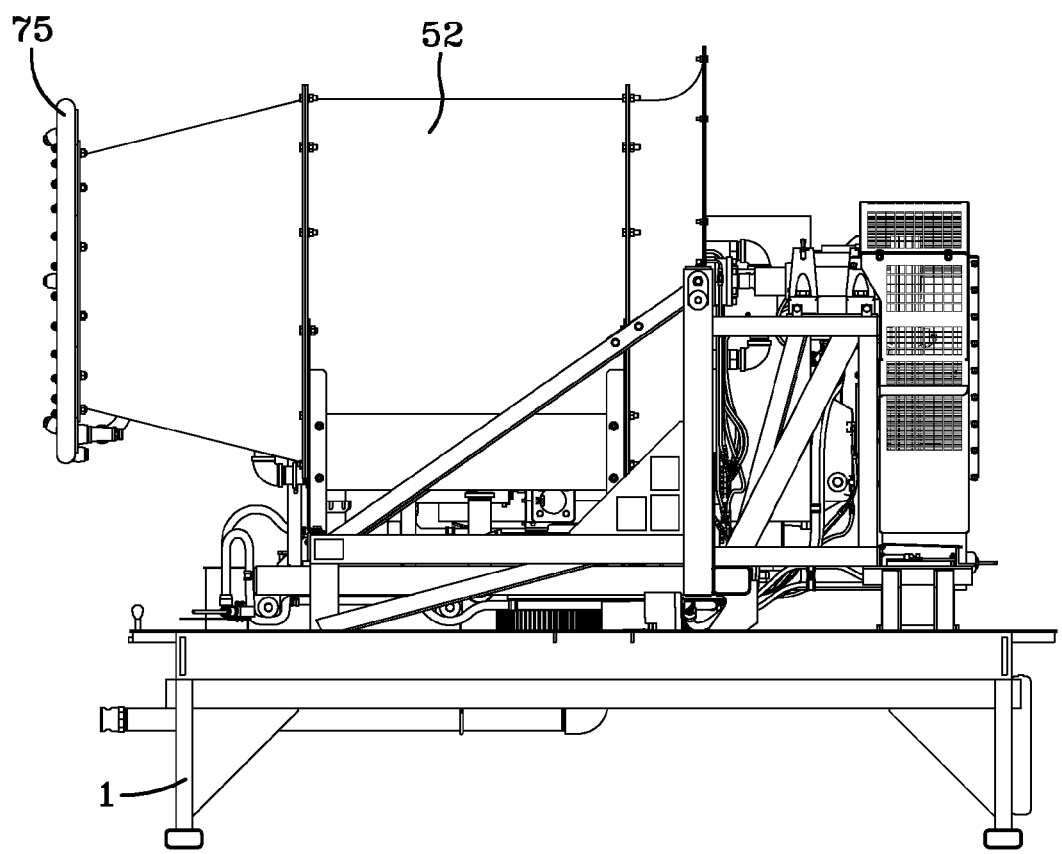

FIG. 7j is a side elevation view of the assembled operative portion of the apparatus using like numerals to refer to the components described herein.

Figure 7K:
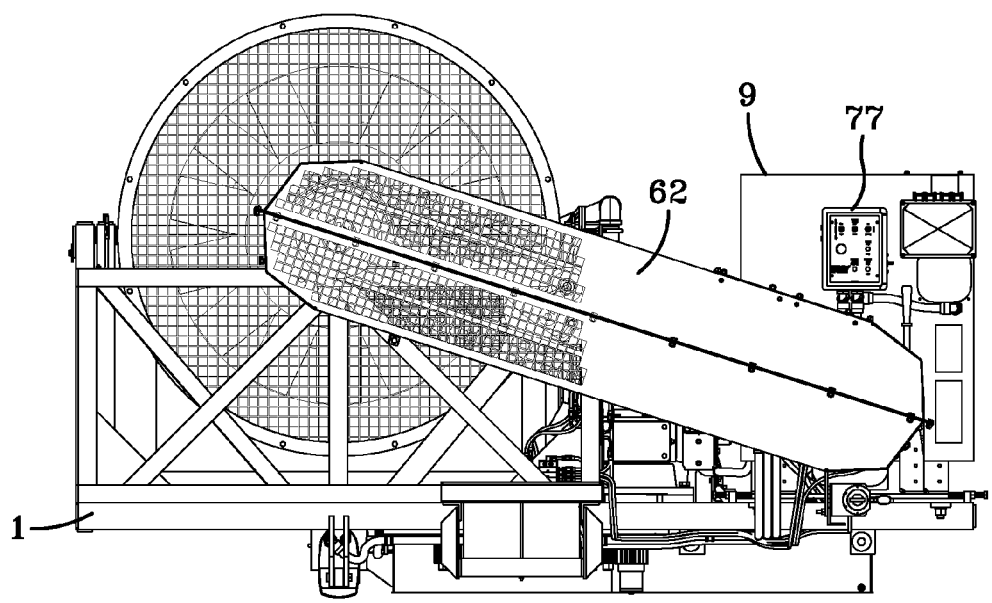

FIG. 7k is a rear elevation view of the assembled operative portion of the apparatus on the upper frame portion only, using like numerals to refer to the components described herein.

Figure 8A:
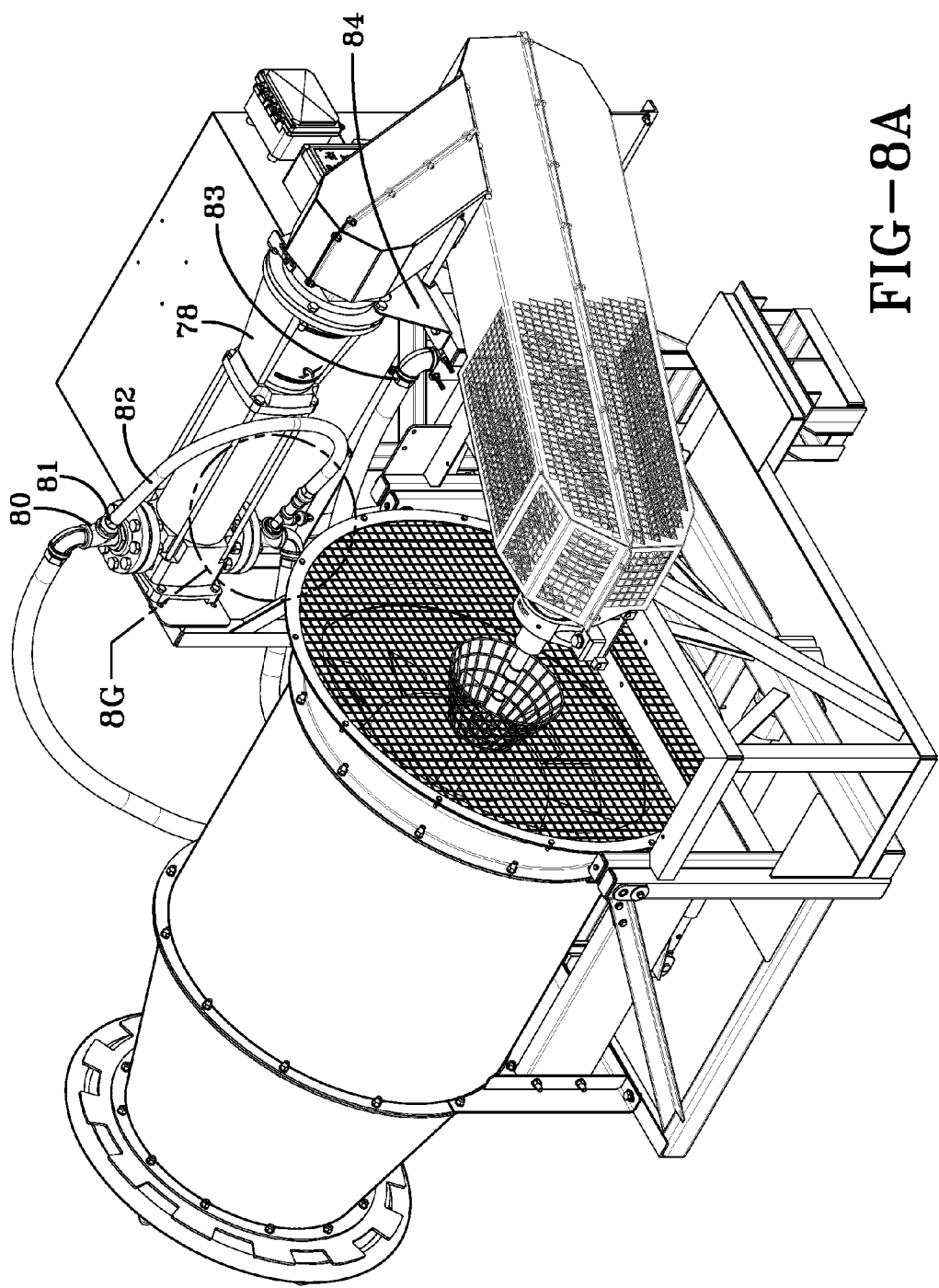
FIGS. 8a-8l are various views the frame assembly for a dust suppression apparatus with mounted with mounted engine, fan assembly, and fan drive and guard assembly, and booster pump, in accordance with one embodiment of the present invention.

FIG. 8a is a top perspective view of the fully assembled operative portion of the apparatus using like numerals to refer to the components described herein, and additionally showing optional booster pump 78, reducing bushing 80, barb fitting 81 and hose 82. This view also shows P-clamp 83 and front pump mount weldment 84.

Figure 8B:
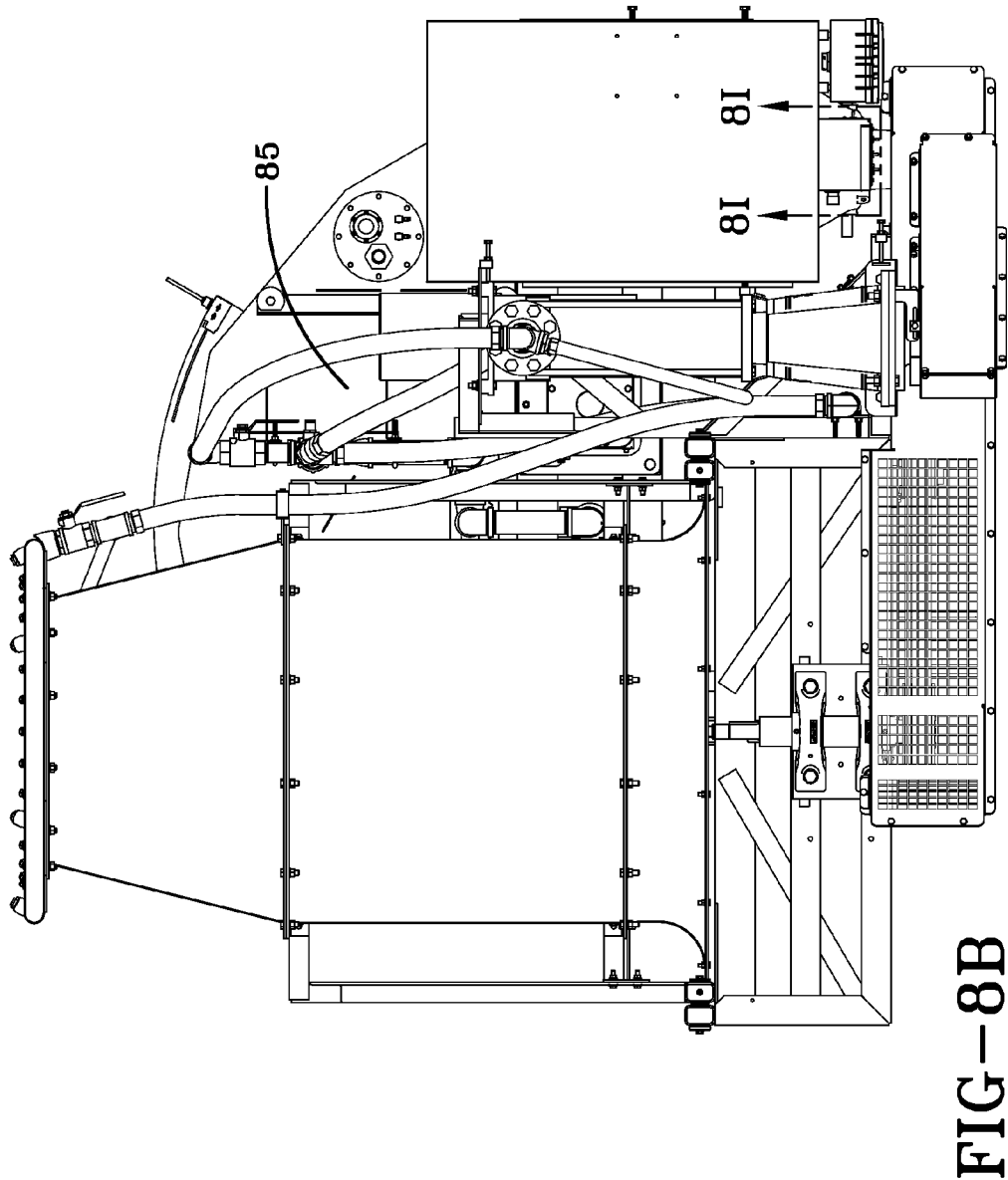

FIG. 8b is a top plan view of the assembled operative portion of the apparatus using like numerals to refer to the components described herein. This view also shows ball valve control 85 for 3-way ball valve water flow control.

Figure 8C:
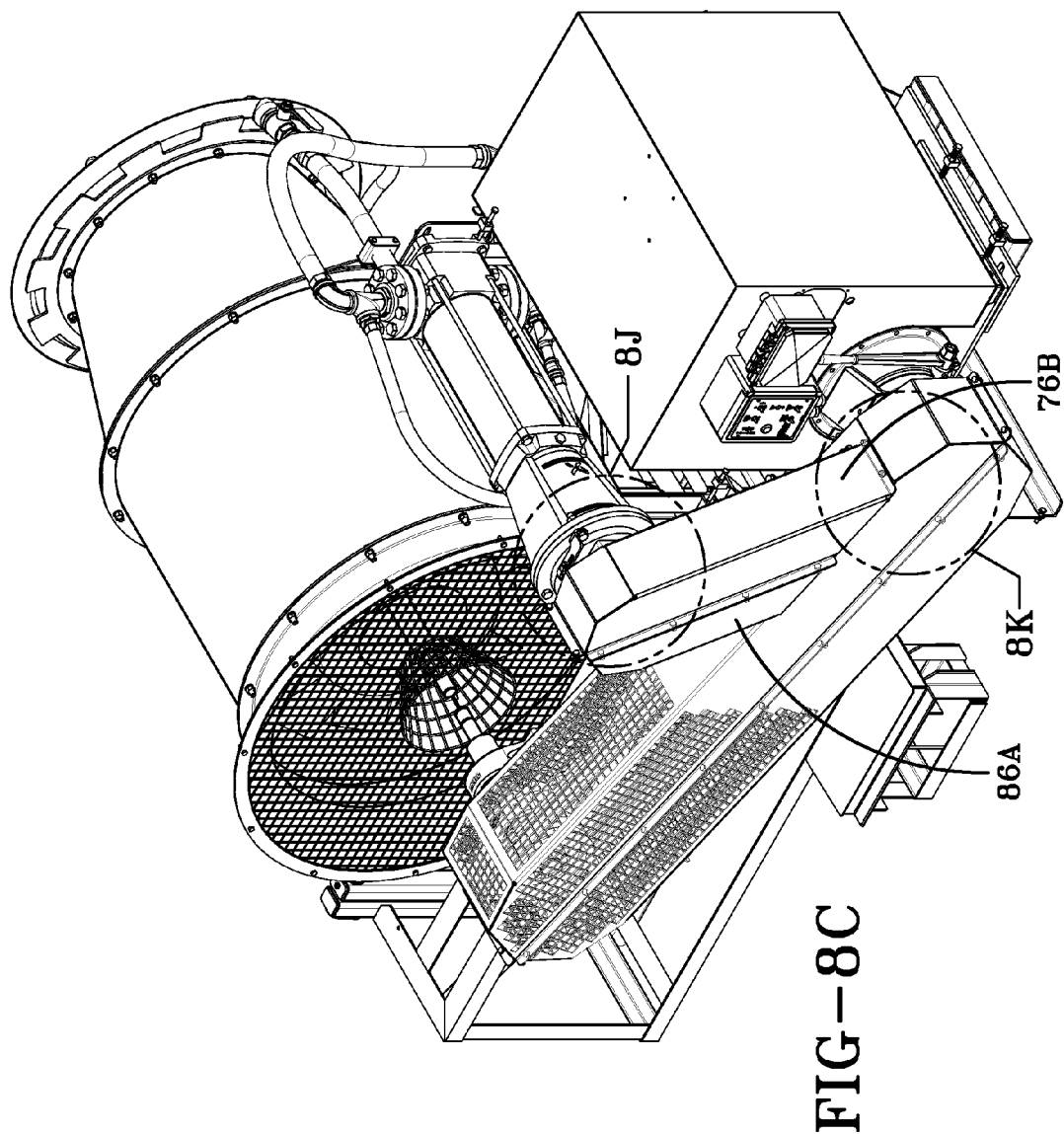

FIG. 8c is another top perspective view of the fully assembled operative portion of the apparatus using like numerals to refer to the components described herein. This view also shows guard weldments 86a and 86b.

Figure 8D:
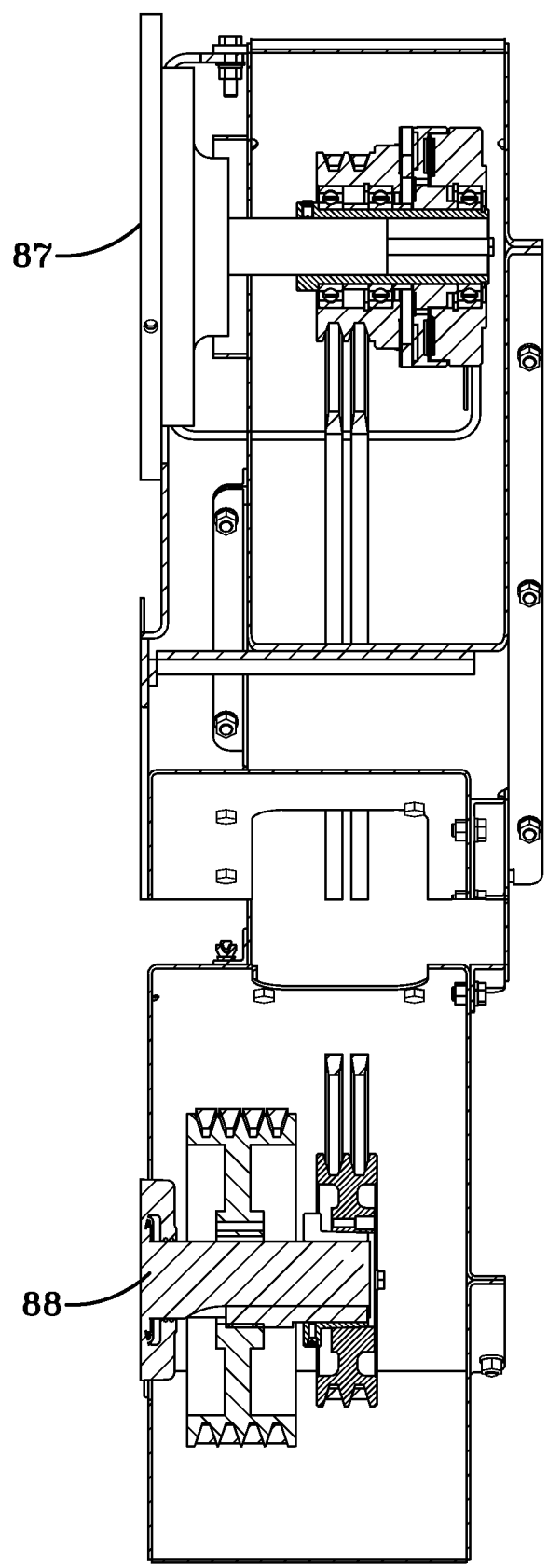
Figure 8E:
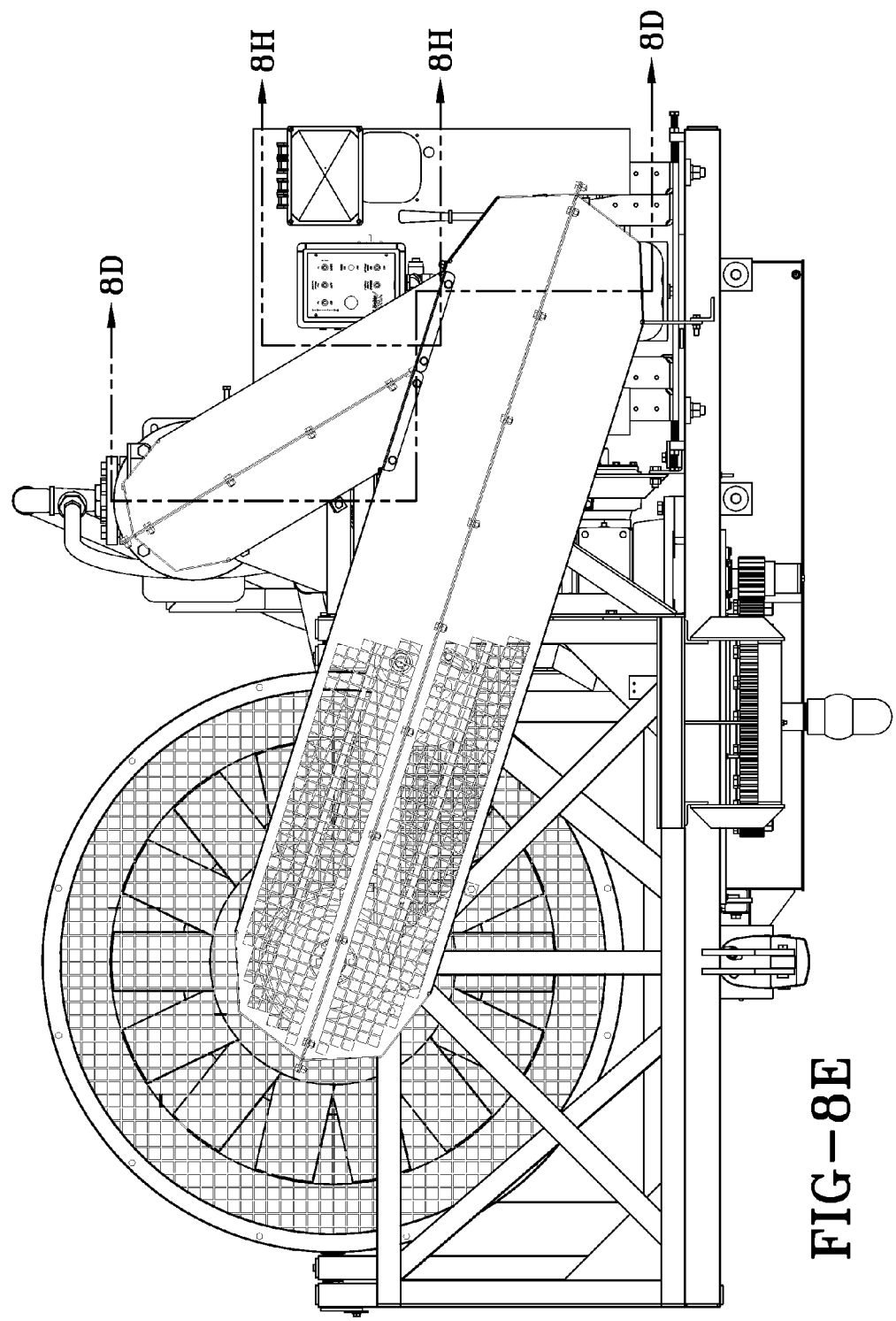

FIG. 8d is a detailed sectioned view (shown as section A-A) of FIG. 8e. This Figure shows a detailed view of the clutch pulley 87 and the split taper bushing 88.

FIG. 8e is a rear elevation view of the assembled operative portion of the apparatus on the upper frame portion only, using like numerals to refer to the components described herein, and showing the position of section A-A of FIG. 8d.

Figure 8F:
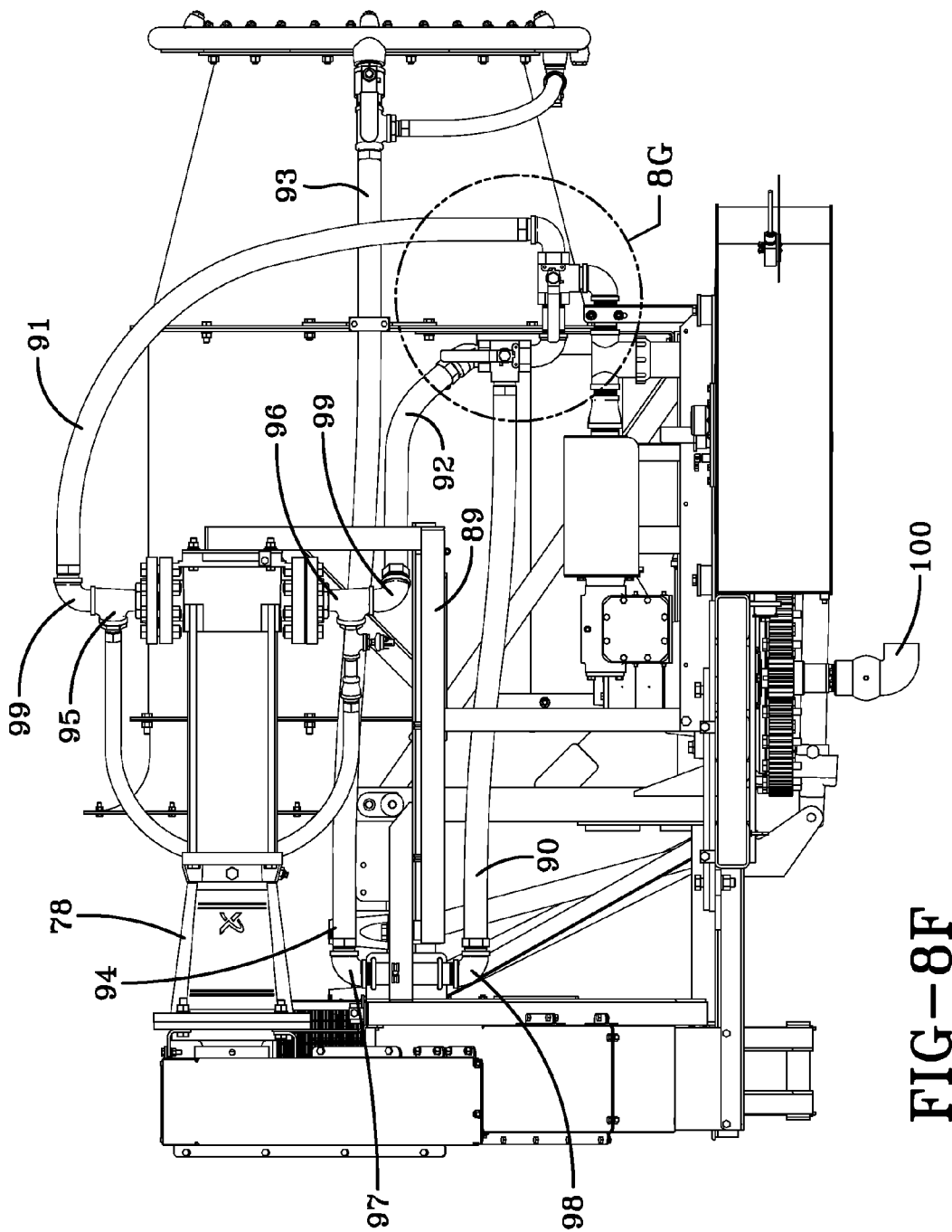

FIG. 8f is a side elevation view of the assembled operative portion of the apparatus using like numerals to refer to the components described herein, with the power unit and control panel removed. This view shows pump mount bracket weldment 89, and the various parts of the water supply arrangement, including water supply hoses/pipes 90-94, T-connectors 95 and 96, and elbow connectors 97-99, and main water uptake conduit 100.

Figure 8G:
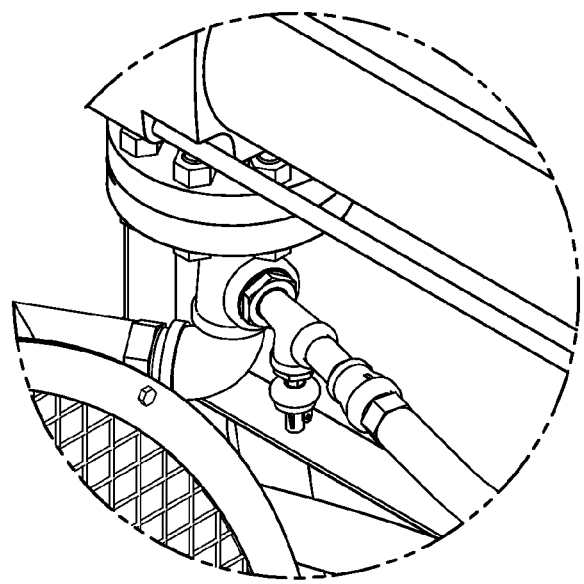

FIG. 8g is a detailed elevation view (shown as detail F of FIG. 8a), showing the water supply connection to the booster pump 78.

Figure 8H:
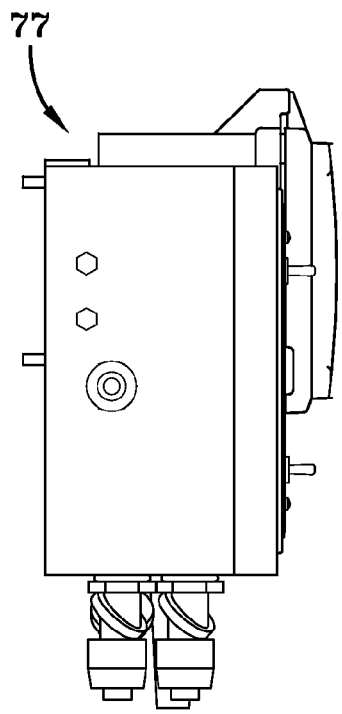
Figure 8I:
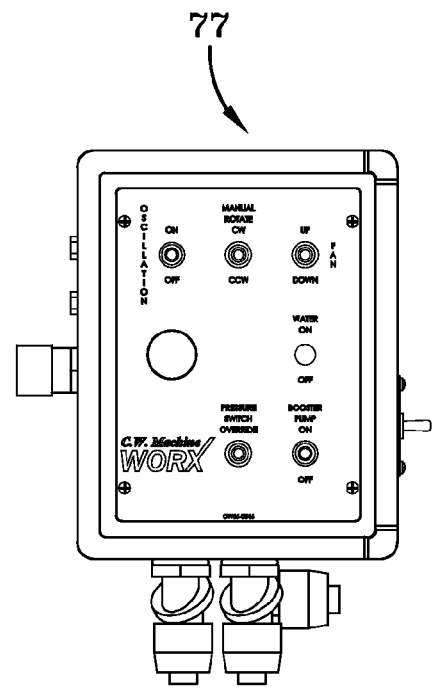

FIGS. 8h and 8i are detailed elevation views of the control panel 77.

Figure 8L:
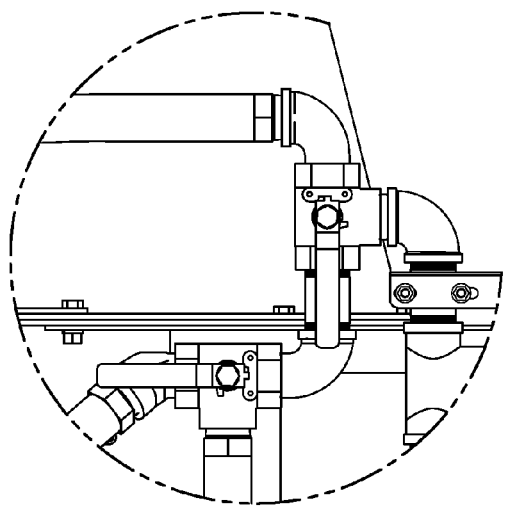
Figure 8K:
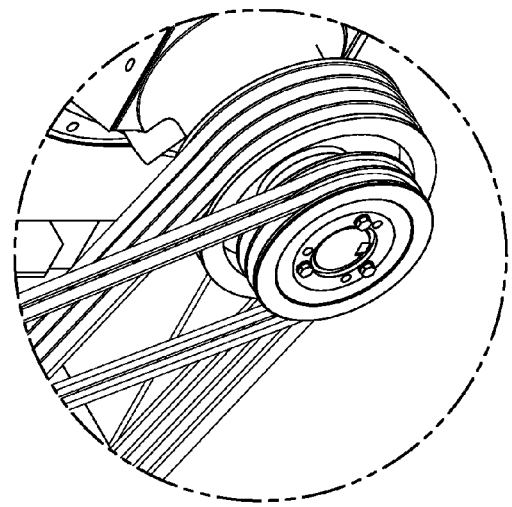
Figure 8J:
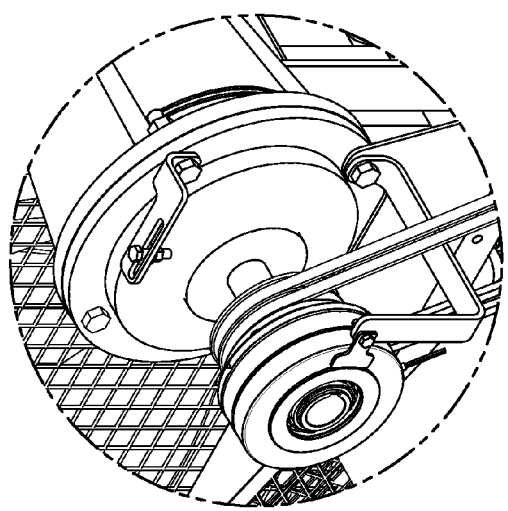
Figure 9A:
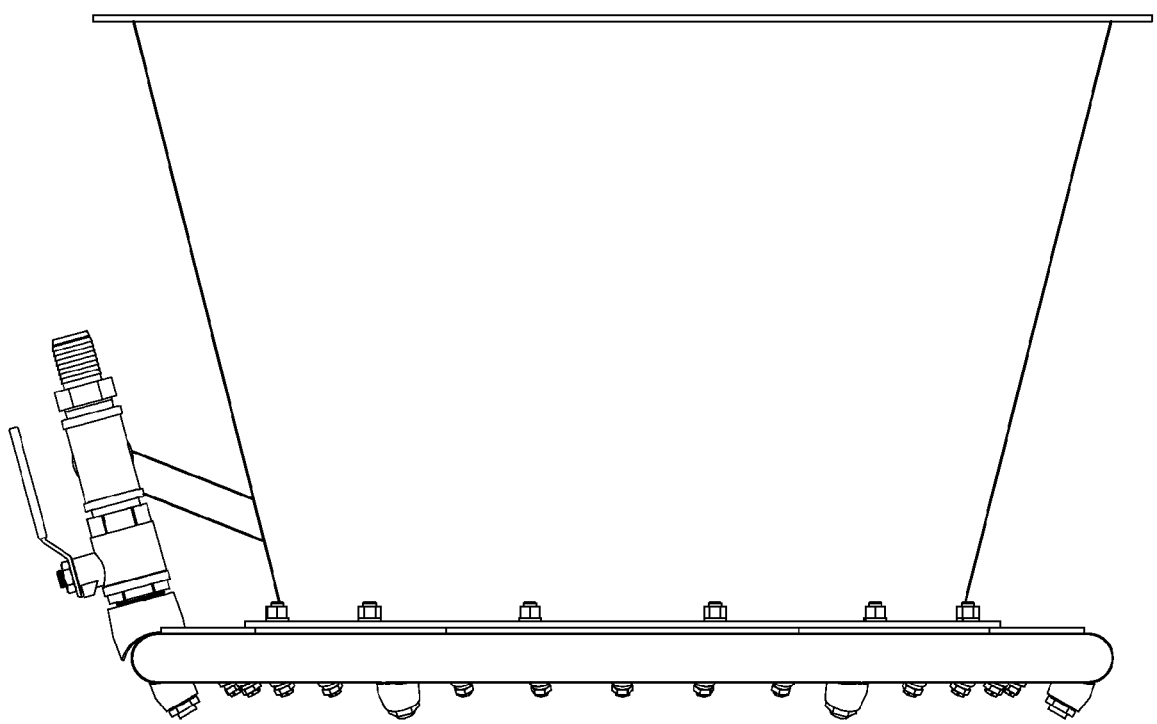
FIGS. 9a-9e are a collection of views of a portion of the fan assembly 52, shown with the water supply conduits, associated valves and nozzle rings adapted to provide water mist to the blown air stream.
Figure 9B:
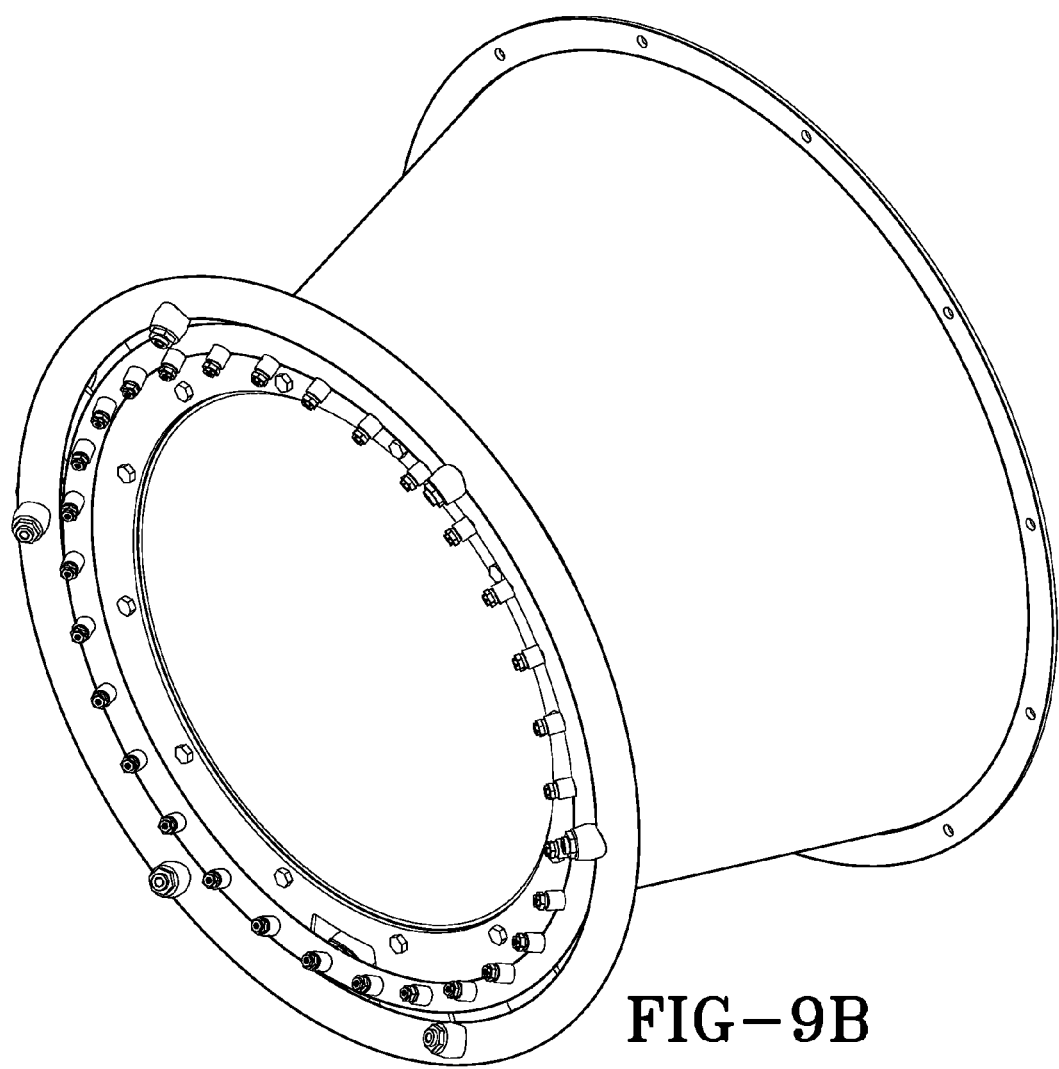
Figure 9C:
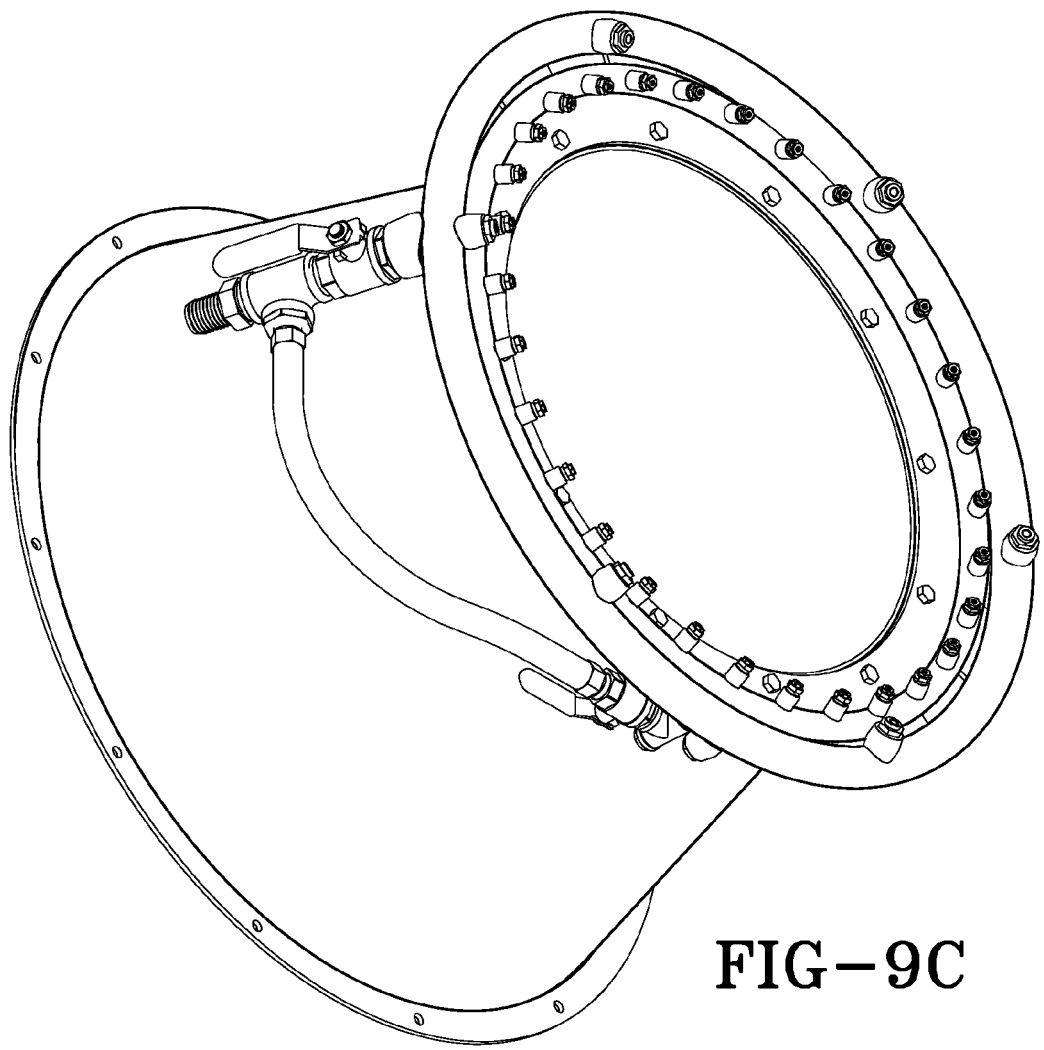
Figure 9D:
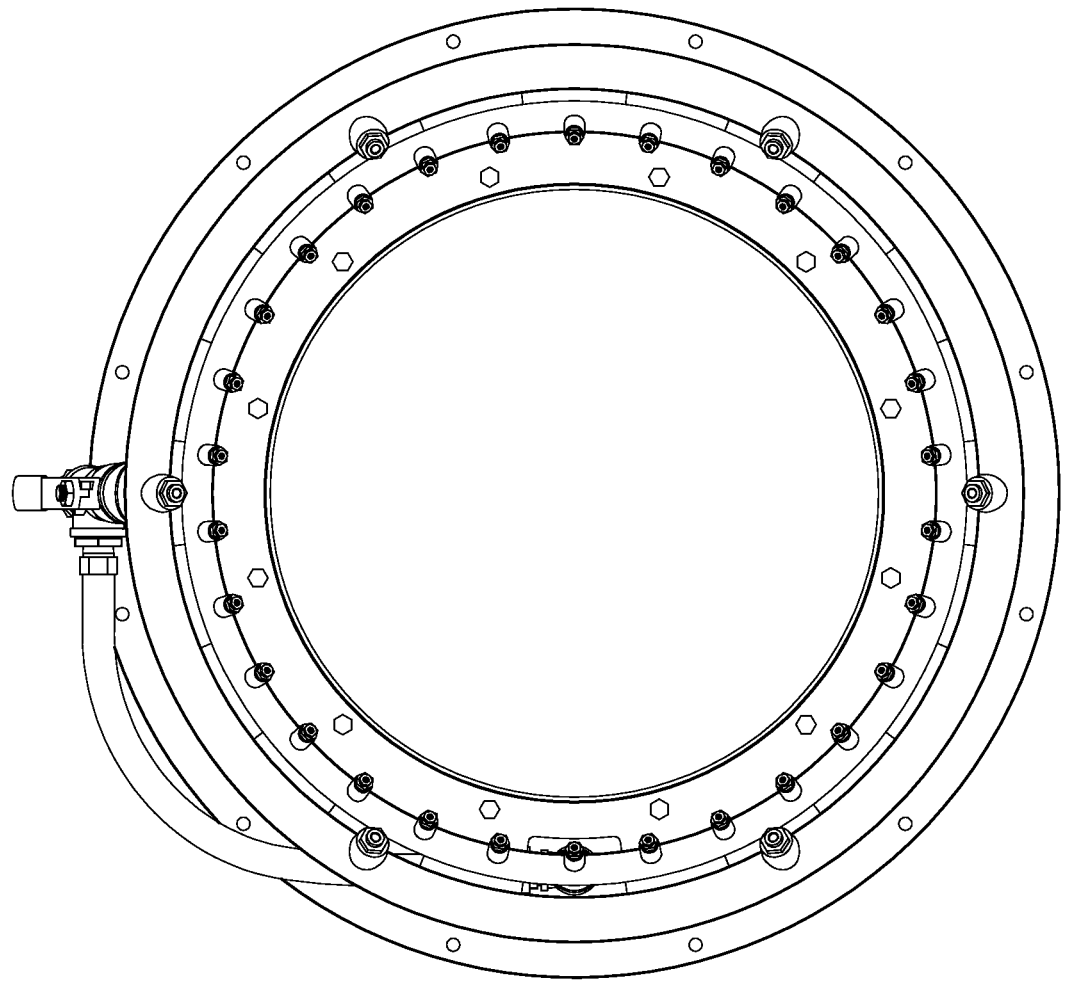
Figure 9E:
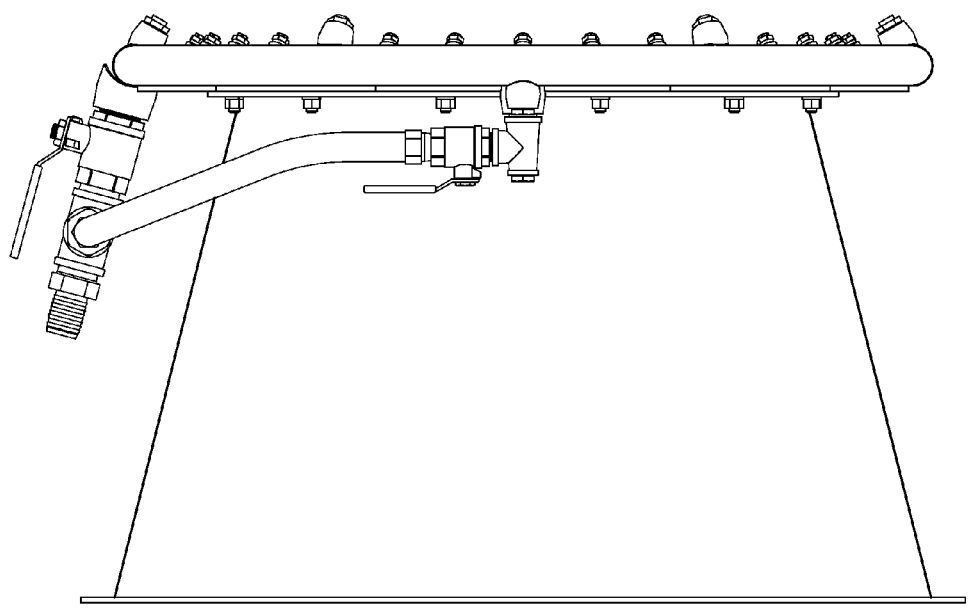

FIG. 8k is a detailed elevation view (shown as detail D of FIG. 8c), showing a detailed view of power take-off pulley and drive belt.

FIG. 8l is a detailed elevation view (shown as detail G of FIG. 8f), showing a detailed view of the water supply arrangement.

FIG. 9 is a collection of views of a portion of the fan assembly 52, shown with the water supply conduits, associated valves and nozzle rings adapted to provide water mist to the blown air stream.

Figure 10A:
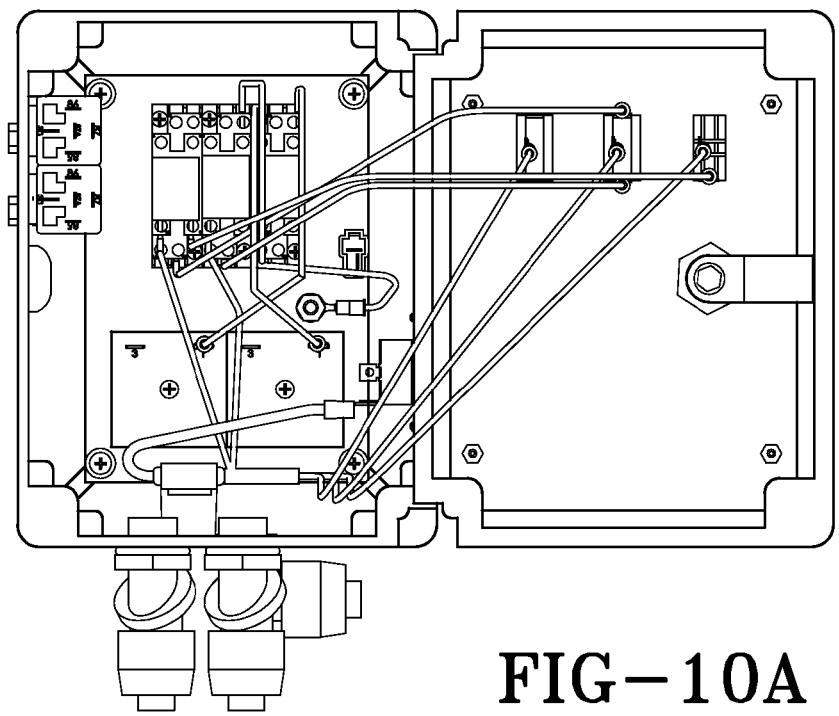
FIGS. 10a-10c are a collection of views of a portion of the control panel, shown with wiring arrangements.
Figure 10B:
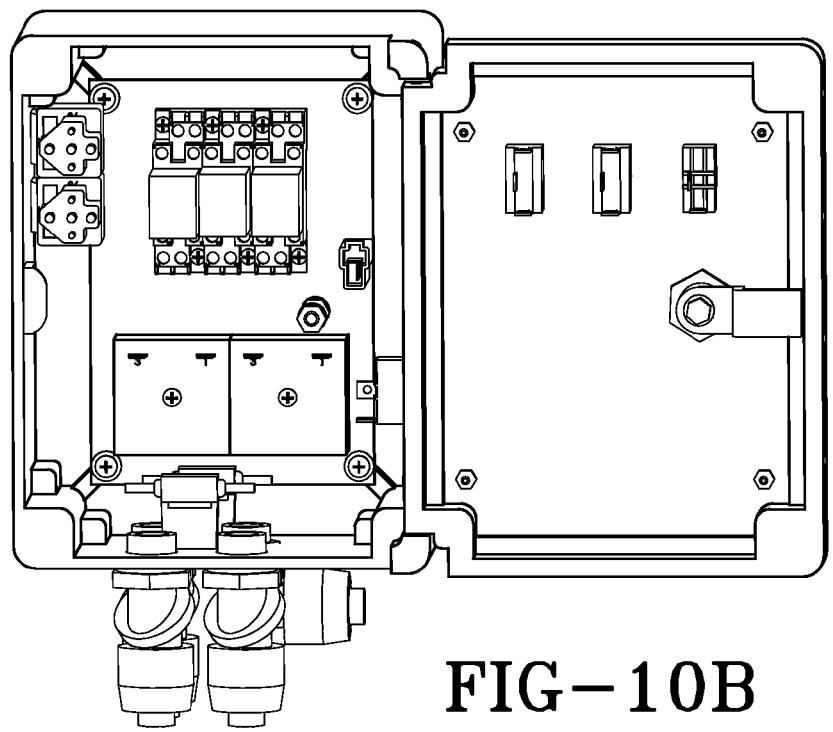
Figure 10C:
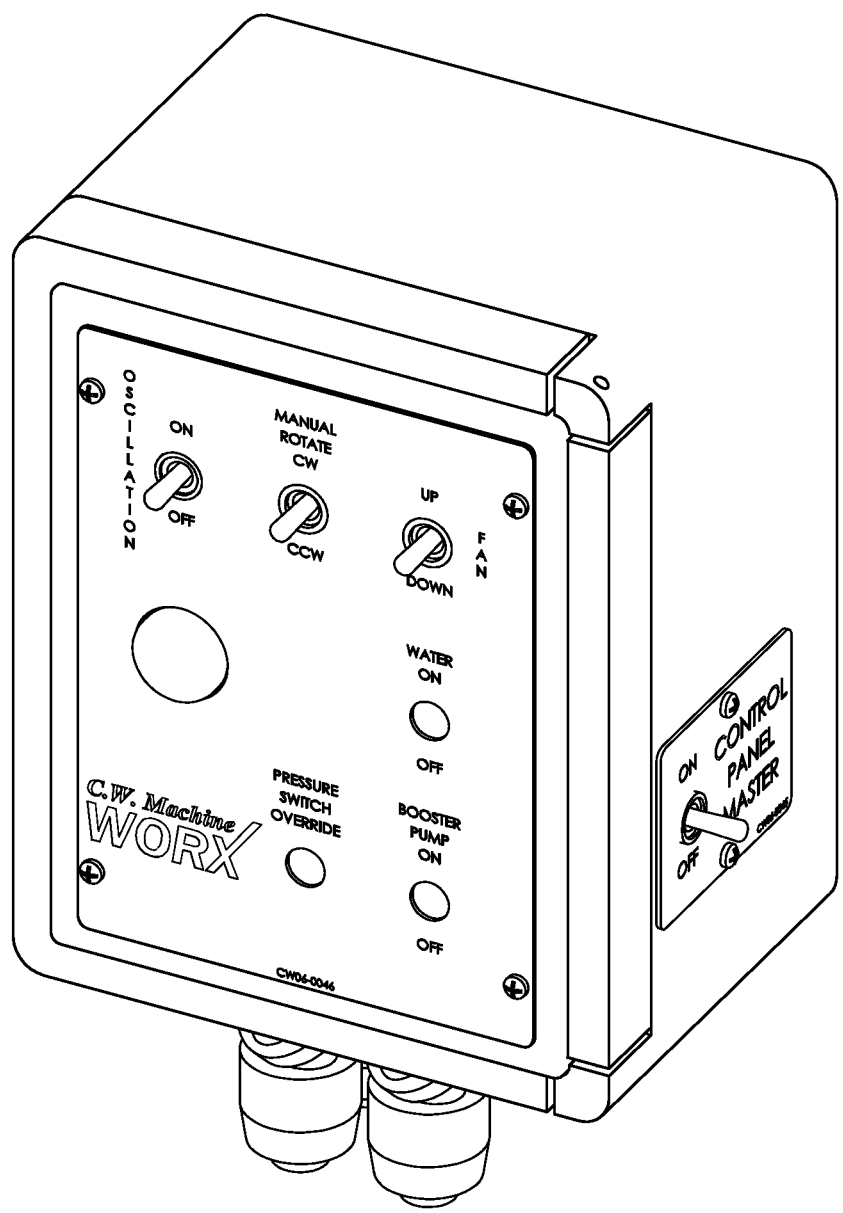

FIG. 10 is a collection of views of a portion of the control panel, shown with wiring arrangements.

Figure 11:
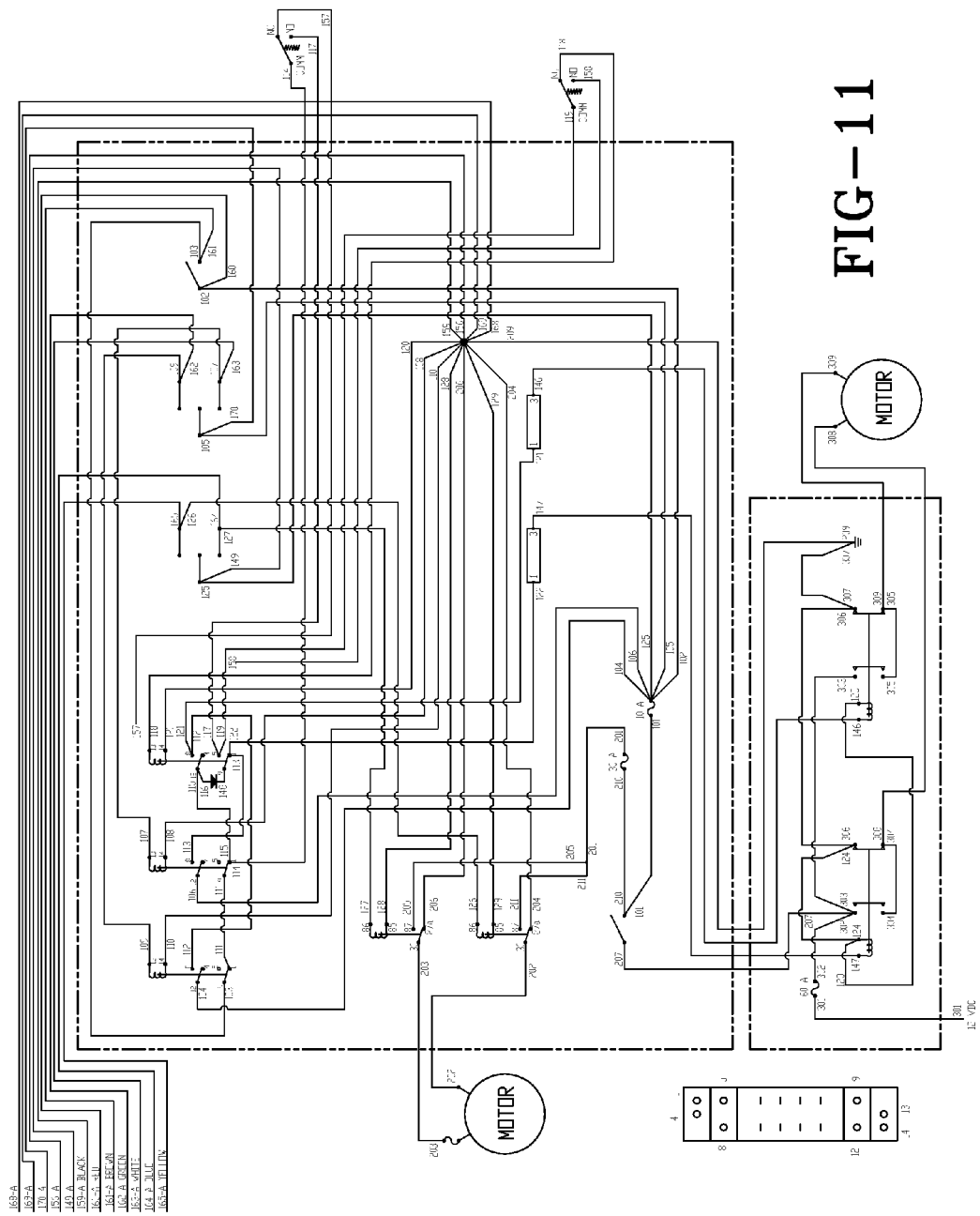
FIG. 11 is a circuit diagram for the control circuitry and logic for the control panel of the preferred embodiment of the present invention.
Figure 12A:
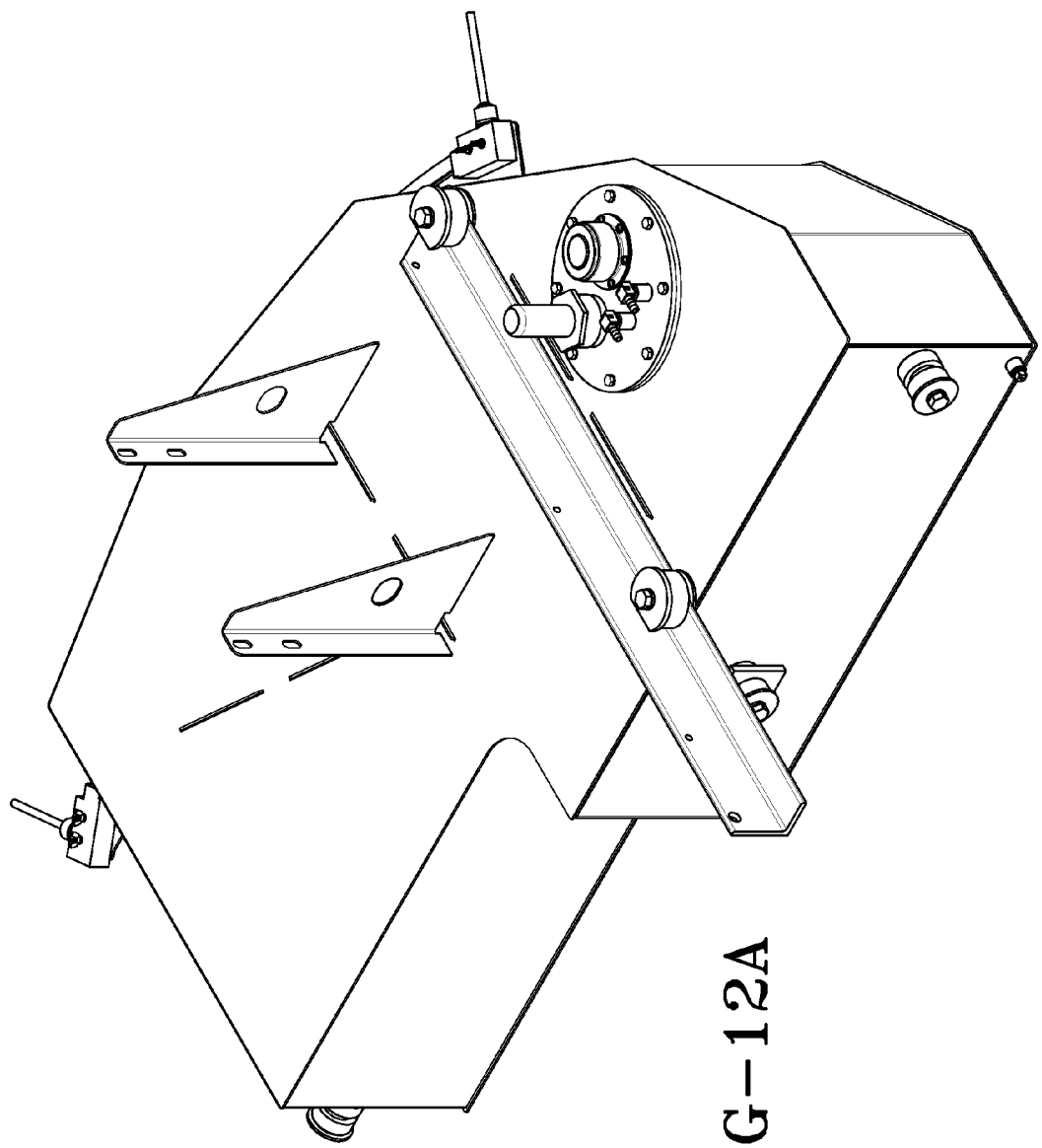
FIGS. 12a-12h are a collection of views of a portion of the fuel tank serving the engine of the present invention.
Figure 12B:
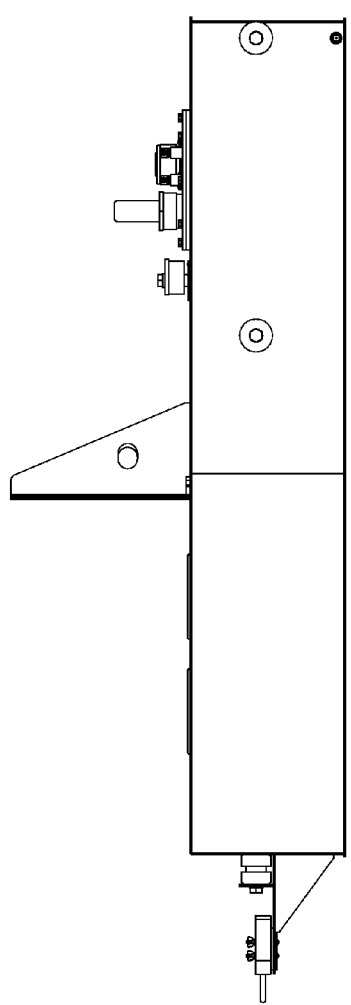
Figure 12D:
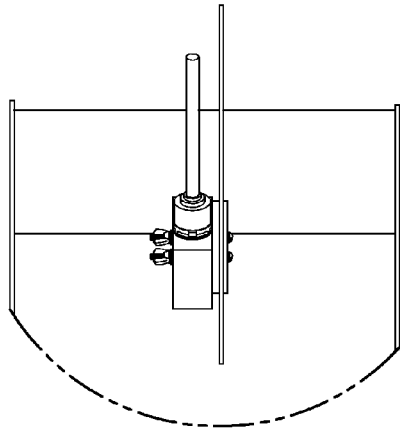
Figure 12C:
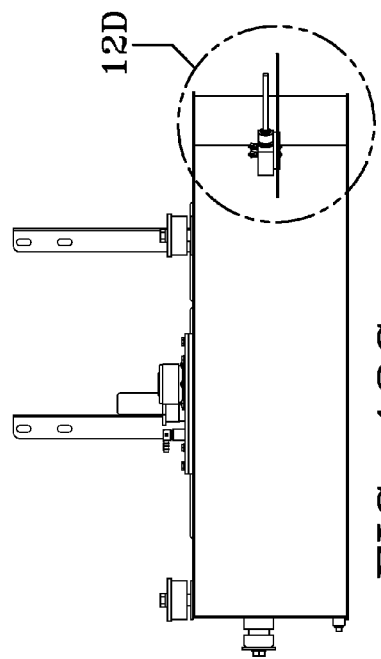
Figure 12E:
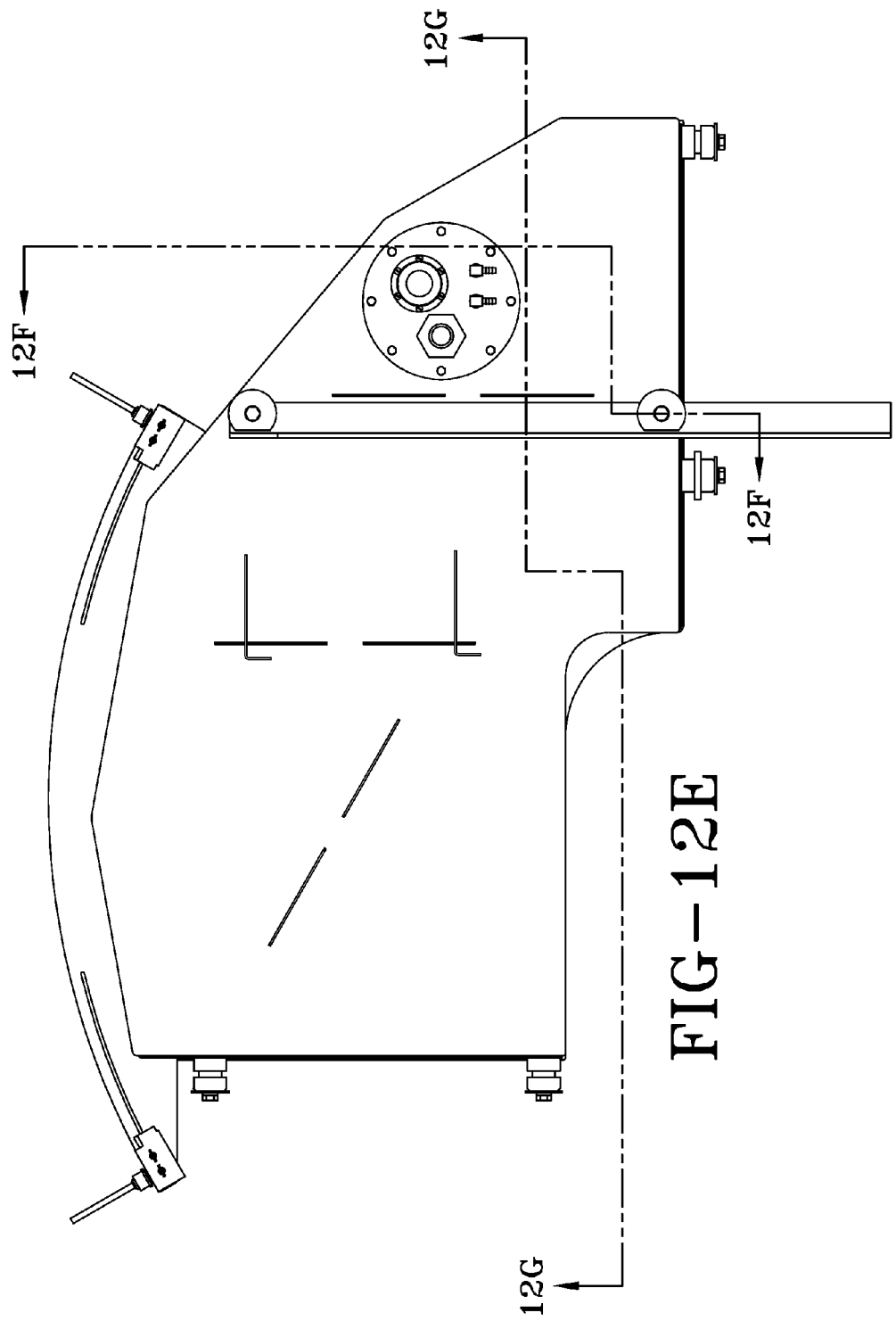
Figure 12F:
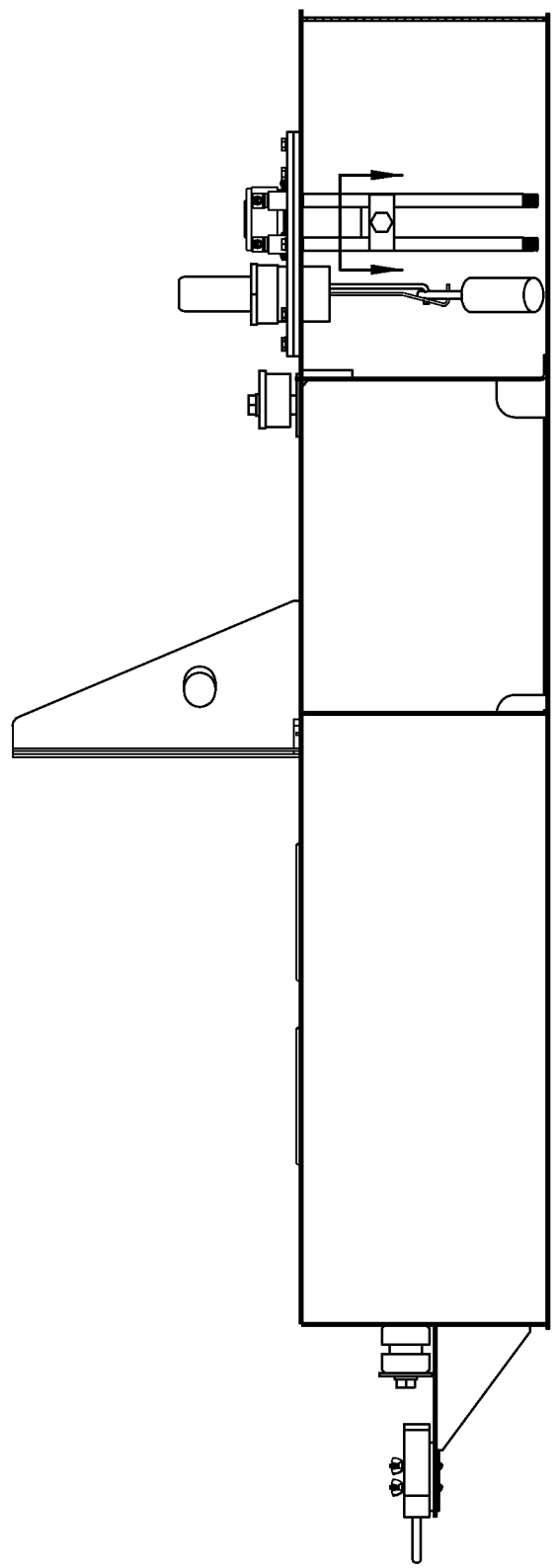
Figures 12G, 12H:
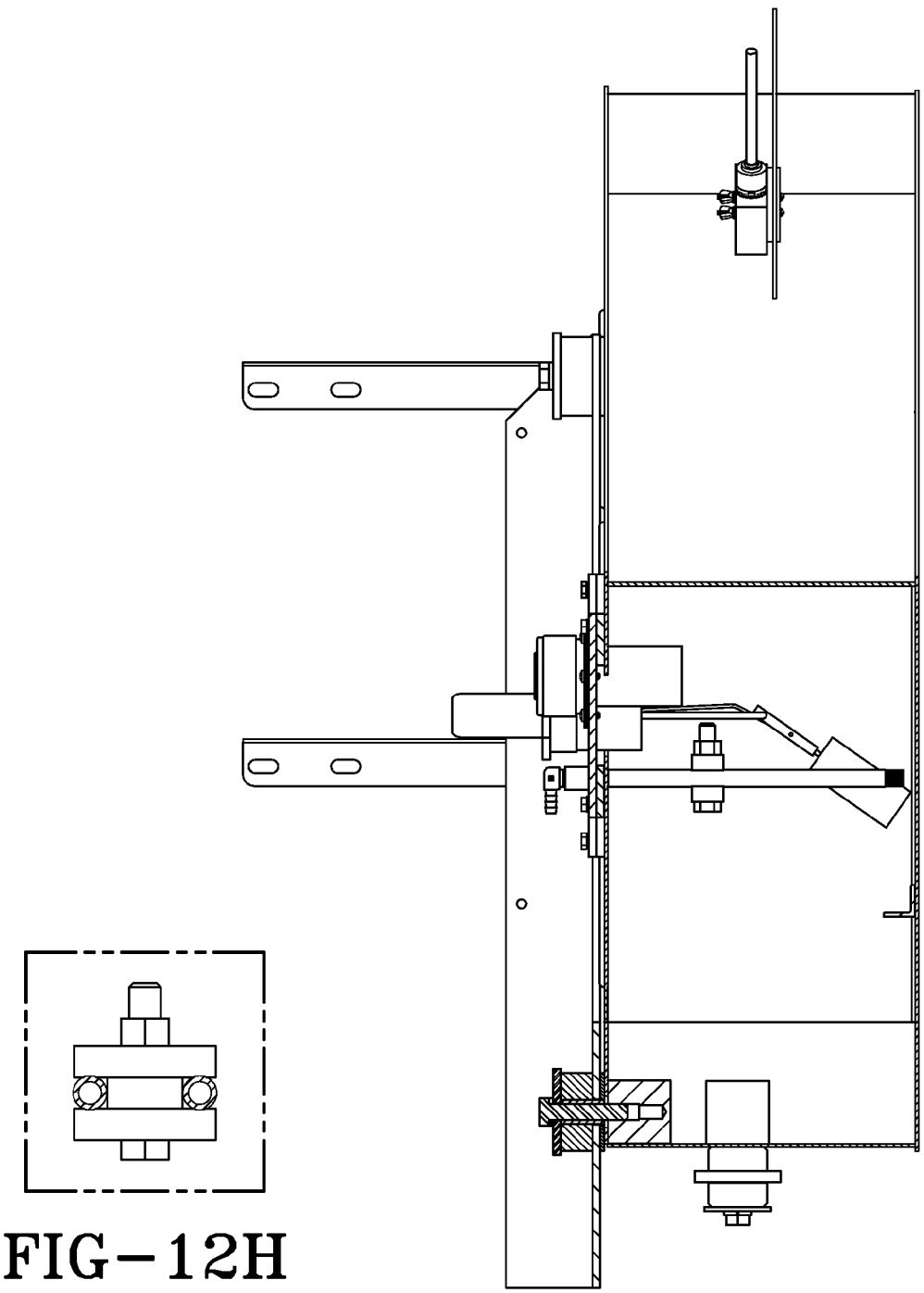
Figure 13A:
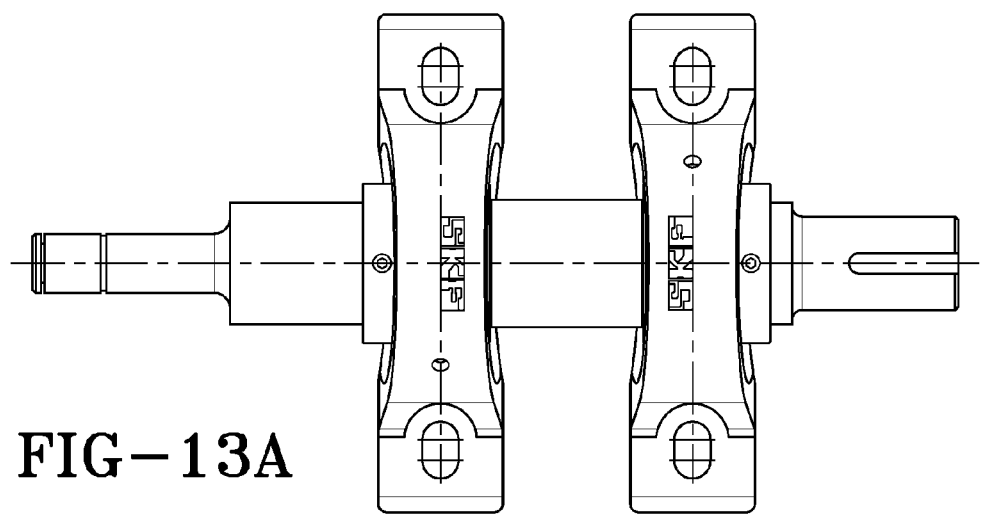
FIGS. 13a-13d are a collection of views of a portion of the jack shaft assembly for the fan of the present invention.
Figure 13B:
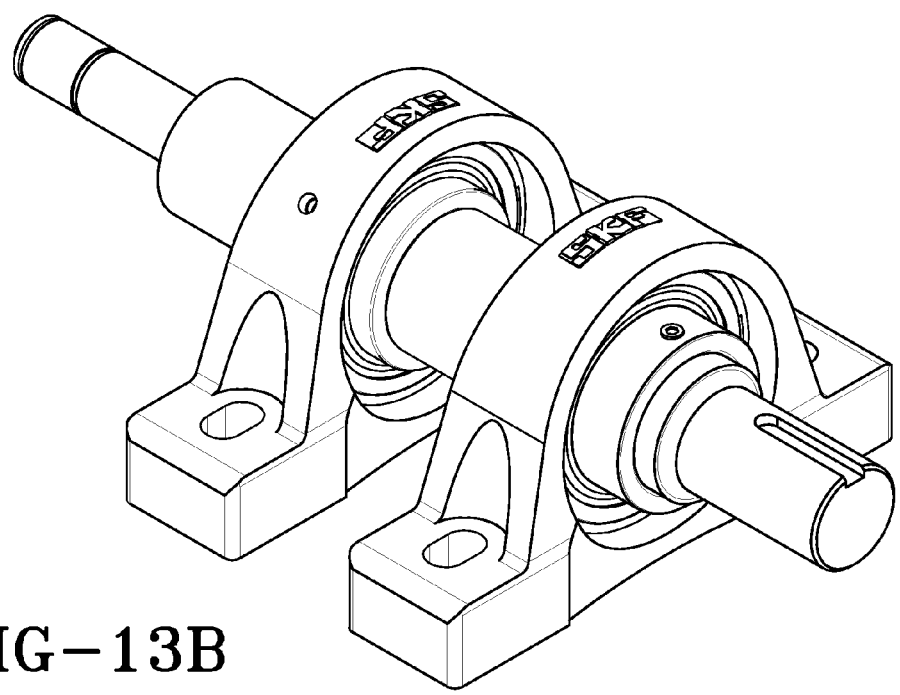
Figure 13C:
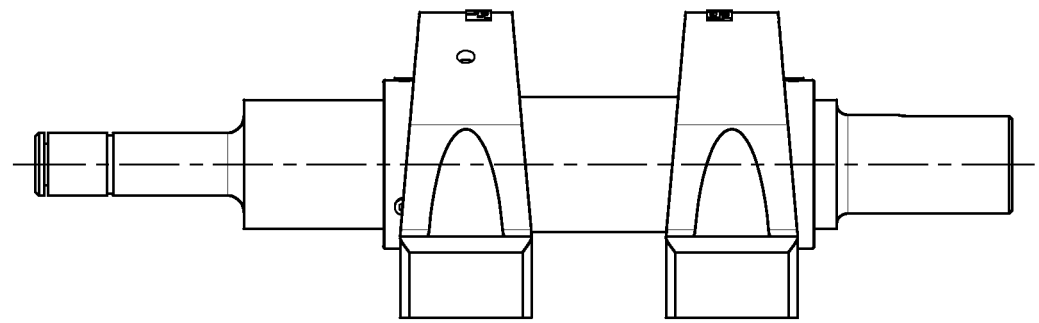
Figure 13D:
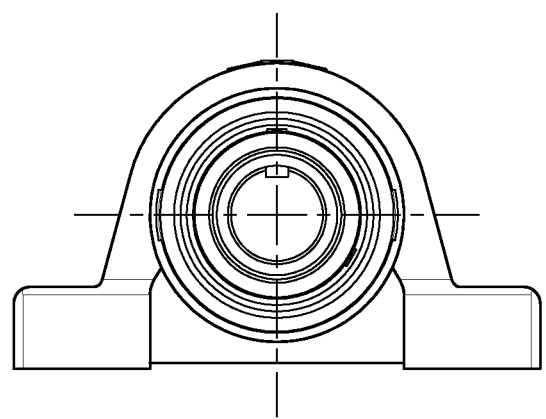
Figure 14A:
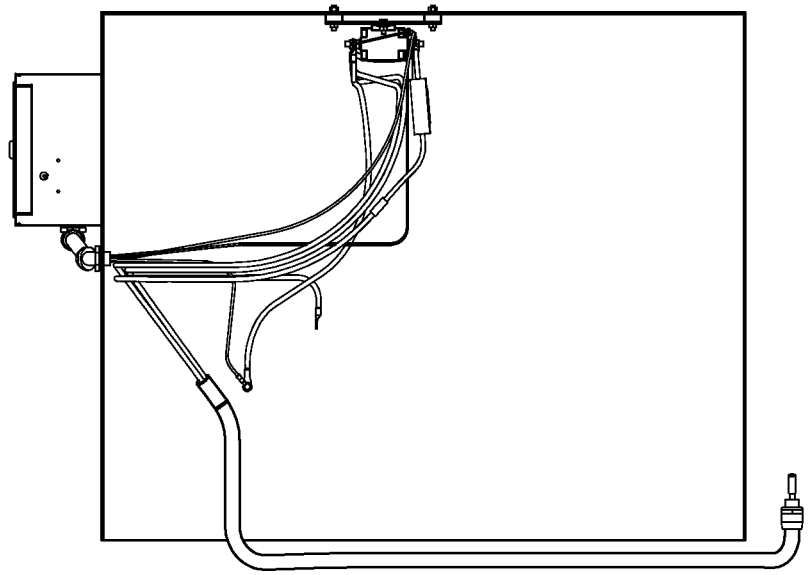
FIGS. 14a-14d are a collection of views of the power solenoid assembly of the present invention.
Figure 14B:
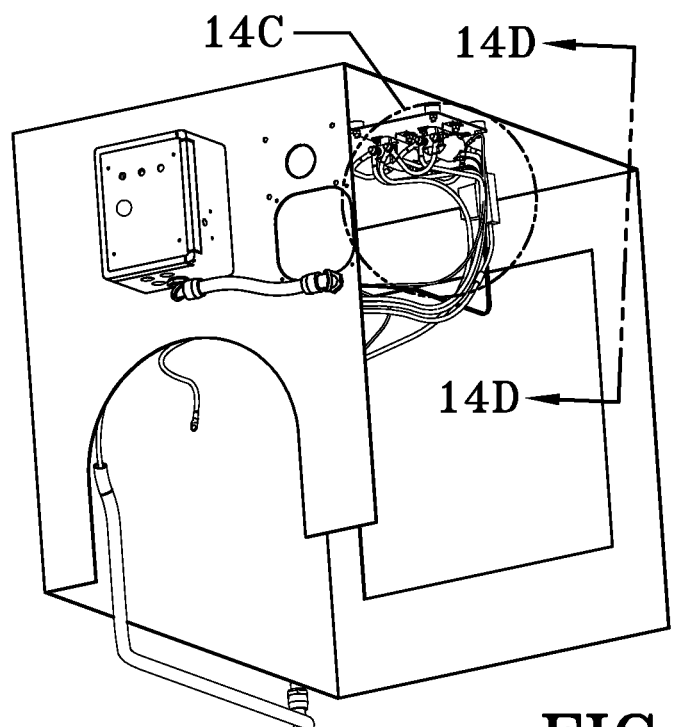
Figure 14D:
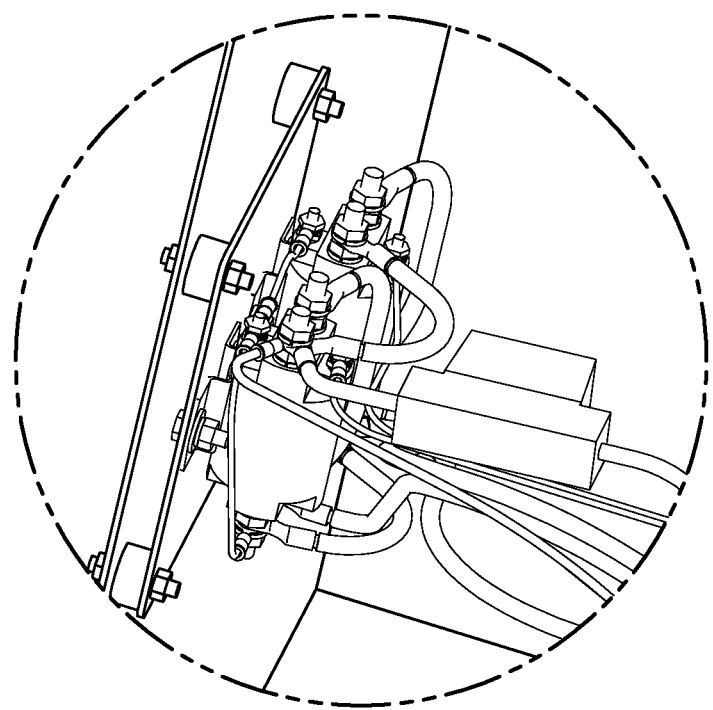
Figure 14C:
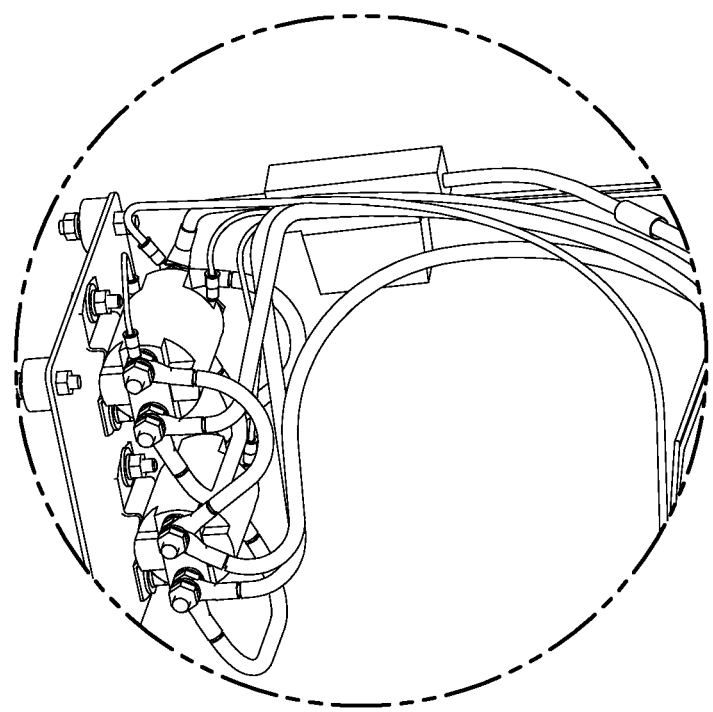
Figure 15B:
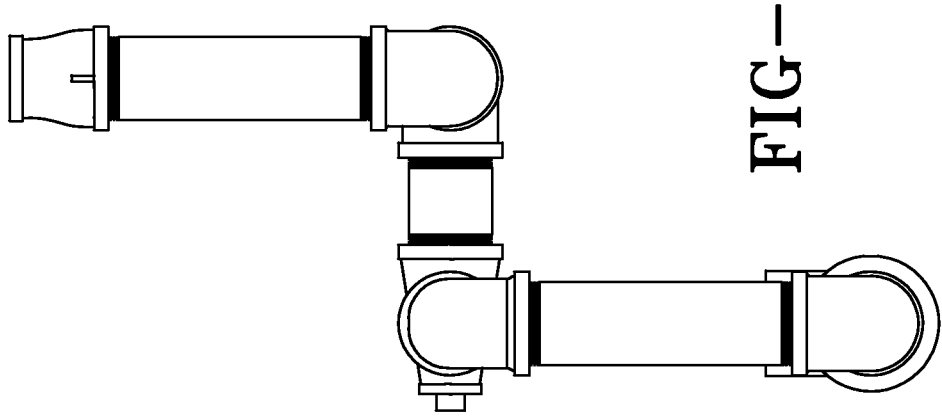
FIGS. 15a-15d are a collection of views of the supply plumbing sub-assembly of the present invention.
Figure 15A:
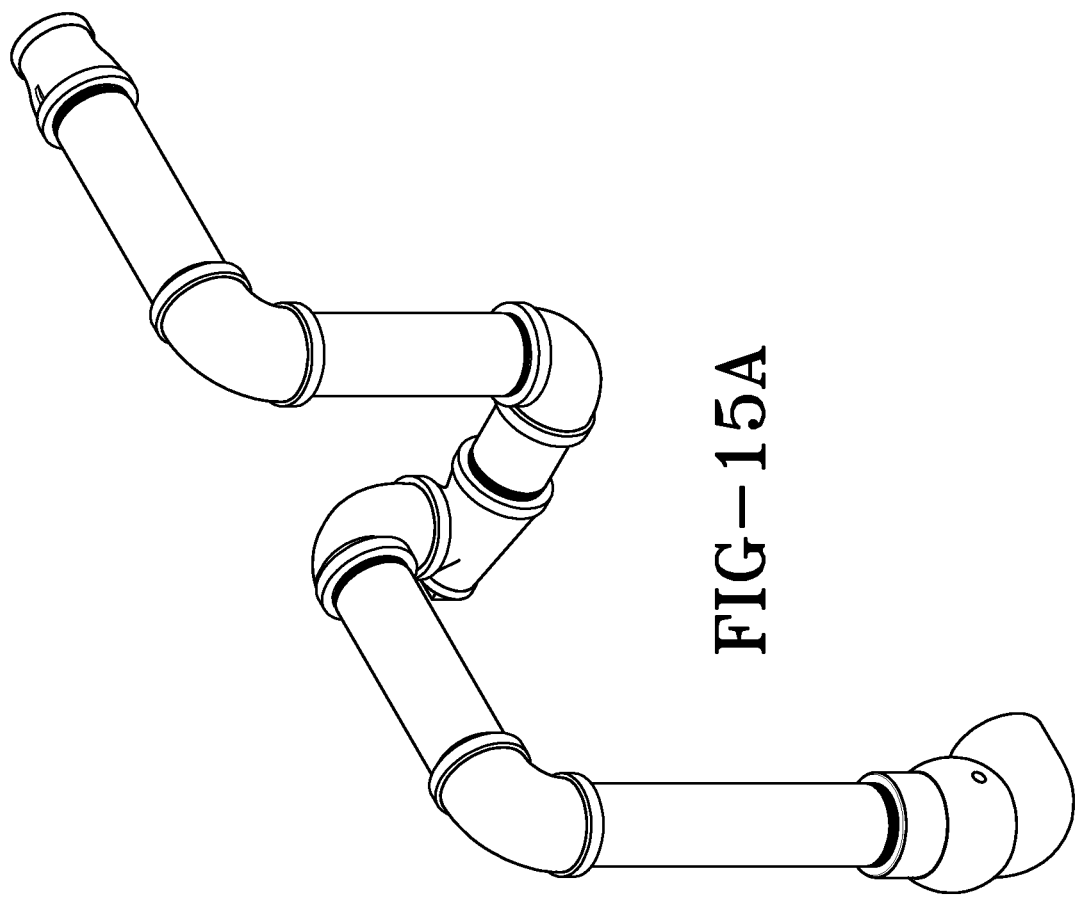
Figure 15D:
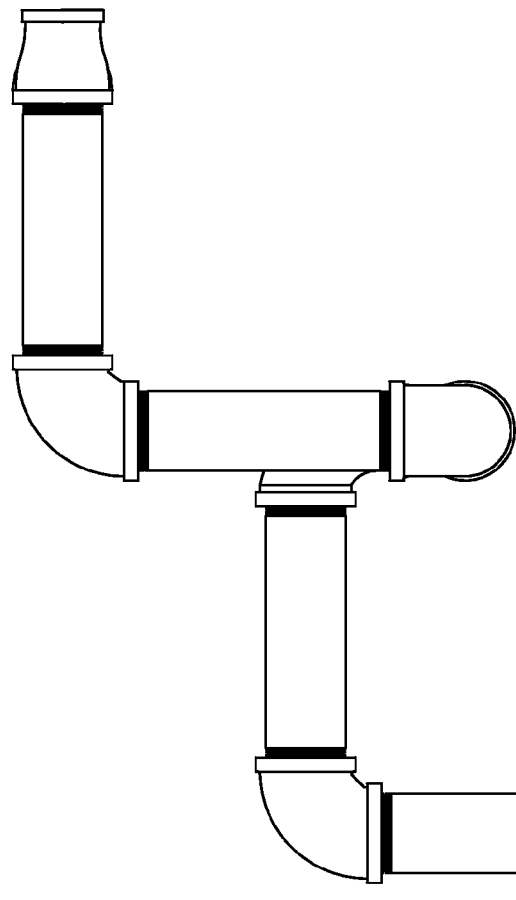
Figure 15C:
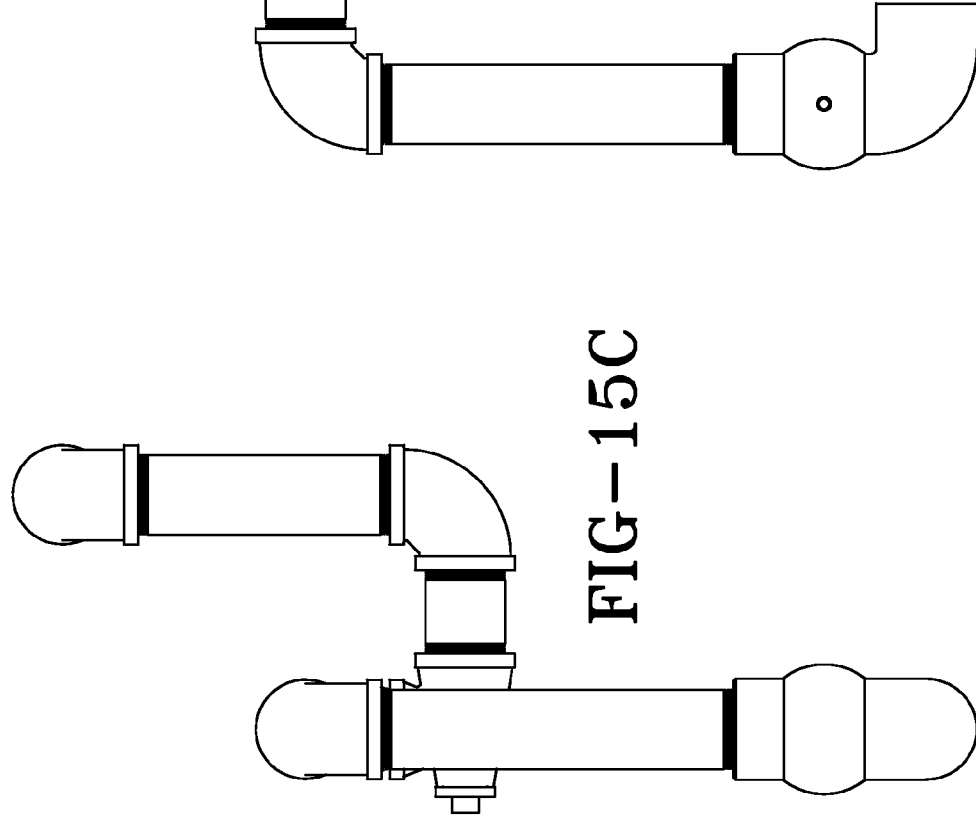

FIG. 11 is a circuit diagram for the control circuitry and logic for the control panel of the preferred embodiment of the present invention.

FIG. 12 is a collection of views of a portion of the fuel tank serving the engine of the present invention.

FIG. 13 is a collection of views of a portion of the jack shaft assembly for the fan of the present invention.

FIG. 14 is a collection of views of the power solenoid assembly of the present invention.

FIG. 15 is a collection of views of the supply plumbing sub-assembly of the present invention.

Figure 16A:
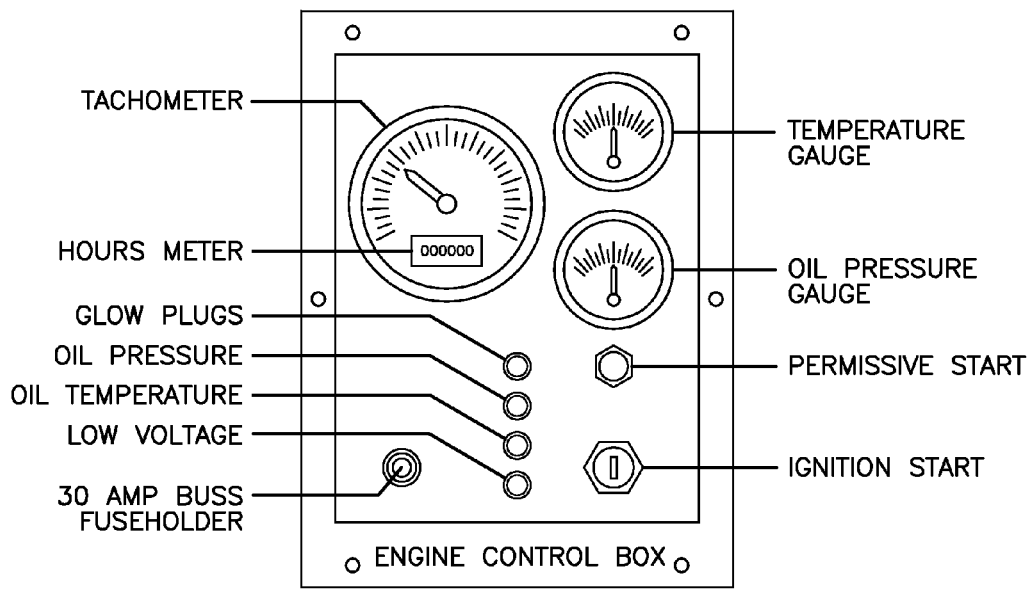
FIGS. 16a-16b are a view of the control panel of the present invention.

FIG. 16 is a view of the control panel of the present invention.

Figures 16B, 17:
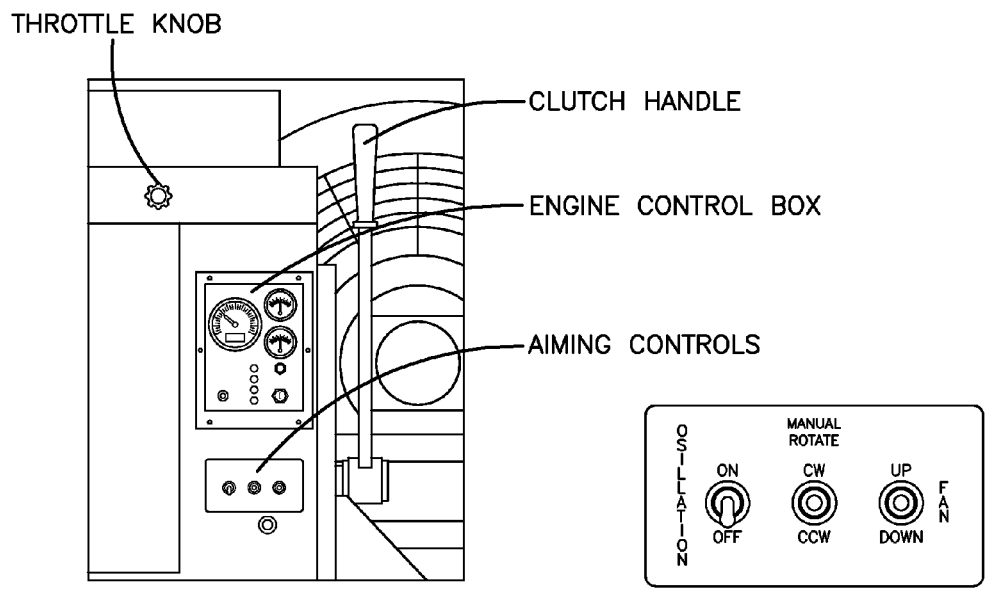
FIG. 17 is a detailed view of a portion of the control panel of the present invention.

FIG. 17 is a detailed view of a portion of the control panel of the present invention.

In accordance with the Figures the dust suppression apparatus of the present invention uses a fan and nozzles to distribute an airborne mist across a large worksite area. This mist reduces airborne dust or other airborne particulate matter at the worksite.

The apparatus is preferably powered by a diesel power unit, for example a 63-hp diesel power unit, which preferably supplies all the power for the unit.

The dust suppression apparatus preferably has power oscillation settings and aiming controls. The engine and fan head of the apparatus are installed on a turntable within the frame. The apparatus has power rotation controls in both directions as well as power fan head height adjustment. The apparatus also has an automatic oscillation setting that can be set to rotate 360 degrees, or it can be set to sweep a 45-degree arc once the limit switch peg has been installed. The coverage of the dust suppression apparatus can be altered by adjusting the nozzles and fan speed.

One may increase or reduce the throttle by adjusting the throttle knob. The machine has 30 nozzles that can be adjusted to alter the stream.

Some of the features of the preferred embodiment include an air flow of 17,500 cubic feet per minute generated by the fan, with fan outlet air velocity measures at 5,100 feet per minute.

Up to 20,000 square feet can be covered depending upon wind direction and fan oscillation.

The oscillator may allow any desired angle of sweep, such as typical settings from 45 to 360 degrees of movement. In addition, the dust suppression apparatus also is capable of a power-adjustable angle of throw typically in the range of from about 15 to about 60 degrees of height adjustment.

As to the power specifications of the preferred dust suppression apparatus, the diesel engine offers 63 HP continuous duty diesel power unit. In addition, there is a ½ HP, 12-volt, direct current oscillator motor, a 80:1 worm gear reducer on oscillator drive, a 1.0 RPM rotation speed for oscillation, and a 1-3 HP, intermittent duty, 12-volt, direct current throw adjustment motor.

In order to operate the apparatus, it will be noted that its placement will affect the coverage of the worksite. There are several factors to consider when determining where to position the apparatus, including desired coverage area, wind, water pressure, fan direction, oscillation setting, and personnel and other equipment within the area. Care should be taken to locate the apparatus within the reach range of the water supply hose in order to engage the water source. Examples of acceptable water sources include a pump feeding from standing water, a fire hydrant or fire truck, a water truck or municipal hydrant. The operator should assure that there will be enough water from the source to meet apparatus requirements needs. The volume of water needed will vary according to the working conditions and application. The two factors that determine the quantity of water needed are water pressure and time. The following tables illustrate the water flow for a given water pressure, and can be used to calculate the water needed for a given application:

| Primary (24 nozzles) Nozzle Ring Water Pressure (psi) | | | | | | |
| --- | --- | --- | --- | --- | --- | --- |
| 40 | 60 | 80 | 100 | 160 | 180 | 200 |
| Water Flow (gpm) 9.6 | 11.7 | 13.5 | 15.1 | 19.1 | 20.3 | 21.4 |

| Secondary (6 nozzles) Nozzle Ring Water Pressure (psi) | | | | | | |
| --- | --- | --- | --- | --- | --- | --- |
| 40 | 60 | 80 | 100 | 160 | 180 | 200 |
| Water Flow (gpm) 54 | 66 | 76 | 85 | 107 | 114 | 120 |

Typical water specifications for the preferred embodiment include: (a) a throw range of 20-210 feet, a range of coverage height of 0-75 feet, and (c) 200 PSI water pressure capability.

The nozzle system of the preferred apparatus includes 24 brass nozzles with individual ball valve control and 6 brass nozzles on secondary soaking ring with single ball valve control. The water supply system may also feature a quick disconnect water fitting up to 2" diameter.

To secure the apparatus, it should be placed on a solid, stable surface. If the apparatus is on a trailer, the trailer wheels should be blocked or the trailer otherwise secured. The frame of apparatus in the preferred embodiment is designed so that the apparatus can be moved by a lift truck. The two lift pockets run from end to end within the frame. The turntable should be positioned where the engine is closest to the lift truck prior to lifting. When loading the apparatus onto a trailer, be sure to center the weight on the trailer. This will stabilize the trailer and reduce the risk of accidents. Once the apparatus is properly positioned on the trailer it must be secured. Secure the apparatus to the trailer using heavy-duty cargo control devices, such as a ratcheting load binder. Typical trailer requirements are: (a) weight capacity: 4,200 lb., (b) width: 6.5 feet and (c) length: 12 feet.

To connect the water supply, the water hose coupler is connected to the water intake on the apparatus. The hose is then fed from the apparatus to the water source, while assuring that there are no kinks or blockages in the hose. Once the hose is connected to the water source, the water pressure is slowly increased to the apparatus. Once the water is reaching the apparatus, the water pressure is cut off the water pressure before starting the apparatus.

Basic startup involves starting the diesel engine, engaging the fan, and supplying water to the apparatus. This will be sufficient to create an airstream from the apparatus to begin dust suppression. To locate the apparatus controls refer to the diagram in the face of the control panel. See FIG. 16. The starting sequence may be as follows:

1. Press and hold the permissive start button, then turn the ignition switch to start.

2. When the engine fires, continue holding the permissive start button and release the key to the run position, and continue holding the permissive start button until the engine idles smoothly. The tachometer may be made to sweep its full range at power on as a self test.

3. Locate the throttle knob above the engine control box. Adjust it so that the apparatus idles at around 1500 rpm. Turn the throttle knob counter clockwise to increase the rpm.

4. Slowly rotate the clutch handle until the fan is engaged.

5. When the fan is up to speed, increase the engine speed to the maximum, 2100 rpm.

6. Initiate water flow to the apparatus.

The operation of the apparatus in terms of setting the motion profile for circular or arcuate reciprocal movement will also be apparent from the control panel and the logic and switches of the circuit diagram in FIG. 11.

The aiming controls shown in FIG. 17 allow the operator to direct the fan head using powered adjustment. The aiming controls are located just below the engine control box. The oscillation switch allows the fan to sweep back and forth 45 degrees if the limit switch peg is installed. If the limit switch peg is not installed, the fan will rotate 360 degrees. The manual rotate switch allows one to manually adjust the rotational position of the fan head. The fan switch allows one to manually adjust the vertical angle of the fan head from 15 to 60 degrees.

To aim the fan head, the following steps may be taken:

1. Assure that the limit switch peg is not installed, as this will limit the range of the turntable.

2. If the apparatus is not already running, use the start sequence.

3. Use the manual rotate switch to rotate the fan head toward the targeted area. Holding the switch up moves the turntable clockwise, holding the switch down rotates the turntable counter clockwise.

4. Use the fan switch to adjust the height of the fan head.

It should be noted that the area coverage is affected by worksite conditions, so the apparatus should be monitored and adjusted as necessary to maintain proper coverage.

The dust suppression apparatus can circle 360 degrees or sweep back and forth in a preset angle, such as a 45-degree area sweep. To cause the apparatus to sweep a 45-degree area one must install the limit switch peg.

To Sweep a 45-degree Area the following steps may be taken:

1. Remove the limit switch peg if it has been installed. Make sure that the turntable track is clear.

2. Use the manual rotate switch to point the fan head toward the center of the 45-degree area that you want to cover.

3. Once the fan head is in position, screw the limit switch peg into the oscillation track directly below the fan head.

4. Use the fan controls to adjust the height of the fan head as necessary.

5. Turn the oscillation switch on. The machine will switch directions when the limit switch peg is encountered.

To cause the dust suppression apparatus to circle 360 degrees, the limit switch peg is removed, while assuring that the oscillation track is clear of obstructions.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claims, including the full range of equivalency to which each element thereof is entitled.

What is claimed is:

1. A dust suppression apparatus comprising:
   a. an engine;
   b. a water mist blower comprising an air conduit, a plurality of water nozzles positioned so as to supply a spray of water to said air conduit, and a fan positioned so as to supply a stream of air through said air conduit;
   c. at least one motor adapted to be able to rotate said air conduit to be rotated horizontally and to be able to tilt said air conduit vertically;
   d. a water conduit adapted to supply pressurized water to said plurality of water nozzles;
   e. a belt drive connected to said engine and adapted to supply power to said fan, said belt drive being upstream of said air conduit;
   f. a constant velocity joint connecting said belt drive to said fan; and
   g. a belt guard, a portion of said belt guard adapted to permit air flow therethrough.

2. A dust suppression apparatus comprising:
   a. an engine;
   b. a water mist blower comprising an air conduit, a plurality of water nozzles positioned so as to supply a spray of water to said air conduit, and a fan positioned so as to supply a stream of air through said air conduit;
   c. a water conduit adapted to supply pressurized water to said plurality of water nozzles;
   d. a belt drive connected to said engine and adapted to supply power to said fan, said belt drive being upstream of said air conduit; and
   e. a belt guard, a portion of said belt guard adapted to permit air flow therethrough.

* * * * *